United States Patent
Bowen

(10) Patent No.: US 9,971,854 B1
(45) Date of Patent: May 15, 2018

(54) COMPUTER AIDED SYSTEMS AND METHODS FOR CREATING CUSTOM PRODUCTS

(71) Applicant: Best Apps, LLC, Westport, CT (US)

(72) Inventor: Michael Bowen, Los Angeles, CA (US)

(73) Assignee: BEST APPS, LLC, Wesport, CT (US)

( * ) Notice: Subject to any disclaimer, the term of this patent is extended or adjusted under 35 U.S.C. 154(b) by 0 days. days.

(21) Appl. No.: 15/637,888

(22) Filed: Jun. 29, 2017

(51) Int. Cl.
G06F 3/0484 (2013.01)
G06F 3/0482 (2013.01)
G06F 17/50 (2006.01)

(52) U.S. Cl.
CPC ............ *G06F 17/50* (2013.01); *G06F 3/0482* (2013.01); *G06F 3/0484* (2013.01); *G06F 2217/32* (2013.01)

(58) Field of Classification Search
None
See application file for complete search history.

(56) References Cited

U.S. PATENT DOCUMENTS

| 6,459,952 | B1 | 10/2002 | Dundorf |
| 6,804,568 | B1 | 10/2004 | Miyazaki et al. |
| 9,702,071 | B2 | 7/2017 | Harvill et al. |
| 2002/0114537 | A1 | 8/2002 | Sutula |
| 2008/0006192 | A1 | 1/2008 | Zeiger et al. |
| 2009/0122329 | A1 | 5/2009 | Hegemier et al. |
| 2010/0169185 | A1 | 7/2010 | Cottingham |
| 2010/0274535 | A1 | 10/2010 | McDaniel |
| 2011/0264412 | A1* | 10/2011 | Fritz-Humblot ........ G06F 17/50 703/1 |
| 2013/0125072 | A1* | 5/2013 | Newcomb ........... G06F 17/5081 716/107 |
| 2013/0173415 | A1 | 7/2013 | Harvill et al. |
| 2017/0115847 | A1* | 4/2017 | Barras ................. G06F 3/04815 |
| 2017/0139483 | A1* | 5/2017 | Selker .................... G06F 3/017 |

* cited by examiner

*Primary Examiner* — Xin Sheng
(74) *Attorney, Agent, or Firm* — Knobbe, Martens, Olson & Bear LLP

(57) ABSTRACT

A computer-aided design system enables physical articles to be customized via printing or embroidering. A user interface may be generated that includes an image of a model of an article of manufacture and user customizable design areas that are graphically indicated on the image corresponding to the model. A design area selection may be received. In response to an add design element instruction and design element specification, the specified design element is rendered in the selected design area on the model image. Customization permissions associated with the selected design area are accessed, and using the customization permissions, a first set of design element edit tools are selected and rendered. User edits to the design element may be received and rendered in real time. Manufacturing instructions may be transmitted to a printing system.

21 Claims, 72 Drawing Sheets

COMPUTER AIDED SYSTEMS AND METHODS FOR CREATING CUSTOM PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to computer aided design and manufacture of custom products.

DESCRIPTION OF THE RELATED ART

Computer-Aided Design (CAD) systems are conventionally used to design articles of manufacture. However, such conventional CAD systems often have overly difficult to use user interfaces, do not adequately ensure compliance with manufacturing processes, and do not provide adequate mechanisms for a manufacturer to provide flexibility for users to customize articles of manufacture.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

DESCRIPTION

Figure 1A:
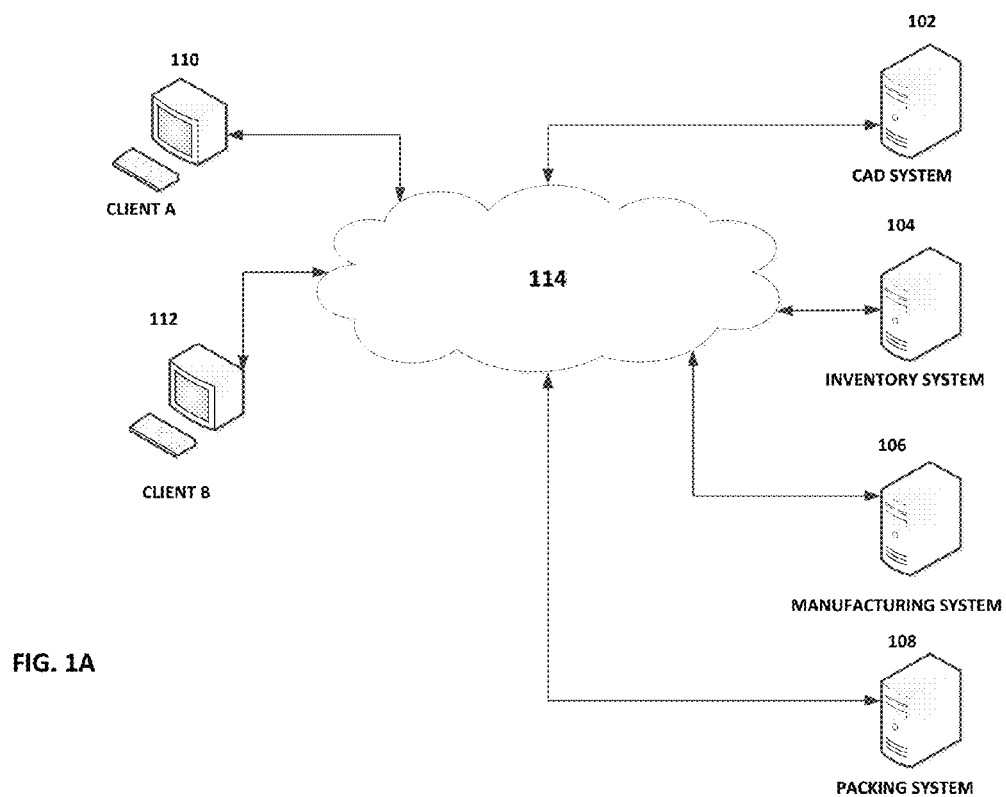
FIG. 1A is a block diagram illustrating an example embodiment of an operating environment.

Systems and methods are described that provide computer aided design of customized items. Non-limiting examples of such items may include t-shirts, hoodies, shirts, jackets, dresses, pants, glasses, phone cases, laptop skins, backpacks, laptop cases, tablet cases, hairbands, wristbands, jewelry, and the like. Techniques, processes and user interfaces are disclosed that enable more efficient and accurate generation, editing, and printing or embroidering of design elements. Because the resulting customized items will more closely reflect user-desired customizations, there may be less wastage of materials (e.g., item fabric, ink, etc.), as there will be fewer defective customized items.

An aspect of the disclosure relates to computer aided design (CAD) systems and methods that enable an item (e.g., a product) provider to submit (e.g., via an upload or by providing a link) one or more images of the item (e.g., a photograph or graphic image of the front, back, left side, right side, top view, bottom view, and/or interior view of the item) and/or portions of the item (e.g., left sleeve, right sleeve, shoe lace, strap, etc.) for posting to an online interactive catalog of one or more items. A further aspect of the disclosure relates to systems and methods adapted to enable an item provider to define certain customization options for users and define certain areas of the item which may or may not be customized by users. For example, optionally an item provider may specify the types of customizations described herein. An item provider may be an item seller, manufacturer, a branding entity (e.g., a celebrity or brand name licensor), or a collaboration initiator. A collaboration initiator may be a user that is also be an end user (item purchaser/recipient) but that has initiated an end user customization collaboration for an item of an item seller, manufacturer, or branding entity.

An example CAD system may provide a user interface including a design area and a set of tools via which a product provider can specify and/or apply design elements (e.g., text, image, and/or a graphic design elements) to a product, specify areas to which an end user may specify design elements to be applied (e.g., printed or embroidered), specify permitted end user modifications to a design element originally specified by the product provider (that the system may perform in response to an end user request), and/or specify permitted design element types and characteristics that the system may apply to the product in response to an end user request.

A design element may be in the form of a template. Templates, including image templates, text templates, and templates that include both image(s) and text may be presented to an end-user to provide the end-user with a starting point for customization, thereby simplifying the customization process. A template, by way of example, may include text, a digital sticker (e.g., a licensed cartoon character image), a logo, an image of a person, etc. A template may be editable by the end-user in accordance with item provider and/or template provider restrictions. For example, as discussed further elsewhere herein, a user interface may be provided via which an item provider may specify which colors in a given image can or cannot be changed. By way of further example, a user interface may be provided via which an item provider may specify which portions of an image may or may not be edited. By way of still further example, a user interface may be provided via which an item provider may specify design element size change restrictions (e.g., a maximum and/or a minimum height or width), restrict adding one or more specified colors to a design element, restrict changes to design element orientation (e.g., maximum and/or minimum rotation angle), restrict changes to text content (e.g., prevent changes to one or more words in a text design element), restrict changes to a design template height/width ratio, restrict changes to one or more fonts, restrict the use of one or more effects (e.g., text curvature effects, 3D effects, etc.), and/or the like. By way of yet further example, a user interface may be provided via which a user may specify placement/movement restrictions for templates, images and/or text. By way of further example, a user interface may be provided via which a user may specify that certain text and/or image notifications (e.g., copyright notices, trademark notices) or logos may not be removed and/or altered.

By way of illustration, if a sports team is offering a template (e.g., the team logo on a background) which may be added to an item, the sports team may want to permit an end-user to change the background color but not the color of the logo itself, which may be in the official team colors. Thus, the sports team may specify that the color corresponding to the team color (e.g., purple) may not be changed but other colors in the template may be changed. By way of further example, a user interface may permit an item provider to specify that portion of a template that corresponds to a person (e.g., an athlete, performer, celebrity, etc.), cannot be deleted by an end user but that other portions of the template may be deleted. By way of yet further example, a user interface may permit an item provider to specify that an end-user may distort (e.g., by changing a height to width ratio) certain templates, such as logos or cartoon characters, but may not distort specified other templates (e.g., a template that includes an image of an athlete, performer, celebrity, etc.).

By way of yet further example, if the item is a sports team jersey, a template may include the team logo, a player name, and a player number. The item provider may specify via a user interface that the team logo may not be edited in any manner, but that an end-user may edit the content of the player name and the player number.

By way of further example, if a template includes multiple words, a user interface may enable the item provider to specify that a specific words or words in the template may be edited by an end user, but that the text content of other words in the template may not be edited by an end user.

The system may store the restrictions/permissions in a text or non-text file in association with the corresponding template.

Optionally, the CAD system further comprises collaboration tools that enable end users to collaborate with each other and/or the product provider on customizations for a given product. By way of illustrative example, a collaboration initiator may be a member of a class or grade in an educational institution. The collaboration initiator may specify certain design features of a product, such as a shirt. For example, the collaboration initiator may specify that the phrase "Class of 2027 Acme School of the Plastic Arts" is to be printed on the back of a shirt, and may provide permission (via a user interface) to a first class member to specify design elements for a left sleeve of the shirt, and provide permission to a second class member to specify design elements for a right sleeve of the shirt.

CAD tools may be provided that enable a user to specify a product color for the entire product or for corresponding portions of the product. By way of illustration, if the product is a jacket, the tools may enable the provider to specify that the jacket exterior is red and that the jacket interior is black. By way of further example, the tools may be enable the provider to specify different colors for each sleeve, the product body, hood, muff, zipper, cord, etc.

The CAD system may provide tools that enable a user (e.g., an item/product provider) to specify one or more design element areas in which a respective design element may be applied. For example, a tool may be provided which enables a user to draw a bounding shape on a product, such as a hoodie jacket, which designates an area of the product as an area to which a design element may be added.

As similarly discussed above, the CAD system may provide tools that enable a user to specify which colors are to be applied to a specific design element and/or which colors may be applied any design element added by a user to a specified design area. A tool may further be provided that enables the user to specify that a given design element may incorporate only certain designated colors (e.g., gold and blue) and/or that the design element may not incorporate certain designated colors (e.g., grey and white). By way of illustration, an item provider may not want to permit colors to be applied that will not be adequately visible against the background color of the product. By way of further illustration, if the product has a gray exterior, white and gray design elements may not have sufficient contrast to be adequately visible. By way of still further illustration, certain types of clothing (e.g., a running jacket) may be safer and otherwise more functional with brighter or more reflective colors, and so the item provider may specify that certain design areas (e.g., the sleeves, the zipper area, etc.) may only be certain bright colors and/or may specify that certain dark colors (e.g., black, navy blue) may not be used on such design areas. By way of yet further example, the item provider may feel that certain colors will clash with colors of certain design elements specified by the item provider, and so may specify that such clashing colors may not be used in certain design areas, or on the product as a whole. By way of further example, the item provider may specify a maximum amount of rotation for a design element.

The design element and/or design element area may be associated with one or more specified dimensions (e.g., height and/or width, diameter, etc.). The dimensions may be specified using a bounding tool (e.g., that enables a user to graphically draw a boundary of a design element area) or via a numerical entry (e.g., via a field that enables the user to specify a height or width in units, such as inches and centimeters).

Where a design element includes text and/or design element area permits the addition of text, a user interface may be provided via which the item provider may specify one or more fonts for the text (e.g., Times New Roman, Times New Roman Italic, Arial, Arial Narrow, etc.) and/or specify one or more fonts that may not be used for the text. The design element and/or design element area may also be associated with formatting instructions (e.g., none, left justified, right justified, center justified, top left justified, top right justified, top center justified, bottom left justified, bottom right justified, bottom center justified, concave arc, concave high arc, concave low arc, convex arc, convex high arc, convex low arc, wave, shadow, rotate, make 3D, make vertical, etc.). The item provider may provide, via a user interface, restrictions on which formatting instructions may be used for different design elements and/or different design areas.

Access to certain functions, such as a given function disclosed herein, of the CAD system may be limited to certain types of users. For example, optionally only users having an item provider account are provided with tools to define design areas that an end user may modify and corresponding permissions and restrictions.

Certain aspects of the disclosure will now be discussed with reference to the figures.

An example system architecture that may be utilized to provide computer aided design and manufacturing services will now be discussed with reference to FIG. 1A. In the illustrated embodiment a computer aided design (CAD) system 102 may be hosted on one or more servers. The CAD system 102 may be cloud-based and may be accessed by one or more client terminals 110, 112 (e.g., associated with an item provider or end user) and item provider terminals 105a-105n over a network 114 (e.g., the Internet, Ethernet, or other wide area or local area network). Client terminals may be able to share software applications, computing resources, and data storage provided by the CAD system 102.

The client terminals may be in the form of a desktop computer, laptop computer, tablet computer, mobile phone, smart television, dedicated CAD terminal, or other computing device. A client terminal may include user input and output devices, such a displays (touch or non-touch displays), speakers, microphones, trackpads, mice, pen input, printers, haptic feedback devices, cameras, and the like. A client terminal may include wireless and/or wired network interfaces via which the client terminal may communicate with the CAD system 102 over one or more networks. A client terminal may optionally include a local data store that may store CAD designs which may also be stored on, and synchronized with, a cloud data store.

User interfaces described herein are optionally configured to present edits (e.g., edits to images, text, item colors, or the like) in real time as applied to an item to ensure enhanced accuracy, reduce the possibility of user error, and so make the customization process more efficient. The user interfaces may present controls and renderings to further ease the specification of customization permissions by item providers, and to ease customizations of items by end users. Optionally, a version of the user interfaces described herein may be enhanced for use with a small screen (e.g., 4 to 8 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger). For example, if a user touches an image template in a template gallery, it may be inferred that the user wants to add the image template to a previously selected item design area and to then edit the image template, and so the selected image template may be automatically rendered in real time on the selected item design area on a model/image of a product in association with permitted edit tools.

Further, optionally user interfaces may enable a user to expand or shrink a design element using a multi-touch zoom gesture (where the user touches the screen with two fingers and moves the fingers apart) or a multi-touch pinch gesture (where the user touches the screen with two fingers and moves the fingers together) to further ease editing of a design element and ease specification of a design area or editing restrictions. Optionally, a user interface may enable a user to resize a design element using a one finger icon drag/pull.

Optionally, a resizing control may be provided which enables the user to quickly resize a design element to an appropriate size. For example, if an existing design element is sized for a shirt pocket, the resizing control may enable the user to instruct the system to automatically resize the design element for another selected area, such as a chest area or a sleeve area.

Optionally, user interfaces may be configured to respond to a user swipe gesture (e.g., a left or a right swipe gesture using one or more fingers) by replacing a currently displayed design element (e.g., a template) on an item model with another design element (e.g., another template in a set of templates). Optionally, if a user has edited a first design element and then used a swipe gesture to replace the design element with a second design element, some or all of the edits made to the first design element (e.g., height edit, width edit, color edit, or the like) may be automatically applied to the second design element.

Optionally, in response to a swipe gesture (e.g., an up or down swipe gesture) a user interface may display metadata related to the displayed item and/or item customizations (e.g., cost, shipping time, item size, etc.) or other notifications.

Optionally, in response to a gesture (e.g., an up/down or left/right swipe) the product on which the design element is displayed is changed. For example, if a design element is displayed on a model of a jacket, the gesture may cause the same design element (optionally with any user edits) to be displayed in real time on another item model (e.g., a t-shirt or a different jacket style) in place of the original jacket model.

As will be described in greater detail herein, the CAD system 102 may provide tools to graphically construct computer models of and to modify computer models of products such t-shirts, hoodies, shirts, jackets, dresses, pants, glasses, phone cases, laptop skins, backpacks, laptop cases, tablet cases, hairbands, wristbands, jewelry, and the like.

The CAD system 102 tools may include tools for specifying and/or applying design elements (e.g., text, image, and/or a graphic design elements) to a product, specify areas to which an end user may apply design elements, specify permitted end user modifications to a design element and/or specify permitted design element types and characteristics that the system may apply to the product in response to an end user request. Optionally, collaboration tools are provided that enable users (e.g., end users, or a graphic designer and an item provider) to collaborate with each other and/or the item provider on customizations for a given product.

The CAD system 102 may optionally generate, based on an end-user design or design modification, corresponding order forms and/or manufacturing instructions. Some or all of the information generated by the CAD system 102 may be provided to an inventory/ordering system 104, a manufacturing system 106, and/or a packing/shipping system 108. Some are all of the foregoing systems may optionally be cloud based. Optionally, the CAD system 102, inventory/ordering system 104, manufacturing system 106, and/or packing/shipping system 108 may be the same system and may be operated by the same entity, or may be separate systems operated by separate entities.

The CAD system 102 may optionally generate directives in the form of manufacturing machine instructions for applying (e.g., printing or embroidering). For example, design files may be provided that include an image file (e.g., in raster graphics file format, such as a portable network graphics file) and screenshots of the user customized item. Optionally the image file may support RGB color spaces and/or non-RGB color spaces (e.g., CMYK color spaces). Optionally, the image file may be in SVG, PDF, GIF, Encapsulated PostScript, AutoCAD DFX, or ADOBE ILLUSTRATOR format. Optionally, one or more files may be compressed (e.g., losslessly compressed) and transmitted to the manufacturing system 106 in the form of a zip file, jar file or other file format. The manufacturing system 106 may then decompress the file using an appropriate decompression module.

The CAD system 102 may enable multiple users to collaborate on a design via their respective terminals, optionally in real time. As noted above, a first user may specify different design permissions for different collaborating users. For example, a design project leader may select an item to be designed (or to have a design modified), such as a sweatshirt. The project leader may identify, via a collaboration set-up user interface provided by the system 102 (directly or via an application installed on a user device) multiple other collaborating users (e.g., by email address, mobile phone number, other communication address, etc.). The project leader may assign, via a permissions user interface, certain permissions to a given collaborating user, such as what design element the collaborating user has permission to design (e.g., a right sleeve design element, a left sleeve design element, a hood design element, a chest area design element, a muff area design element, a hood drawstring, a zipper, stitching, etc.), and any design restrictions (e.g., color, font, formatting, design element dimensions, rotation angle, text effects, other design restrictions discussed herein, etc.). The system 102 may record the collaborating user identifiers, permissions, and/or restrictions in non-volatile memory in a record associated with the design leader and/or project.

The system 102 may transmit over a network respective collaboration invitations to respective invitee collaborator destination addresses (e.g., by email address, mobile phone number, other communication address, etc.). A given invitation may provide a link to the corresponding project hosted by the system 102, where the link may also uniquely identify the invitee. Activation of the link may further cause a CAD item customization interface to be presented displaying the corresponding item that is the subject of the project, with the design element(s) that the invitee is permitted to customized emphasized (e.g., via bolding, line width, text, and/or otherwise). Optionally, in addition to or instead of a link, a unique code may be generated and provided in the invitation, wherein a user interface is provided to receive the code from the invitee. The system 102 may then permit a given invitee to design the item in accordance with the invitee's respective permissions and prohibitions.

The system 102 may generate and provide collaboration information, indicating who added or modified a given design element, when the addition or modification was made, and what the addition or modification was. Optionally, controls may be provided that enable a given collaborating user to undo and redo a particular customization made by that collaborating users (but not other users). Optionally, the project leader may be provided with permissions to undo or redo customizations made by other collaborating users.

The inventory/ordering system 104 may receive and process an order for a customized item, generate prices for a customized item (e.g., based on a base item price, the number of customizations, and/or the type of customizations), maintain a user shopping cart, and generally interact with a user ordering an item and managing the ordering process. The inventory/ordering system 104, when receiving an order for a customized item customized using the CAD system 102, may determine if the item being designed/modified is in stock, and order items that are below a specified threshold (e.g., zero or some number greater than zero).

The packing/shipping system 108 may generate packing instructions to efficiently package the items being shipped to the user. For example, the instructions may specify package sizes and which items are to be shipped in which package. The packing/shipping system 108 may further generate shipping labels and/or other shipping documents.

Figure 1B:
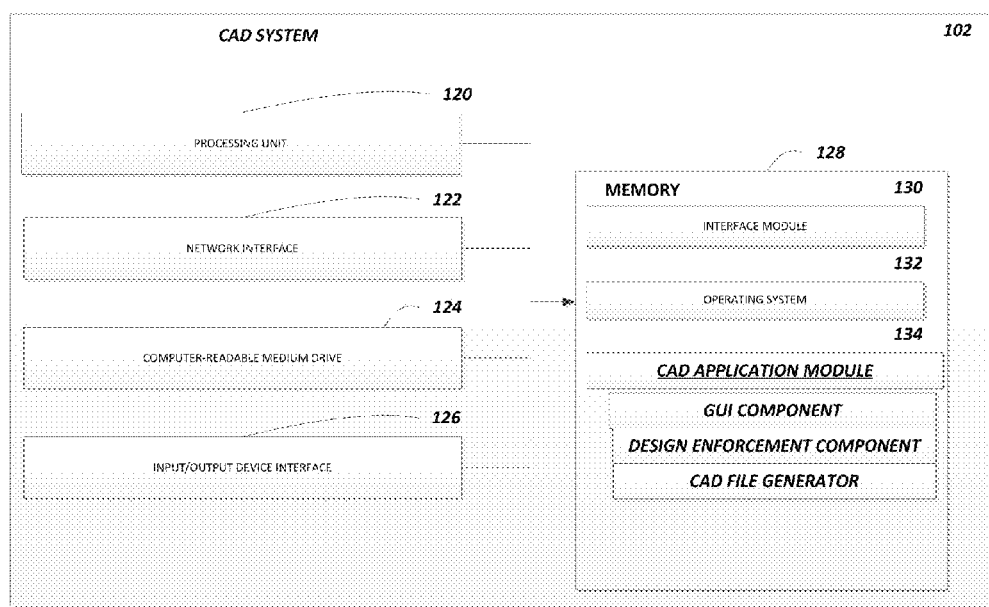
FIG. 1B is a block diagram illustrating an embodiment of example components of a computing system capable of providing product customization services.

FIG. 1B is a block diagram illustrating an embodiment of example components of the CAD system 102. The example CAD system 102 includes an arrangement of computer hardware and software components that may be used to implement aspects of the present disclosure. Those skilled in the art will appreciate that the example components may include more (or fewer) components than those depicted in FIG. 1B.

The CAD system 102 may include one or more processing units 120 (e.g., a general purpose process and/or a high speed graphics processor with integrated transform, lighting, triangle setup/clipping, and/or rendering engines), one or more network interfaces 122, a non-transitory computer-readable medium drive 124, and an input/output device interface 126, all of which may communicate with one another by way of one or more communication buses. The network interface 124 may provide the CAD services with connectivity to one or more networks or computing systems. The processing unit 120 may thus receive information and instructions from other computing devices, systems, or services via a network. The processing unit 120 may also communicate to and from memory 124 and further provide output information via the input/output device interface 126. The input/output device interface 126 may also accept input from one or more input devices, such as a keyboard, mouse, digital pen, touch screen, microphone, camera, etc.

The memory 128 may contain computer program instructions that the processing unit 120 may execute in order to implement one or more aspects of the present disclosure. The memory 120 generally includes RAM, ROM (and variants thereof, such as EEPROM) and/or other persistent or non-transitory computer-readable storage media. The memory 120 may store an operating system 132 that provides computer program instructions for use by the processing unit 120 in the general administration and operation of the CAD application module 134, including it components. The CAD application module components may include a GUI component that generates graphical user interfaces and processes user inputs, a design enforcement component to ensure that user designs do not violate respective permissions/restrictions, a CAD file generator that generates data files for an inputted user design, and/or an image generator that generates image data files for printing and/or sewing/embroidering machines.

The printing machines may utilize, by way of example, heat transfer vinyl, screen printing, direct to garment printing, sublimation printing, and/or transfer printing to print design elements on an item. By way of further example, embroidery machines may be used to embroider design elements on an item. The memory 128 may further include other information for implementing aspects of the present disclosure.

The memory 128 may include an interface module 130. The interface module 130 can be configured to facilitate generating one or more interfaces through which a compatible computing device, may send to, or receive from, the CAD application module 134 data and designs.

The modules or components described above may also include additional modules or may be implemented by computing devices that may not be depicted in FIGS. 1A and 1B. For example, although the interface module 130 and the CAD application module 134 are identified in FIG. 1B as single modules, the modules may be implemented by two or more modules and in a distributed manner. By way of further example, the processing unit 120 may include a general purpose processor and a graphics processing unit (GPU). The CAD system 102 may offload compute-intensive portions of the CAD application module 134 to the GPU, while other code may run on the general purpose processor. The GPU may include hundreds or thousands of core processors configured to process tasks in parallel. The GPU may include high speed memory dedicated for graphics processing tasks. As another example, the CAD system 102 and its components can be implemented by network servers, application servers, database servers, combinations of the same, or the like, configured to facilitate data transmission to and from data stores, client terminals, and third party systems via one or more networks. Accordingly, the depictions of the modules are illustrative in nature.

Certain user interfaces will now be described with references to FIGS. 2A-4E. Inputs received from a user device may be received and stored by the CAD system 102 or other system (e.g., the inventory/ordering system 104), for example, in a database record associated with a user, user entity (e.g., an online shop), and/or a project (e.g., a collaborative item design). The user interfaces may be displayed on a user device display, such as a display associated with a computing device (e.g., a smart phone, a laptop computer, a tablet computer, a desktop computer, a virtual or augmented reality headset, etc.). The user interfaces may be provided via a dedicated application (e.g., a phone "app"), via a website, or otherwise. The user interfaces may be provided and/or generated by one or more of the systems described herein (e.g., a CAD system, an ordering/inventory system, client device, etc.).

Figure 2A:
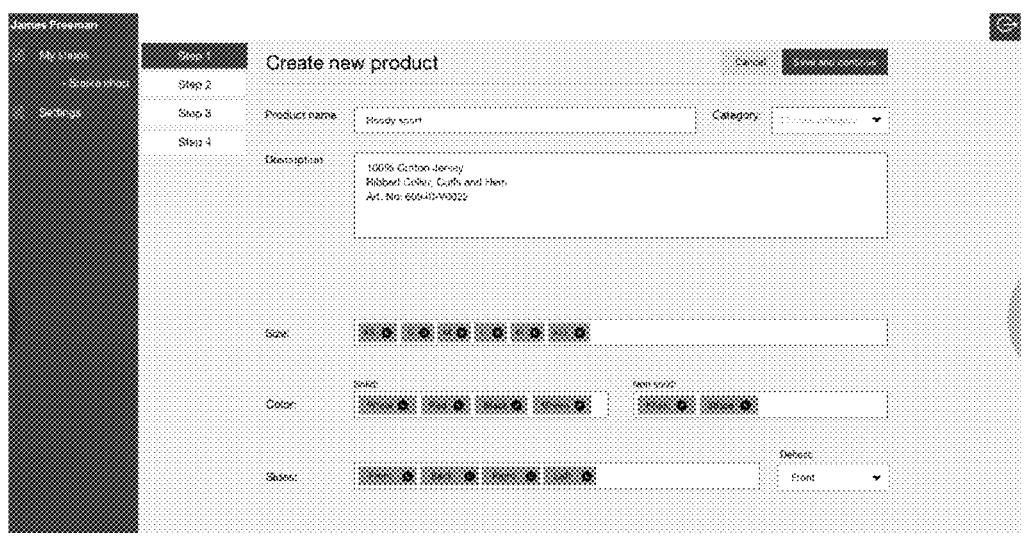
FIGS. 2A-4E illustrate example user interfaces.

FIG. 2A illustrates an example item creation user interface. Fields are provided via which a user, such as an item provider (e.g., a product seller, manufacturer, a branding entity (e.g., a celebrity or brand name licensor) can specify various item characteristics. For example, a field is provided configured to receive an item name from a user. A menu of predefined item categories is provided via which the user can select a respective item category (e.g., t-shirt, sweat shirt, hat, outerwear, shorts, jeans, pants, accessories, backpack, phone case, etc.). A description field is provided configured to receive free form text (e.g., tags corresponding to the item or a sequence of text describing the item). A size field is provided via which the user can specify one or more sizes that the user intends to make the item available in. Color fields are provided via which the user can specify one or more solid and/or non-solid colors that the user intends to make the item available in.

A "sides" field is provided via which the user can specify the sides of the item (e.g., front, back, right, left, top, and/or bottom) for which images are to be presented to end-users. A default field is provided via which the user can specify which side image is to be presented as a default when an end-user accesses an item detail page (e.g., an interactive online catalog page) corresponding to the item or to be presented in search results provided in response to a user product search.

The image may be a two dimensional or three-dimensional model (where the surface of a depicted item is rendered in three dimensions).

For example, a three-dimensional model of an item may utilize points in three-dimensional space, connected by triangles, lines, curved surfaces, or the like. Texture mapping may be utilized to define surfaces of the 3D model. The 3D model may be a solid model or a boundary model (which may be constructed using a mesh).

Optionally, the model may be provided using WebGL (Web Graphics Library) which utilizes a JavaScript API (which may be used with HTML5) to render an interactive 3D or 2D graphic. The interactive 3D model may enable the user to spin the model, rotate the model in any direction, scale the model in or out, add text or graphics to the model, and/or animate the model. For example, a user interface may enable the user to manipulate the model via touch or via discrete spin, rotate, scale controls. [0054] By way of illustrative example, if the item is a jacket, the image of the jacket may be a 3D image of the jacket in a worn state, as if draped over a torso. For example, the front of the jacket may be curved as if conforming to a human chest. Optionally, the image of the jacket or other item may be continuously rotated around an axis (e.g., a vertical or horizontal axis) when presented to the user so that the user can view the front, back, left and rights sides. By way of further example, if the item is a hat, the front of the hat may be curved, and the bill of the hat may project outwards. A design element (e.g., text and/or an image) may be configured to appear curved when applied to a curved portion of a 3D model.

By way of further illustrative example, if the item is a shoe, the model of the shoe may be animated to demonstrate how the shoe flexes when being worn and used to run.

Figure 2B:

FIG. 2B illustrates a color specification user interface via which the user can add an image of the item for each selected color for corresponding item sides. Optionally in addition or instead, the system may enable the user to upload images of the item in a single color, such as white, and the system may then enable the user to specify other colors for the item. The system may then generate files corresponding to the other specified colors for the item, and may enable an end user to view item images corresponding to the specified colors. Controls are provided via which the user can upload the image of the item or select an image from a gallery/library of item images (e.g., images of generic items, such as a generic t-shirt or sweat shirt). Controls are provided via which the user can specify the side of the item (e.g., front, back, right, left, top, and/or bottom) that the image being uploaded or selected corresponds to. Controls are provided via which the user can assign a solid color (e.g., red, blue, black, purple, dark blue, gray, etc.) or non-solid color (e.g., striped, geometric, plaid, etc.) to the item.

The user interface may specify that the uploaded image be in a scalable vector graphics (SVG) format which is defined in an XML text file. The system may locate and edit a color entry in the text file to correspond to a color specified by the user, thereby causing the color of graphic added to the design area to be the specified color (e.g., via fill, stroke, and/or other properties). The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). Thus, the utilized image format may permit quicker editing of colors with less processing power and requiring less working memory.

In the illustrated example, a color map is provided via which the user can point to a desired color, and the corresponding numerical value (e.g., a hexadecimal value) will appear in color name field. The numerical color value may be edited by the user.

Figure 2C:
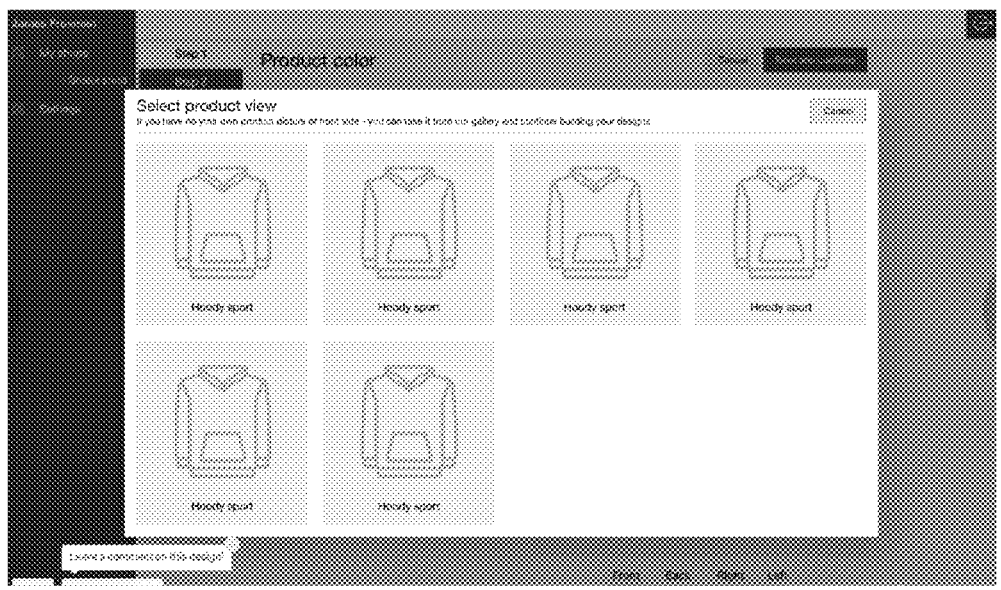

FIG. 2C illustrates a select product view user interface which may be presented in response to the user selecting the gallery/library control. The select product view user interface may present various views of an item (e.g., a product) accessed from a product view database, where the images (e.g., which may be product outlines or photographs) are selected to correspond to the product category selected by the user. The user may select an image to be associated with the corresponding side (e.g., front) specified by the user.

Figure 2D:
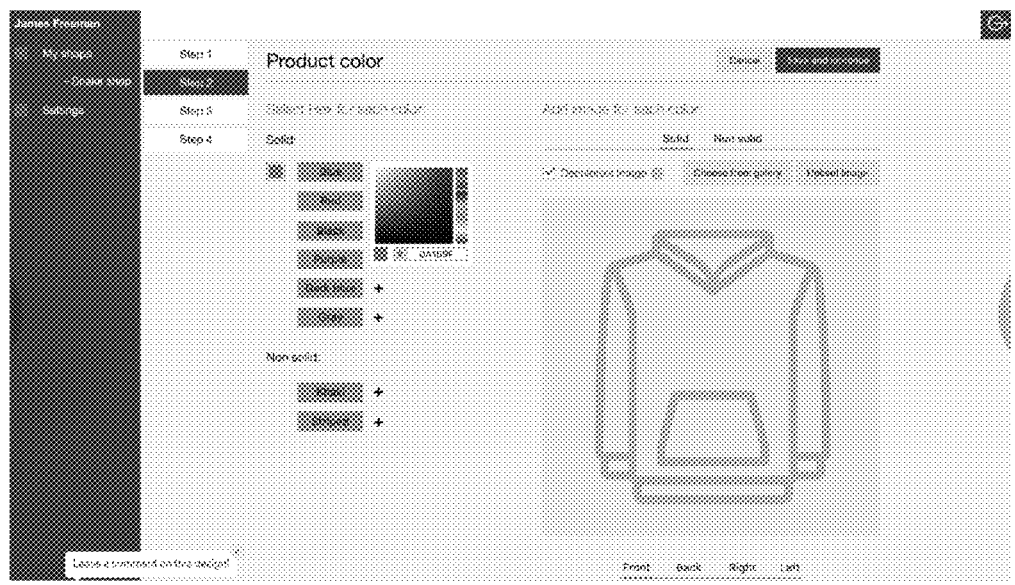

FIG. 2D illustrates the user interface of FIG. 2B with the product view selected by the user displayed. In this example, the user has selected the blue color control. A color map is displayed for a range of blue colors. The user may select a particular color shade of blue from the map. The corresponding hex value may be determined and displayed in a color value field. Optionally, the user can enter the desired color via the color value field (e.g., by entering or modifying a color hex value). The product in the product view will then be colored using the selected color in real time. A control is provided via which the user can decolorize the product in the product view. The user may activate a save control, and the user settings are saved to a data store.

Figure 2E:
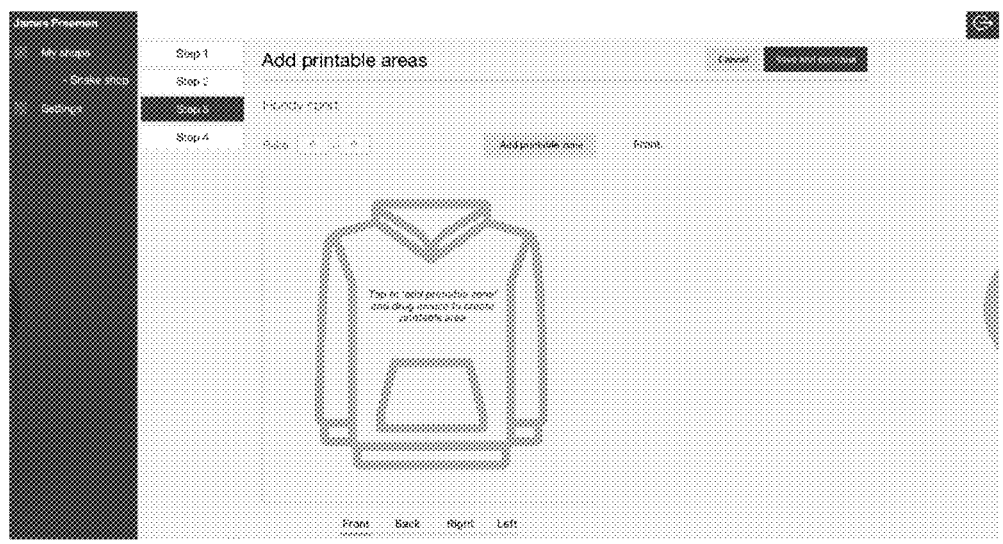

FIG. 2E illustrates an example CAD user interface that enables a user, such as an item provider (e.g., a product seller, manufacturer, a branding entity (e.g., a celebrity or brand name licensor), a template licensor (e.g., a licensor of a digital sticker, image, text, or the like), or a collaboration initiator) to specify one or more design areas (e.g., printable areas) on an item. The user interface may include side selection controls (e.g., front, back, right, left, up, down controls). In response to a user selecting a corresponding side control, the CAD system accesses and presents an image (e.g., photograph or drawing) of the corresponding item side.

A design area specification tool (e.g., an "add printable area" tool) may be provided that enables a user to draw or otherwise specify a design area perimeter. By way of illustration, a user may select the tool, specify a first corner via a pointer (e.g., mouse, stylus, finger), drag the pointer to indicate a diagonally opposite corner, and a corresponding perimeter will be drawn (e.g., using dashed lines or other indicator), which may be in the form of a rectangle or square (although other shapes may be used).

Referring again to FIG. 2E, a ratio control may be provided via which the user can specify a height to width ratio for the design area. Controls may be provided enabling the user to grab a corner or side of the perimeter and drag the grabbed portion to change the size of the design area perimeter (e.g., make the perimeter larger or smaller), rotate the perimeter, move the perimeter to a different portion of the item, and delete the perimeter. Fields are provided via which the user can assign an identifier (e.g., an alphanumeric name) for each design area.

Figure 2G:
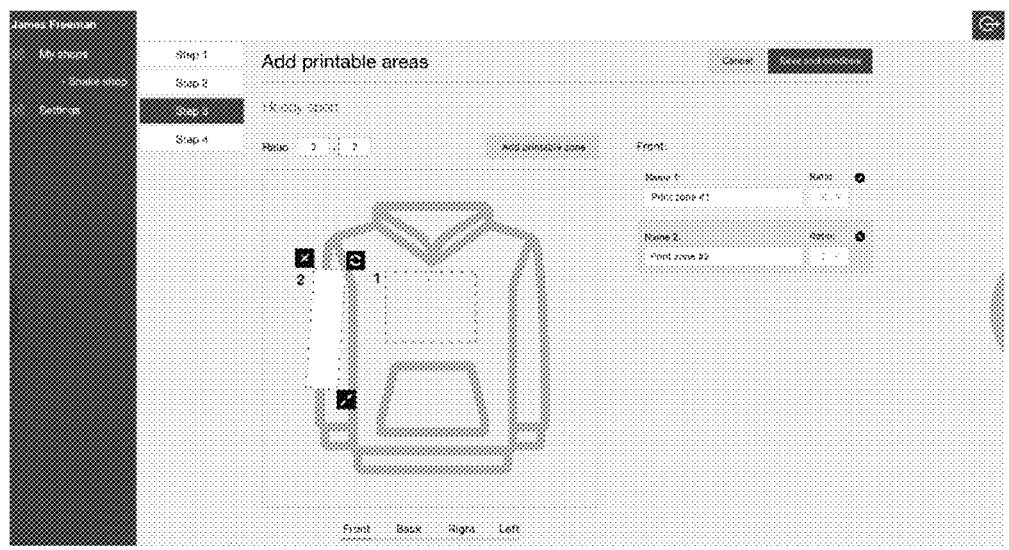

Referring to FIG. 2G, in this example, the user has added two design areas and assigned the following design area names: print zone #1, print zone #2. In this example, each listing of a design area is associated with a ratio user interface displaying the respective design area ratios. Optionally, once the ration is set for a design area it may not be modified. If the user wants to change the ratio, the user needs to delete the design area and add it back in with a different ratio. Optionally instead, the system may enable the user to modify the ratio of a design area without having to delete the design area. In this example, design area #2 has been slightly rotated by a user using the rotation control associated with design area #2. A control is optionally provided in association with a given design area listing via which the user can delete a design area.

Figure 2H:
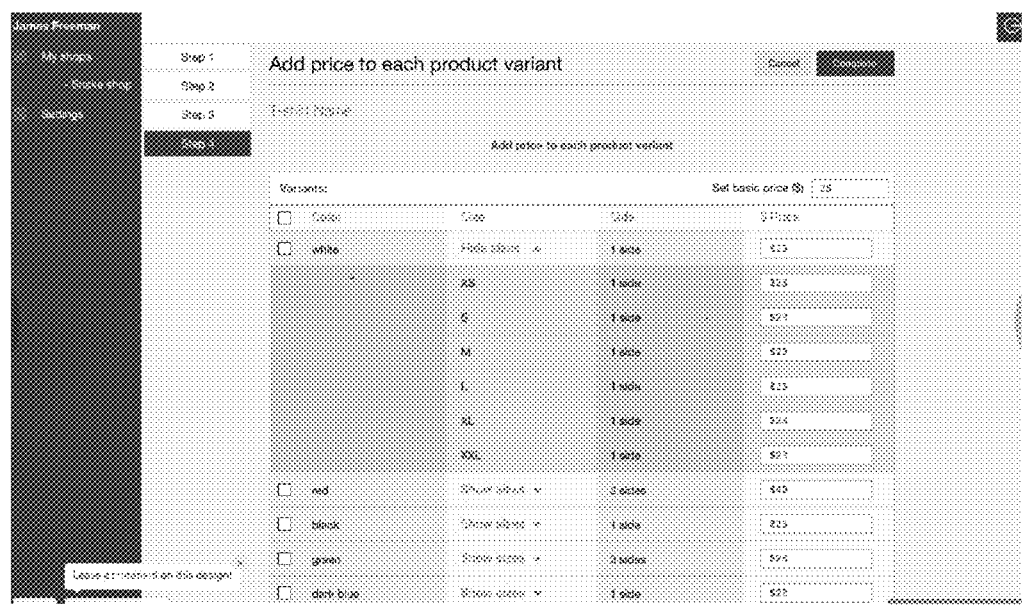
Figure 21:

FIG. 2H illustrates a user interface via which a user can assign a base price and prices for each specified item variant (e.g., for each combination of available color, available size, and number of design areas customizable by an end user). Optionally, the user interface may enable the user to specify what type of print options may be used or made available for a given item. For example, the user interface may enable an item provider to specify whether standard ink, glow-in-the dark ink, and/or embroidery are to be made available to end users to customize a given item.

FIG. 2I illustrates a products user interface via which a user can view a listing of items that the user has authorization to edit, remove, publish, or unpublish. For example, the listing may be products to be offered by an online store associated with the user. The user interface may include data accessed from a database record associated with the user/ user store. A given product listing entry may include a product name and date/time last published. A given product listing entry may include edit, remove, and/or publish controls which when activated will cause the system to respectively enable the user to edit the product via an edit user interface, remove the product entry from the listing and/or store, and publish the corresponding product so that it appears to end users via an interactive catalog. If the product has already been published an un-publish control may presented, which when activated, with cause the product to be removed from the end-user accessible catalog.

Figure 2J:
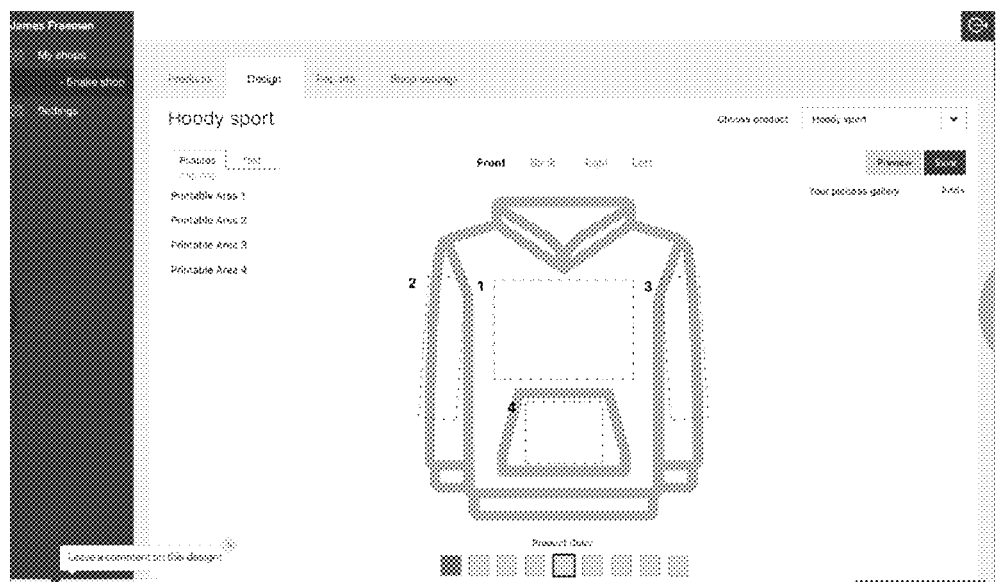

FIG. 2J illustrates an example user interface via which a user (e.g., an item provider) can edit a product corresponding to a product entry (a hoodie jacket in the illustrated example). A similar user interface may be provided to an end user to customize or edit a product design in accordance with permissions and restrictions of the item provider, as discussed elsewhere herein. In this example, the front side of the item is displayed. The front side may be the pre-specified default side that is to be initially displayed. In addition, a menu of sides is provided. The user may select a side from the menu, and the corresponding image of the selected side is displayed by the user interface, with any design areas indicated (e.g., with a border and a design area identifier).

In the illustrated example, the user interface indicates via respective borders, shading/coloring, and identifiers, that the jacket has four design areas that had been specified by the item provider (design area 1—chest, design area 2—muff, design area 3—right sleeve, design area 4—left sleeve). The user interface provides various tools (e.g., an add image control, an add text control). A preview control is provided which when activated, will cause the item to be realistically rendered with any customizations. A save control is provided which when activated will cause the system to save any user customizations. A picture gallery area is presented in association with an "add" image control which when activated enables the user to add an image to the gallery (e.g., by selecting an image from a specified location or by providing a link to an image).

Figure 2K:
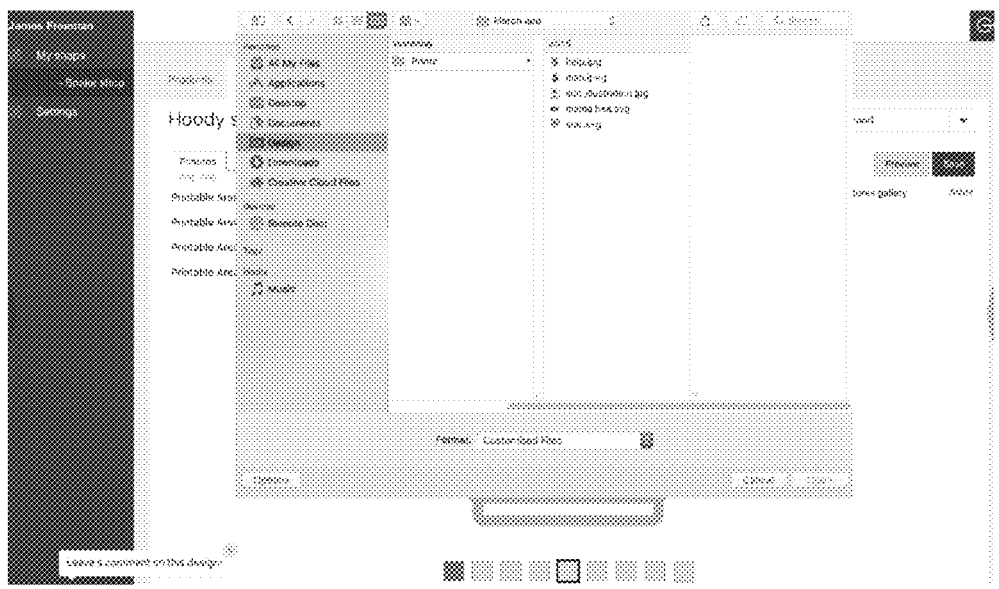

FIG. 2K illustrates an example user image selection user interface presented in response to a user selecting the add image control depicted in FIG. 2J. The user interface accesses and lists image files from a specified location. A given listing may include an image name, an image thumbnail, and/or other data (e.g., last edit date, creation date, image author, etc.). Controls are provided via which the user can navigate to another location to search for and select images.

Figure 2L:
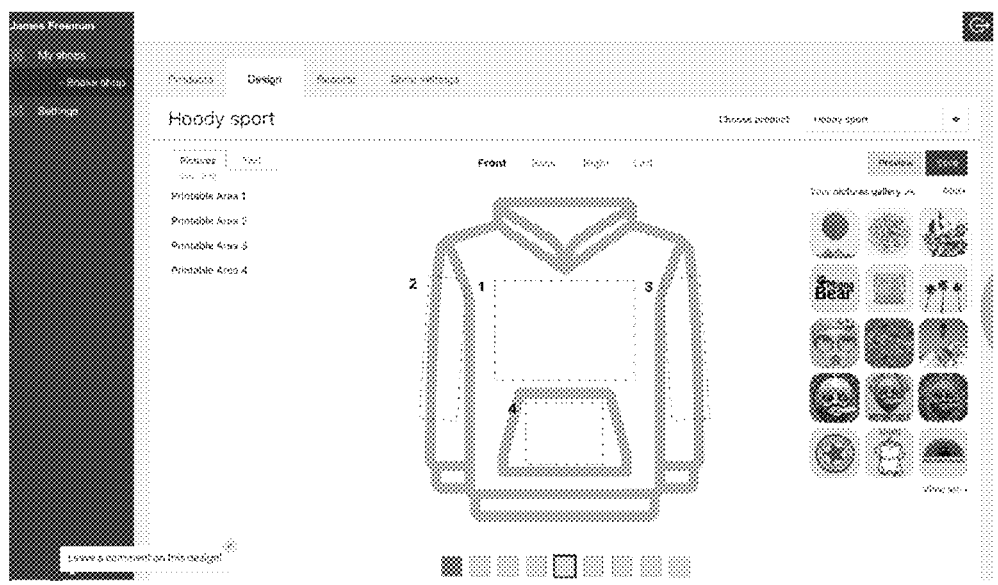
Figure 2M:
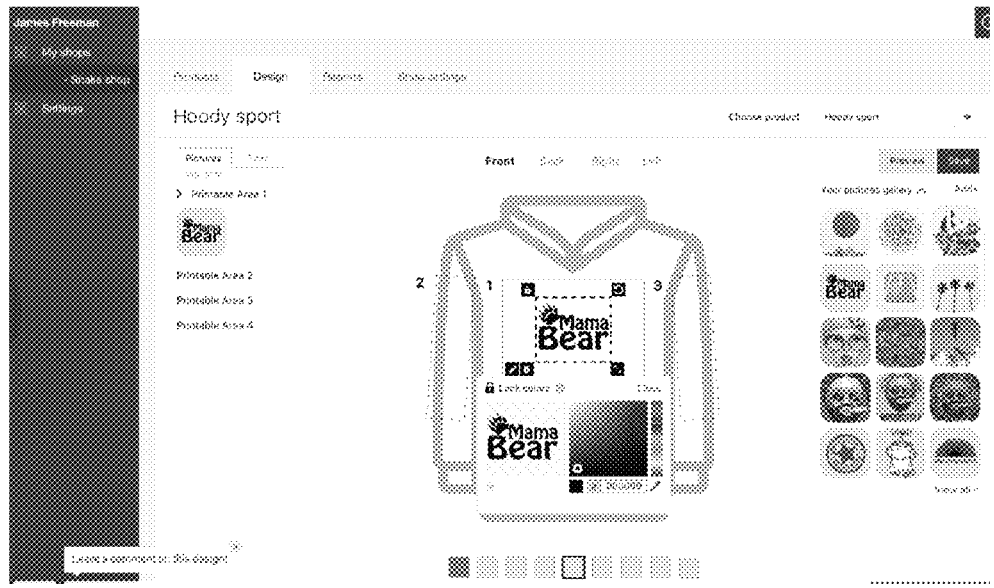

FIG. 2L illustrates the user interface of FIG. 2J with images listed in the image gallery. FIG. 2M illustrates the user interface illustrated in FIG. 2L with an image from the image gallery added to design area 1. The user has selected an add color control and in response, the user interface accesses and presents a color map corresponding to the color selected by the user. The user may select a desired shade from the color map, and the image color will be changed to the selected shade. A lock control is provided which when activated will prevent the image color from being changed unless the lock is unlocked (e.g., by clicking on the lock image and optionally entering a password if such has been set). The user may lock the design to prevent an end user from modifying the locked portions of the design. An interface may be provided via which the user can specify elements to be locked at a very granular level. For example, the interface may enable the user to lock (for a given image and/or text template) size, one or more colors (or all colors), orientation, placement, text content, font, effects, selected portions of an image or text, and/or the like.

Thus, by way of illustrative example, an item provider may specify via a user interface that an end user is not permitted to edit certain aspects of a template text. For example, a user interface may be provided via which the item provider may indicate that the content of a given item of text (e.g., a string of characters) may not be edited by an end user, but that optionally certain other forms of editing (e.g., change of color, font, size, effects, and/or rotation angle) may be permitted.

Figure 2N:
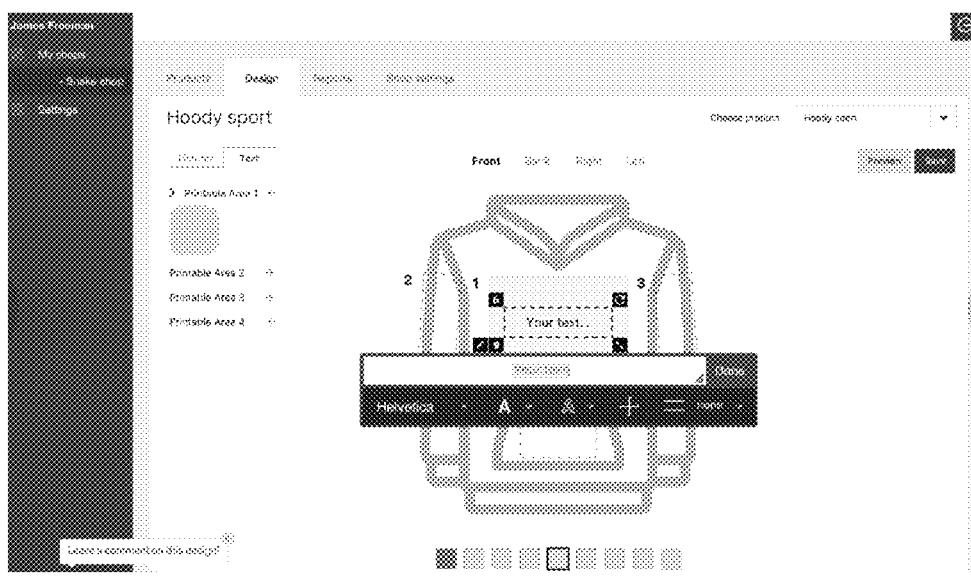

If the user selects the add text control, then the example user interface illustrated in FIG. 2N may be presented. In the illustrated example, the user has selected design area 1 (on the jacket chest), which is highlighted (e.g., via color, shading, and/or change in border from a solid to interrupted/dashed boarder) via the user interface relative to the other design areas to indicate that design area 1 has been selected. A text field is provided, wherein as the user enters text (e.g., using a keyboard, via voice input, or otherwise) the text is displayed in real time in the design area 1. In addition, in this example the user has selected a Helvetica font, selected a regular/default version of the Helvetica font (e.g., not bolded, underlined, struck through, subscripted, or superscripted). Controls are provided via which the user can specify text alignment (e.g., left, right, center), whether the text is to be solid or stenciled, and a text curvature type. Optionally, controls are provided via which the user can specify character and/or line spacing. In addition, in this example a text rotation tool is provided (which enables the user to specify a rotation angle of the text graphically and/or via a specified rotation angle). Optionally, the text is displayed in the design area, as the user enters the text, with the color, hue, saturation, font, alignment, line spacing, character spacing rotation, and/or with effects previously specified by the user. A design area deletion control is also provided which when activated will delete the selected design area from the user's instantiation of the jacket (but not from that of other users or from the interactive catalog). Text formatting changes specified by the user may be reflected in the design area on the image of the jacket in real-time.

Optionally, a user interface may be provided via which a user may upload a custom font (e.g., in the form of a textured watercolor, 3D bubble font, etc.) which may then be used by the item provider and/or an end user. For example, the user interface may enable the user to upload images to be used as fonts (e.g., PNG, SVG, GIF, or other image file). By way of illustration, a user may create images of balloons in the shape of letters. Such images may then be displayed on respective customized keyboard keys rendered on the user device. The user can create sequential "text" characters to form words or phrases by typing them in using the customized keyboard keys. Optionally, a given uploaded character image may be transparent and tools may be provided via which the user can specify or change color, hue, effect, etc. As the user types, the custom font characters may be rendered in real time is a designated design area of the item model.

Figure 2O:
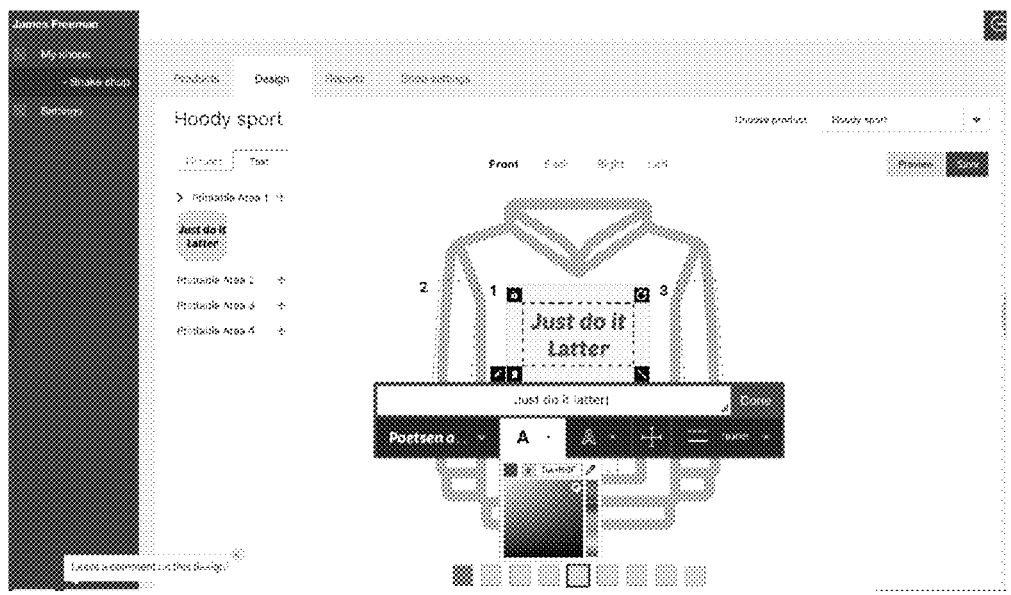

FIG. 2O illustrates the example user interface illustrated in FIG. 2N with a color map displayed in response to the user selecting the character color control. The user interface accesses and presents a color map corresponding to the color selected by the user. The user may select a desired shade from the color map, and the text color will be changed to the selected shade. The user may specify which aspects of the text and/or text formatting and effects may not be modified by an end user. For example, a lock control is provided which when activated will prevent the text color from being changed unless the lock is unlocked (e.g., by clicking on the lock image and optionally entering a password if such has been set).

Figure 2P:
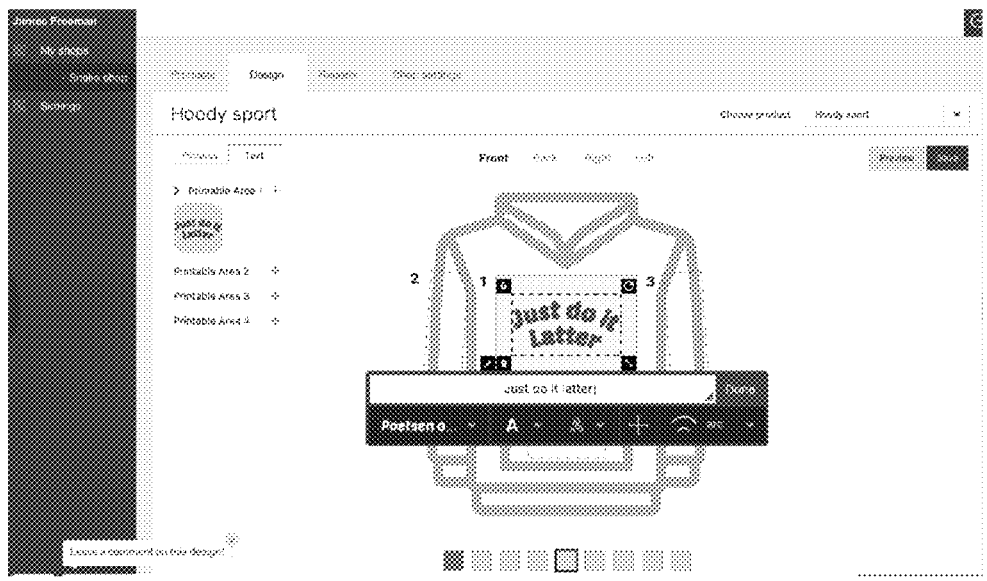

FIG. 2P illustrates the example user interface illustrated in FIG. 2O with the text curved in response to the user activating the convex text curvature control.

Figure 2Q:
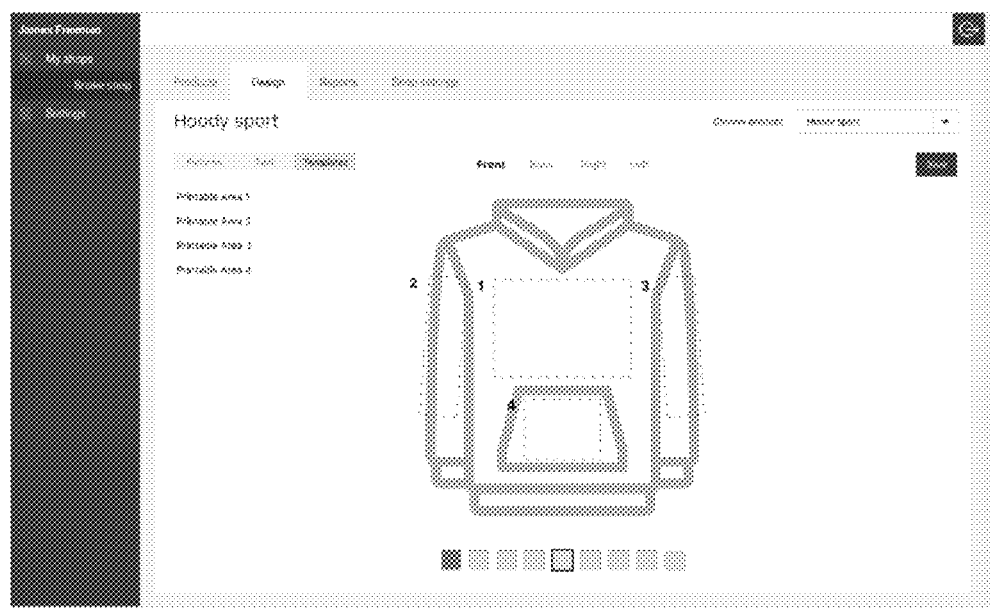

FIGS. 2Q-2Z illustrate additional user interfaces which enable an item provider to create or specify an item and create templates. FIG. 2Q illustrates a user interface with four defined design areas (referred to in the user interface as printable areas). The design areas are visually outlined on respective areas of the product. In addition, a textual list of the design areas is provided (Printable Area 1, Printable Area 2, Printable Area 3, Printable Area 4, in this example). A "choose product" menu enables the user to switch products displayed by the user interface. A side menu enables the user to select a view of a product side (e.g., front side, back side, left side, right side). Tabs ("Pictures", "Text", "Templates" tabs) are provided via which the user can specify or create pictures, text, or templates to add to design areas. In this example, the user has selected the "Templates" tab. To customize a given design area, the user may select a design area (e.g., by clicking on or otherwise selecting the design area).

Figure 2R:
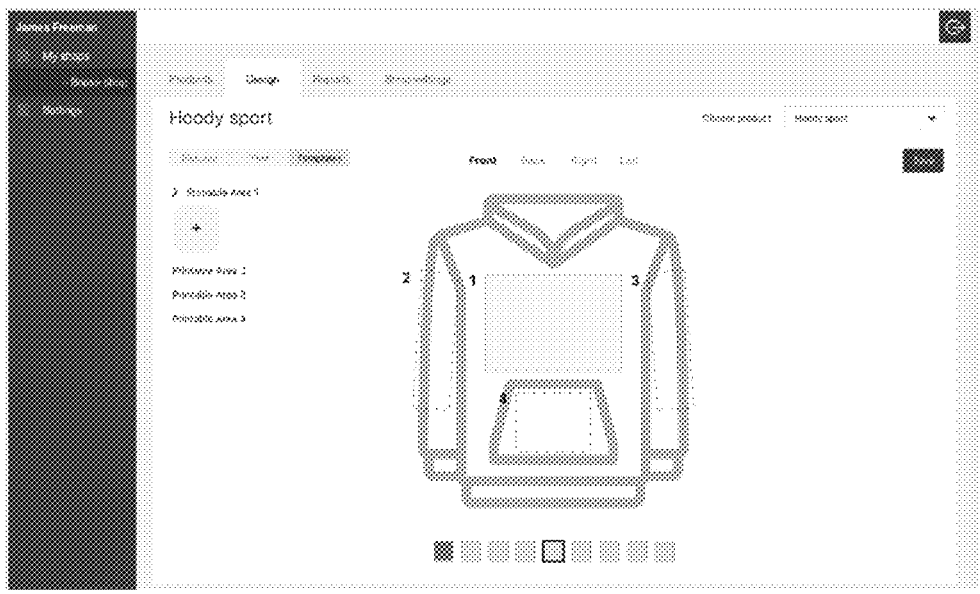

As illustrated in FIG. 2R, in response to the user selecting a design area (Printable Area 1 in the illustrated example), an indicator is displayed in association with the corresponding design area name in the design area list (via a "+" symbol in the illustrated example), and the design area itself is highlighted (e.g., via a change of the border from a broken border to a solid border, and via a change in shading of the design area).

Figure 2S:
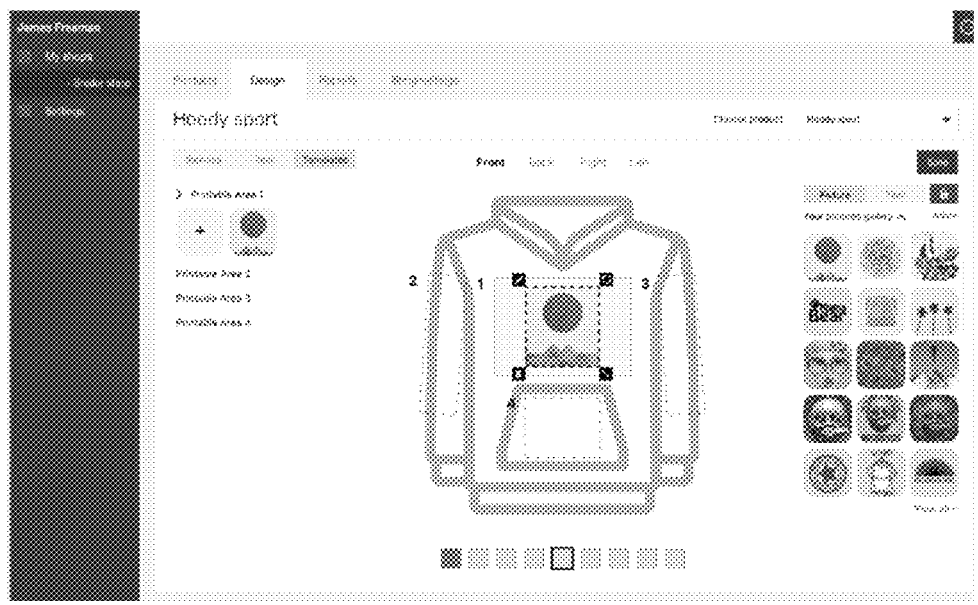
Figure 2T:
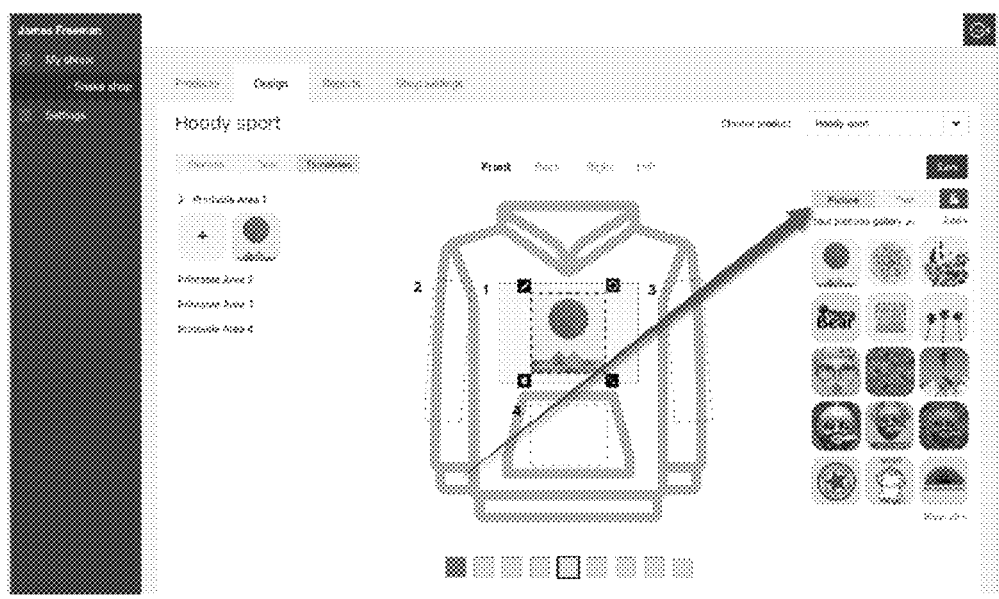

As illustrated in FIG. 2S, in response to the user selecting the selected design area indicator (the "+" symbol in this example), add "Picture" and add "Text" controls are displayed (in the form of tabs), in addition to a "lock template" control (in the form of a lock icon). As illustrated in FIGS. 2S, 2T, in order to add an image to the selected design area, the user may select the "Picture" control, as illustrated. In response, a gallery of images is displayed via the user interface. The user can drag and drop one or more images from the gallery to one or more design areas. In the illustrated example, the user has dragged and dropped one image to Printable Area 1.

Figure 2U:
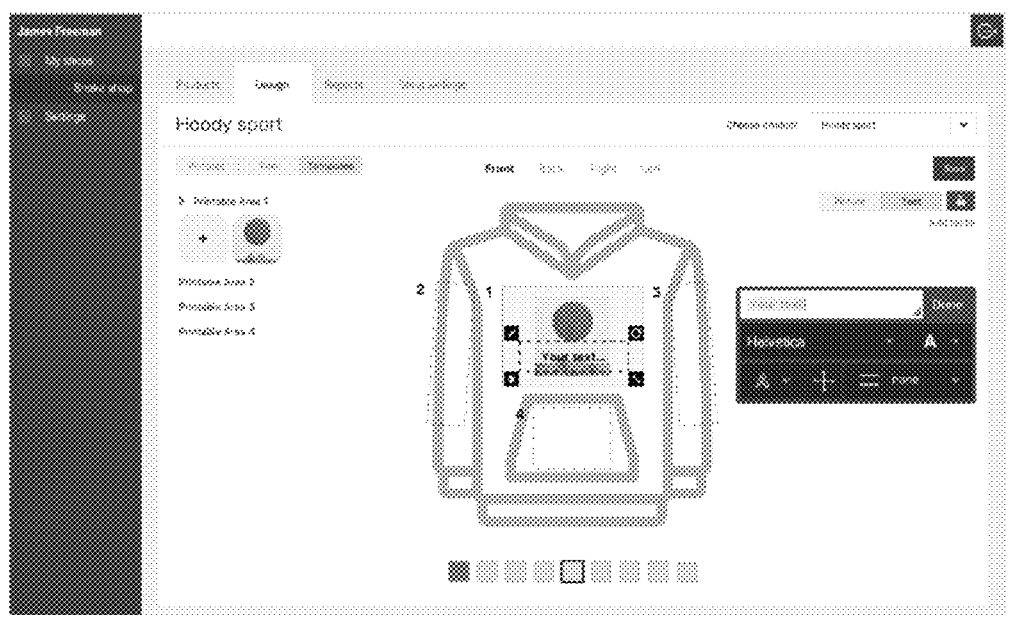
Figure 2V:
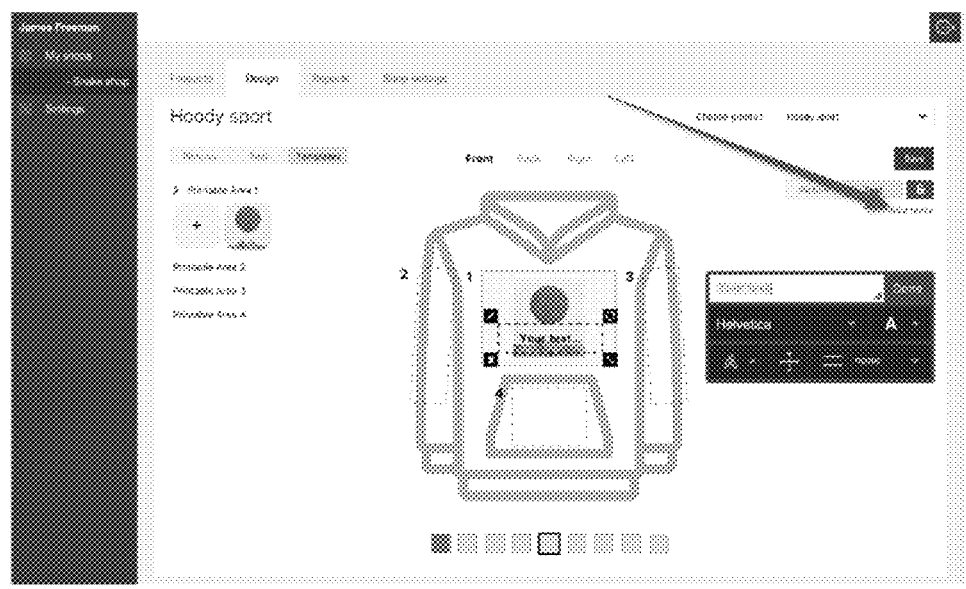
Figure 2W:
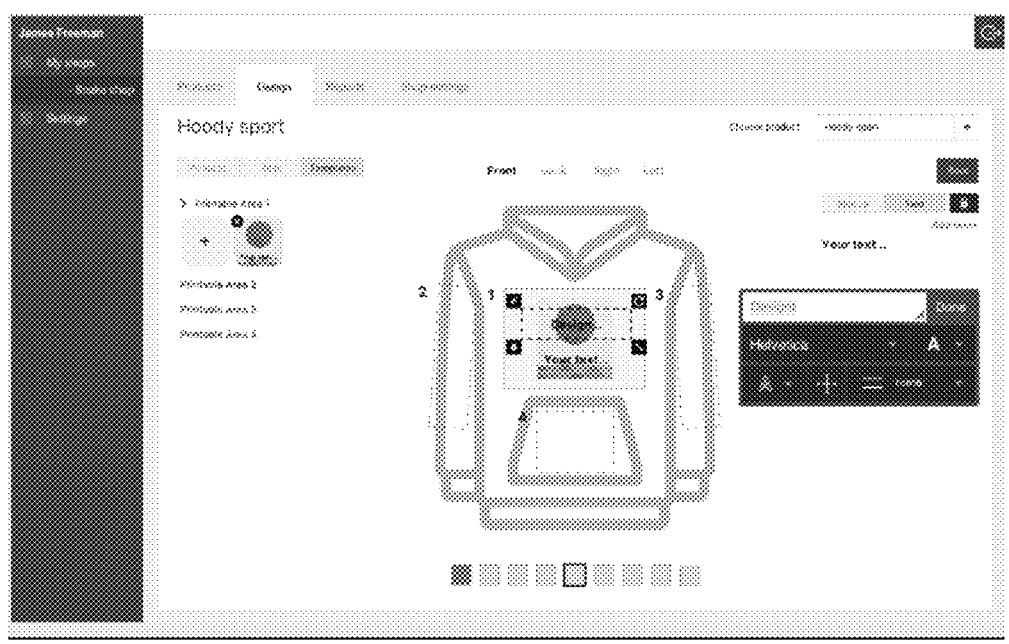

As illustrated in FIGS. 2U, 2V in order to add text to a design area, the user selects the "Text" control. In response, a text user interface is displayed. The text user interface includes a field for receiving text, a font menu, a size menu, a text alignment menu (e.g., left, right, center), a control via which the user can specify whether the text is to be solid or stenciled, and a text curvature menu. Optionally, controls are provided via which the user can specify character and/or line spacing. A text area border is displayed in the selected design area (Printable Area 1 in the illustrated example). As the user enters text, the text is rendered in both the text field and in the text area in the selected design area at the same time. If the user wants to add another text area to a design area, the user may select the "add text" control and another text area border will be displayed in the selected design area. Thus, multiple images and multiple text phrases may be added to the same design area. The user may specify the layer order. For example, the user may specify if a text entry is to overlay an image (or a portion thereof), or whether the image (or a portion thereof) is to overlay the text entry. FIG. 3W illustrates an example where the user added two text areas overlaying an image in Printable Area 1.

Figure 2X:
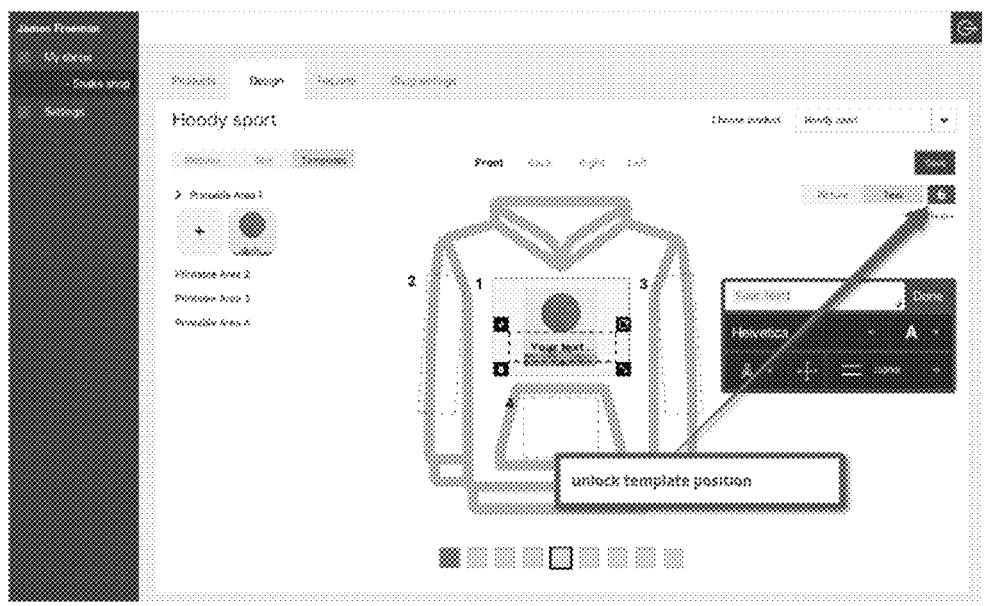
Figure 2Y:
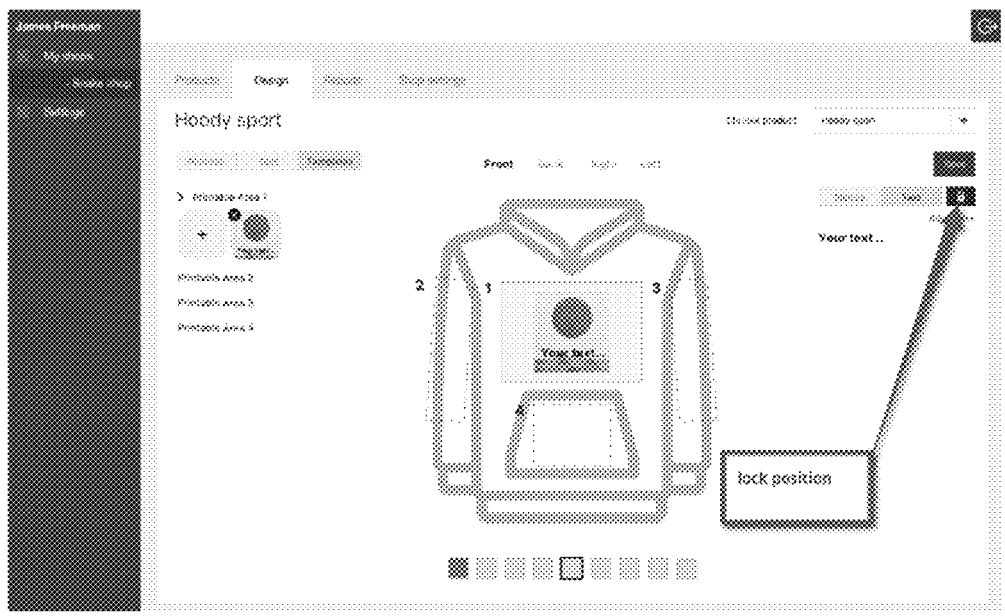

As illustrated in FIG. 2X, 2Y, the user can lock or unlock a template for each design area by selecting the design area and then selecting the lock control. For example, if the template is unlocked, selecting the lock control will lock the template. If the template is locked, selecting the lock control will unlock the template.

Figure 2Z:
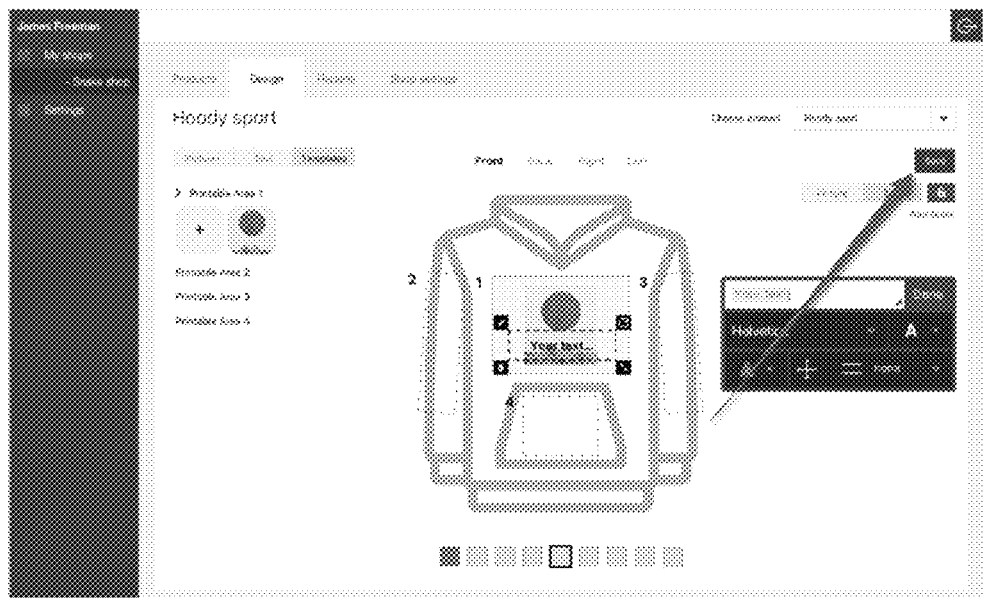

As illustrated in FIG. 2Z, the user can activate the save control to save the template. Optionally, a separate publish control is provided which when activated makes the template available to end users (e.g., via one or more interfaces described elsewhere herein).

Optionally, a user interface may be provided which enables an item provider to specify an expiration date/time for a given template (which may include an image and/or text). For example, a user interface may be provided which includes a date field and/or a time field that enable an item provider to specify for a given template a date and/or time at which the template is to no longer be made available to end-users for use in customizing an item. Optionally, fields may be provided that enable an item provider to specify a number of days and/or hours after which the corresponding template is to no longer be made available to end-users.

Optionally, the user interface may enable the item provider to select multiple displayed templates (e.g., by selecting respective check boxes displayed in association with a template and/or a template name) and associate a single expiration date/time with a set of selected templates. Item provider inputs associated with setting an expiration period may be stored and utilized as described herein.

Optionally, a user interface may be provided via which the item provider can specify a process for handling scenarios where an end user is still in the process of applying a template to an item model, editing a template selected for an item model, or ordering an item customized with a template, upon the occurrence of an expiration event. For example, the user interface may enable the item provider to specify that the expired template may no longer be used to customize an item as soon the expiration date/time is reached. Optionally, the user interface may enable the item provider to specify that the expired template may be utilized to customize an item for a certain period of time (e.g., 10 minutes, 1 hour, 1 day, or the like) after the expiration date/time is reached if an end user is already in the process of applying, editing, and/or ordering an item with the template. Optionally, a countdown timer may be provided for display to the user that indicates how long the user has before an item customized with the expired template may no longer be ordered.

Such expiration periods may be used to heighten interest in templates or may be tied to expiration of a license to such templates. For example, an item provider may want to tie the availability of a given template to a given real world event, such as a sporting event or concert tour, wherein after the event is over, the corresponding template(s) are no longer to be made available to end users.

Optionally, different design elements may be associated with different prices specified by an item provider. For example, a licensed design element of a cartoon character may be more expensive than a design element that uses a public domain graphic or photograph. Thus, a user interface may be provided via which the item provider may specify a price for an individual design element, for a selection of design elements, or for all design elements. The user interface may also enable the item provider to associate a tag (e.g., an icon) reflective of the price. For example, a single star may correspond to the least expensive design elements, two stars may correspond to medium-priced design elements, and three stars may correspond to high-priced design elements. The tags may be displayed to an end user in association with respective design elements in a gallery of design elements.

Figure 3A:

FIG. 3A illustrates an example user interface that may be presented to an end-user that wants to customize an item offered by an item provider. The example user interface may display a catalog of items offered by a single item provider (e.g., selected by the user from a listing of item providers) or by multiple item providers. A given entry in the user interface may include a corresponding item image, a short description, an indication as to available colors, an indication as to available size, and/or an indication as to the location of one or more customizable design areas. The item images may have been previously uploaded or selected by the item provider and designated as default images.

Figures 1, 3B:

Referring to FIG. 3B-1, illustrating an item customization user interface, in this example, the user has selected a hoodie sport jacket. In this example, an image corresponding to the front side of the jacket is accessed from memory and displayed as a default side, optionally in an item provider specified default color or a color specified by the user. The image may be a two dimensional or three-dimensional model (where the surface of a depicted item is rendered in three dimensions).

For example, as similarly discussed above, a three-dimensional model of an item may utilize points in three-dimensional space, connected by triangles, lines, curved surfaces, or the like. Texture mapping may be utilized to define surfaces of the 3D model. The 3D model may be a solid model or a boundary model (which may be constructed using a mesh).

Optionally, the model may be provided using WebGL (Web Graphics Library) which utilizes a JavaScript API (which may be used with HTML5) to render an interactive 3D or 2D graphic. The interactive 3D model may enable the user to spin the model, rotate the model in any direction, scale the model in or out, add text or graphics to the model, and/or animate the model. For example, a user interface may enable the user to manipulate the model via touch or via discrete spin, rotate, scale controls. Optionally, the model of an item will automatically rotate around an axis when a user selects the item (e.g., from a catalog).

By way of illustrative example, if the item is a jacket, the image of the jacket may be a 3D image of the jacket in a worn state, as if draped over a torso. For example, the front of the jacket may be curved as if conforming to a human chest. A design element (e.g., text and/or an image) may be configured to appear curved when applied to a curved portion of a 3D model. Optionally, the image of the item (e.g., a jacket) may be continuously rotated around a vertical axis when presented to the user so that the user can view the front, back, left and rights sides of the item, as illustrated in FIGS. 3B-2, 3B-3, and 3B-4.

By way of further illustrative example, if the item is a shoe, the model of the shoe may be animated to demonstrate how the shoe flexes when being worn and used to run.

The front side may be the pre-specified default side that is displayed. In addition, a side selection control is provided. The user may activate the side selection control to scroll through (or otherwise select from) available side images, where the corresponding image of the selected side is displayed by the user interface, with any design areas indicated (e.g., with a border and/or a design area identifier). In the illustrated example, the user interface indicates via respective borders, shading/coloring, and identifiers, that the jacket has four design areas that had been specified by the item provider (design area 1—chest, design area 2—muff, design area 3—right sleeve, design area 4—left sleeve). The user may select (e.g., by clicking on) a design area to add to or modify the design area. A toggle control may optionally be provided which when activated by the user causes the design area indicators (e.g., borders) to turn on or off (where when a toggle off command is issued, the design area indicators are not displayed).

Controls are optionally provided which when activated enable the user to command the user interface to display a description of the item, change the size of the item (e.g., XS, S, M, L, XL, 2XL, etc., where the size information may include gender an age information (e.g., unisex, men, women, juniors, youth, toddler, infant)), change the color of the item, and/or display a menu of available products. An item cost may be accessed from memory or calculated and displayed. A control may be provided via which the user can add the item to the user's shopping cart.

Figures 2, 3B:
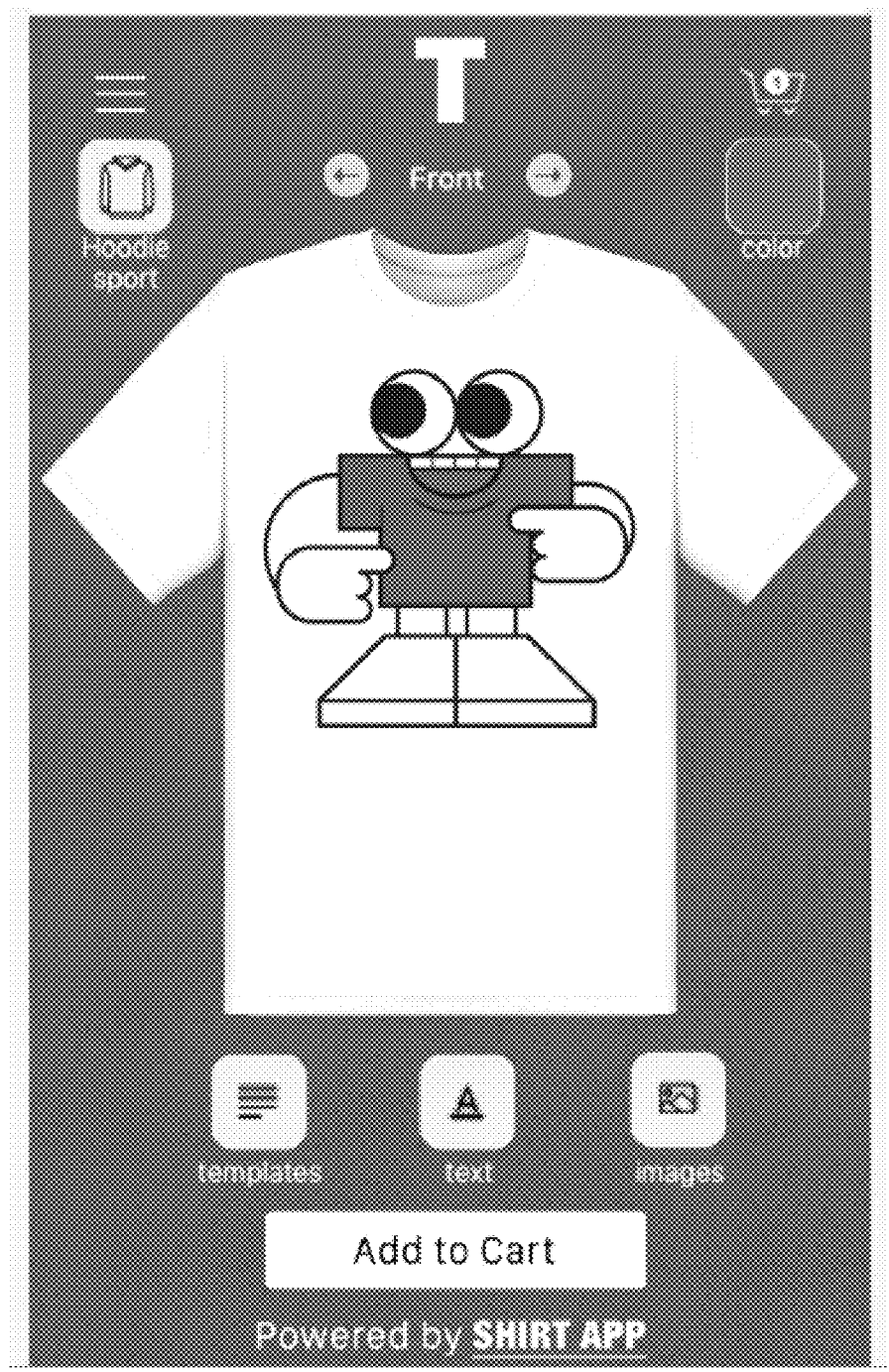
Figures 3, 3B:
Figures 3, 3B, 4:
Figures 3, 3B, 4:
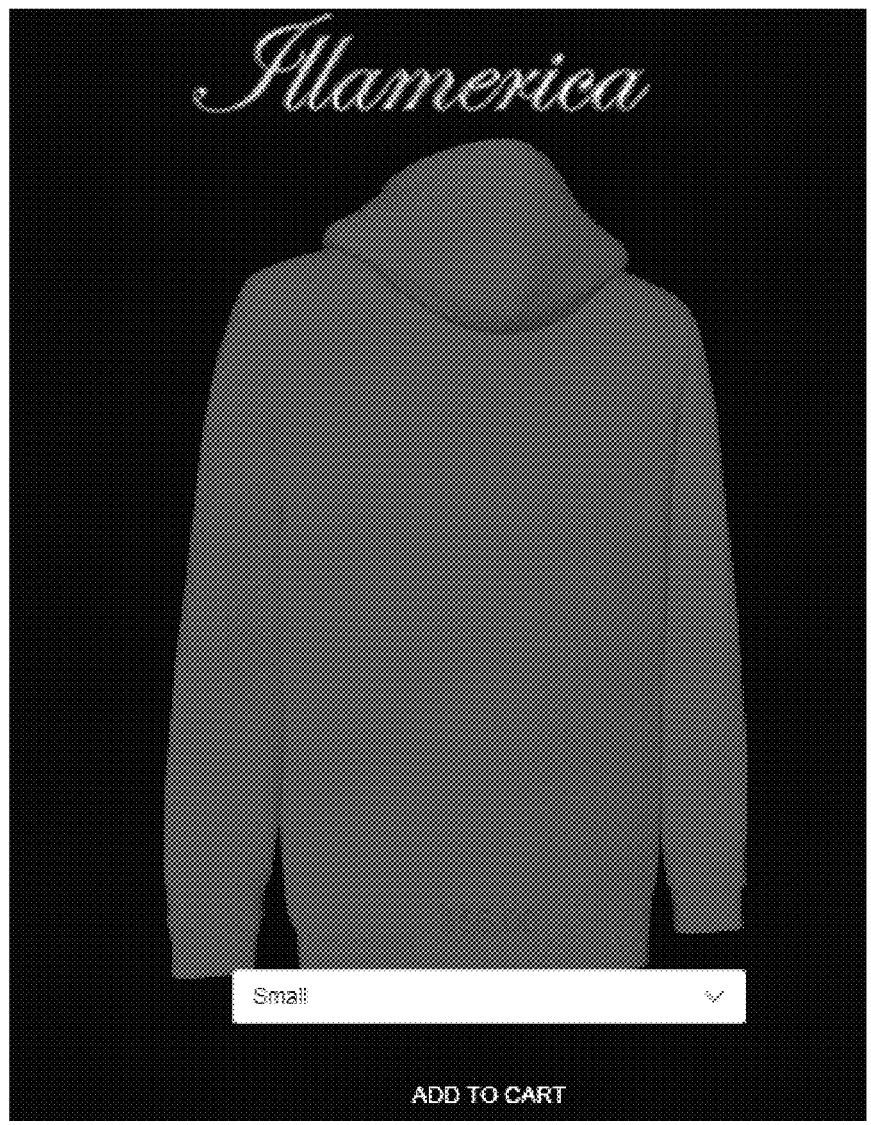

FIG. 3B-2 illustrates another example item customization user interface. In this example, the size and description controls are not displayed, and a template control is provided. When the user selects the template control, a gallery of templates may be displayed as described elsewhere herein. In this example, the item provider has specified a header logo and a background associated with a character (e.g., a cartoon character) included on the item and associated with the item provider store.

Figure 3C:

Referring to FIG. 3C, in this example, the user has selected the description control, and in response, the user interface provides a textual description of the item (e.g., the item material(s), a description of the color type, cuff type, and hem type, and an article number (e.g., a sku)), which may have been provided by the item provider.

Figure 3D:

In response to the user selecting a design area (e.g., design area 1 on the chest), the example user interface illustrated in FIG. 3D may be presented. The selected design area is highlighted (e.g., via color, shading, and/or change in border from a solid to interrupted/dashed boarder) via the user interface relative to the other design areas to indicate that the design area (e.g., design area 1) has been selected. The user interface provides various editing tools (e.g., an add template control, an add image control, an add text control) to enable the user to customize the selected design area. A save control may be provided. In response to the user selecting the save control, the information corresponding to the user interface may be saved for later access.

Figures 1, 3E:
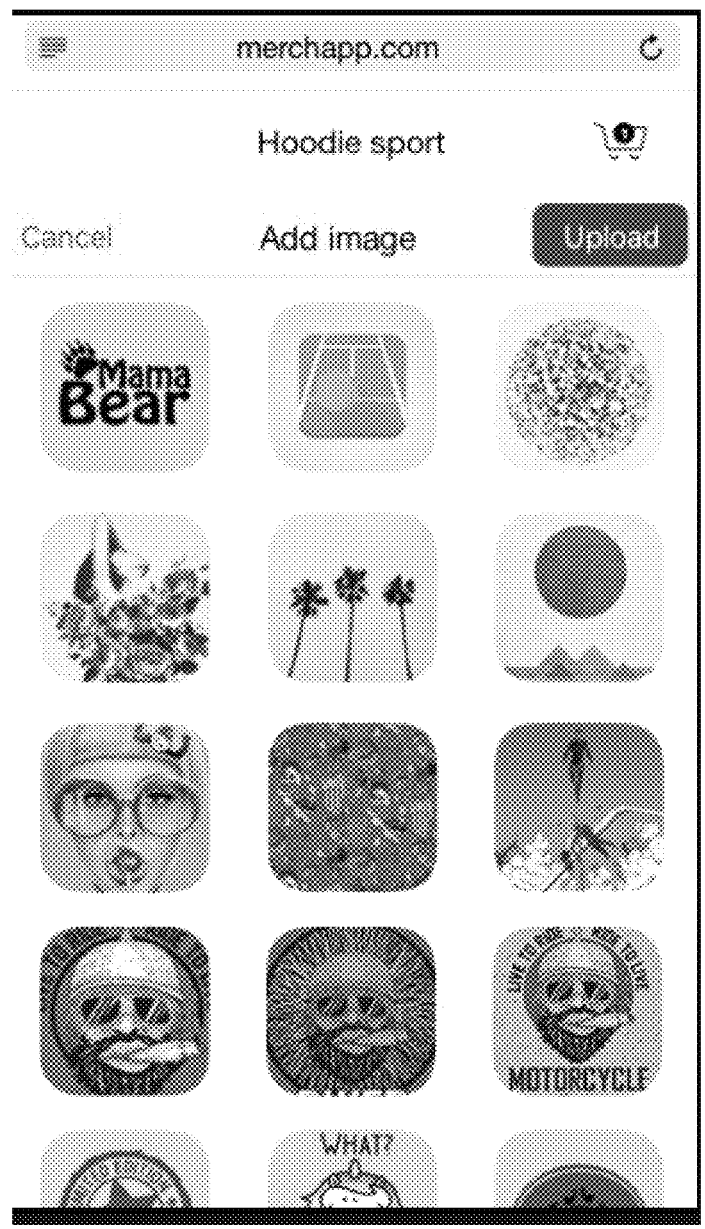
Figures 2, 3E:
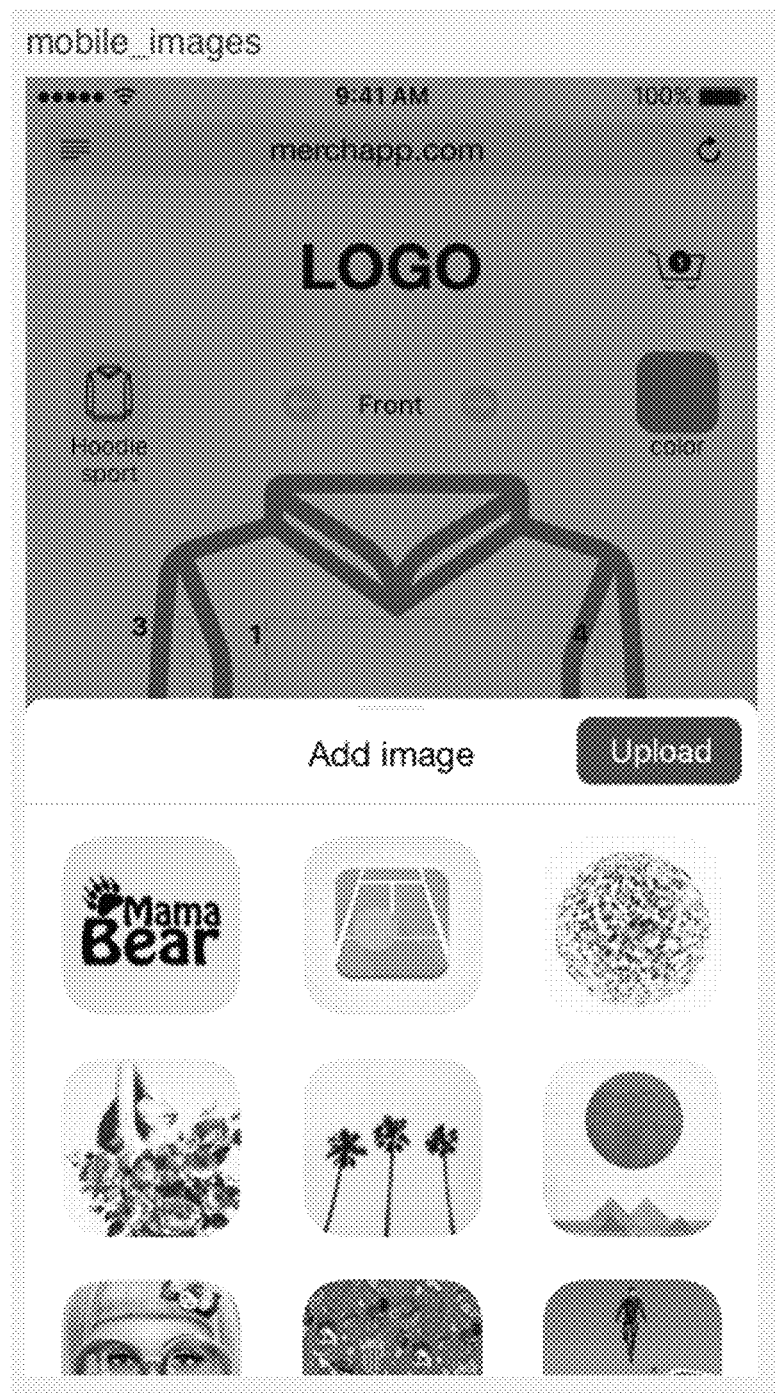
Figures 3, 3E:

In response to the user selecting the images control, the example user interface illustrated in FIG. 3E-1 may be presented. Controls are provided via which the user can upload an image to be added to the item or the user can select an image from a displayed gallery of image templates (e.g., by clicking on or pointing at an image template), which may optionally have associated text, which may include editable text and/or non-editable text.

The gallery of images may be organized in order of popularity (e.g., most popular in the last specified number of hours/days or overall), newness, exclusivity (where images that are only available for printing on products via the system are displayed first or last), soonest to become unavailable (e.g., where a given image may be associated with a date/time at which the image will no longer be available to print on the item), cost (where certain images may be associated with a higher cost than other images), user ratings, or otherwise. A control may be provided via which a user can specify which criteria are to be used to order the image templates. A control may be provided via which a user can specify the ascending or descending ordering for the selected criteria. For example, if the user selects newness as the ordering criterion, the user may activate an ascending/descending control to cause the user interface to present the newest template first, the second newest template second, and so on, or to present the oldest template first, the second oldest template second, and so on.

A filter control may be provided to cause only templates meeting specified filter conditions to be presented. For example, a filter may be specified so that only templates that have a specified future unavailability date are to be displayed. By way of further example, a filter may be specified so that only exclusive templates are to be displayed. By way of further example, a filter may be specified so that only templates whose color, size, orientation, text, subject matter (e.g., sports, music, movies, etc.), and/or other specified feature, are user-editable are to be displayed. A given filter control may be in the form of a slider control (e.g., slide slider to one side to see all the templates, slide to the other side to see only the most expensive templates, slide to the middle to average prices templates), a text field, a menu entry, or otherwise.

Optionally, the system may automatically filter out certain templates. For example, the system may filter out templates associated with expiration dates/times that have passed or will pass within a threshold period of time (e.g., the next 30 seconds, 1 minute, 5 minutes, or other threshold period of time). The system may filter out templates that are not permitted for use on the item or for the selected design area.

By filtering out unavailable templates and/or templates that do not meet certain criteria, the amount of network bandwidth needed to transmit the templates to the user device is reduced, the amount of user device memory needed to store the templates is reduced, and the amount of display area needed to display templates is reduced.

Optionally, the gallery of image templates may include a corresponding listed expiration date/time for those image templates that are associated with an expiration date/time. Optionally, a continuously updated countdown clock may be displayed in association with a given template or set of templates that reflects the corresponding expiration date/time. The countdown clock may textually display the number of days and/or hours/minutes/seconds until the expiration date/time will be reached.

Optionally, a given template may be displayed in association with its corresponding cost. Optionally, tags (e.g., a number of stars) may be displayed to an end user in association with templates that indicate cost levels.

The user interface may specify that the uploaded image be in a scalable vector graphics (SVG) format which is defined in an XML text file. The system may locate and edit a color entry in the text file to correspond to a color specified by the user, thereby causing the color of graphic added to the design area to be the specified color (e.g., via fill, stroke, and/or other properties). The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). In the illustrated example, a color map is provided via which the user can point to a desired color, and the corresponding numerical value (e.g., a hexadecimal value) will appear in color name field. The numerical color value may be edited by the user.

Optionally, a user interface may be provided (e.g., in the form of a drop down or pop-up user interface) that indicates restrictions with respect to a given image template. For example, the user interface may indicate where the image template may be used (e.g., only on a breast pocket), whether the size may not be changed, whether the height/width ratio may not be changed, whether one or more colors cannot be changed, other restrictions discussed herein, etc.

FIG. 3E-2 illustrates the user interfaces corresponding to FIGS. 3D and 3E-1, where a portion of the gallery of images may be displayed overlaying the user interface of FIG. 3D so that the user can efficiently view at least a portion of the item being edited and the gallery images at the same time. An interface may be provided via which the user can cause the gallery of images or the user interface of FIG. 3D to be displayed in full screen or near full screen mode, as illustrated in FIG. 3E-3.

Figure 3F:
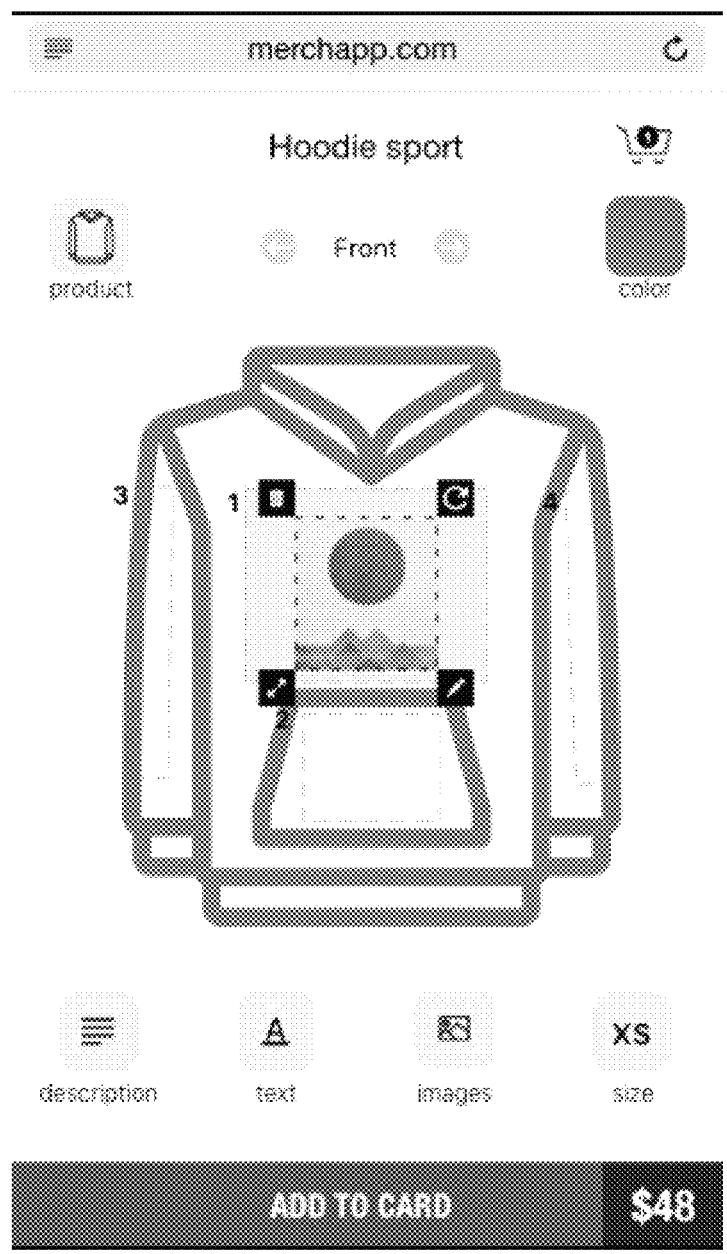

FIG. 3F illustrate an example user interface with an image added to the selected design area in response to the user selecting the corresponding image from the gallery illustrated in FIG. 3E. Controls are provided via which the user can instruct the user interface to rotate the image, change the size of the image (e.g., by dragging a corner or side of an image), edit the image (e.g., change the color of the image), straighten image, center image in the design area, center the image in a feature of the item (e.g., in the center of a pocket), or delete the image. In addition a color control is provided via which the user can instruct the user interface to change the color image. A toggle control may optionally be provided which when activated by the user causes the design area indicators, editing controls displayed over the item image, and/or any added images/text to turn on or off (where when a toggle off command is issued, the design area indicators, editing controls displayed over the item image, and/or any added images/text are not displayed).

Figure 3G:
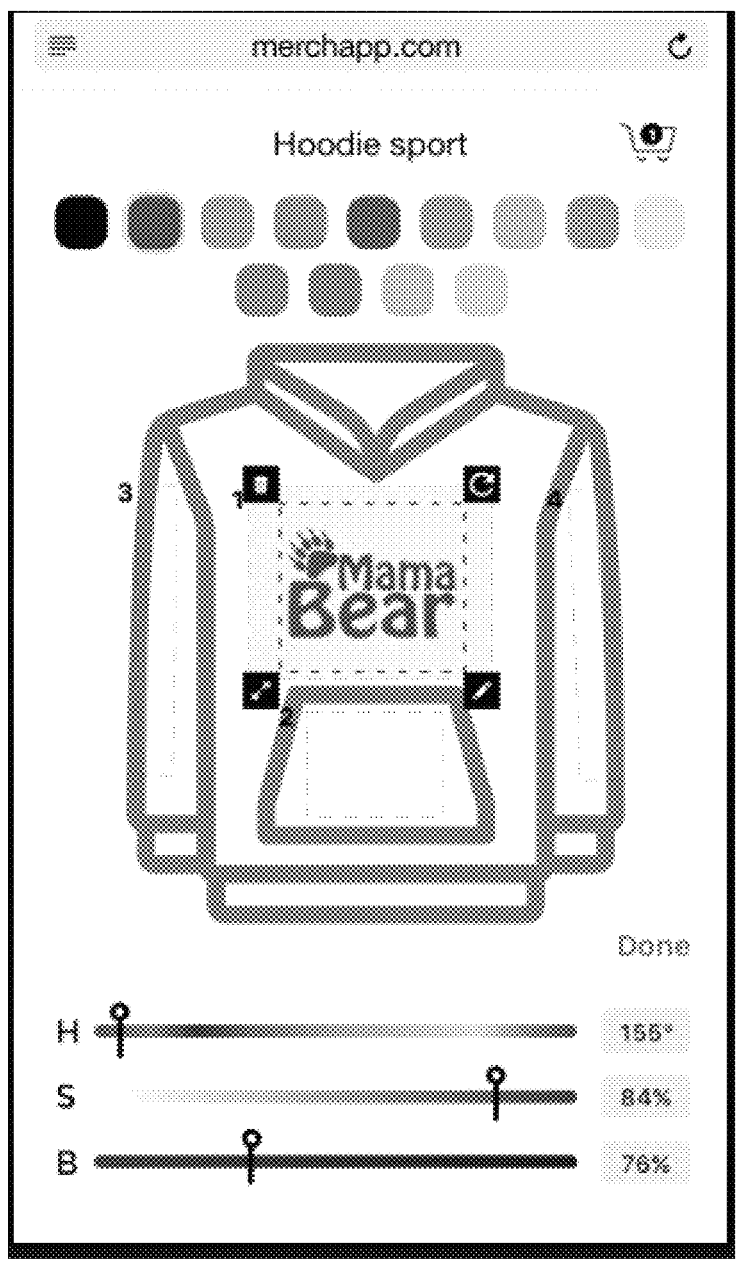

If the user selects the color control, the example user interface illustrated in FIG. 3G may be displayed. The example user interface displays a palette of colors from which the user can select a desired color. The palette may have been specified by the item provider. The color of the image is changed in real time to the color selected by user. Controls (e.g., slide controls) are provided via which the user can specify hue, saturation, and brightness for the selected color. The hue slide control depicts a continuum of hues for the selected color. The hue number corresponding to the hue slider position is determined and displayed. The saturation slide control depicts a continuum of saturations for the selected color. The saturation percentage corresponding to the saturation slider position is determined and displayed. The brightness slide control depicts a continuum of brightness for the selected color. The brightness percentage corresponding to the brightness slider position is determined and displayed. Changes in hue, saturation, and brightness specified by the user via respective controls are displayed in real time in the image depicted in the design area (e.g., the image on the hoodie jacket image). When the user selects a done control, the user settings are saved in memory.

Optionally, a control may be provided via which a person can isolate a portion of the image and remove a specified color from the portion. For example, if an image has a black background, the control may be used to remove the black background or change the color of the black background (without affecting other black colored portions of the image).

Figure 3H:
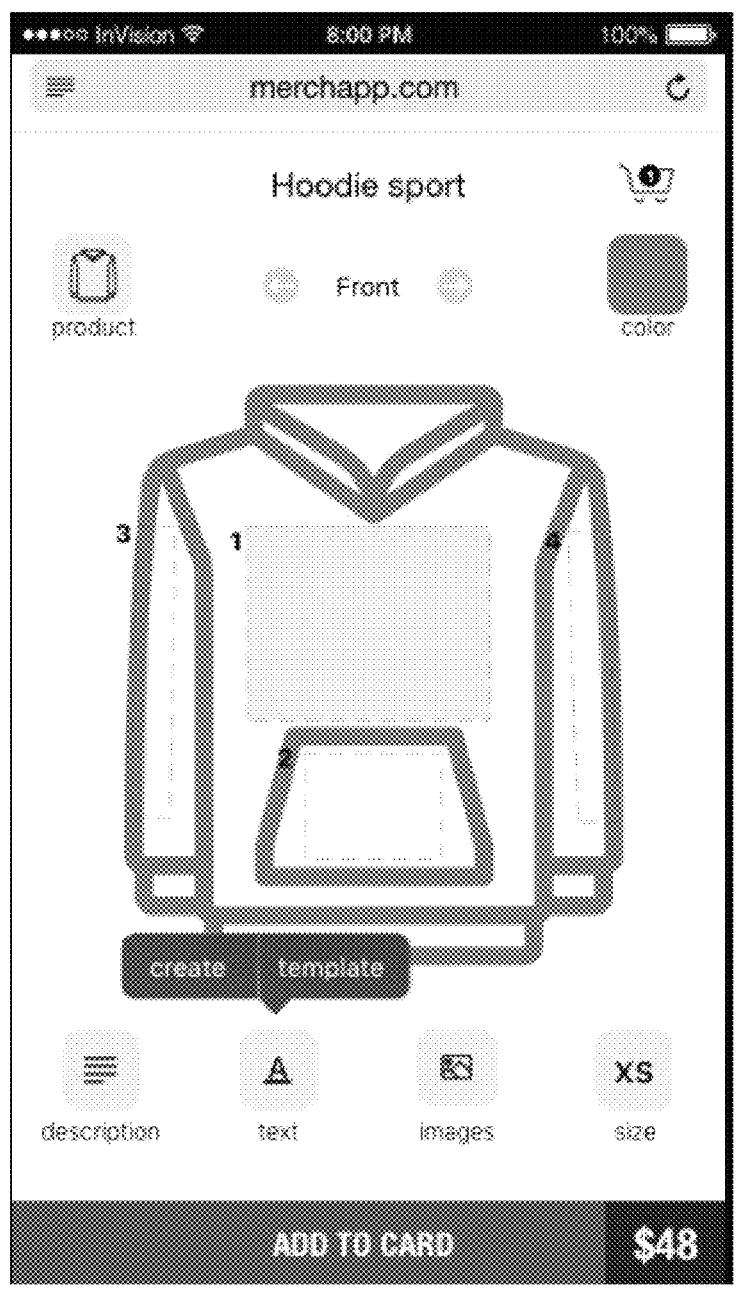
Figure 31:

In response to the user selecting the text control illustrated in FIG. 3D, the example user interface illustrated in FIG. 3H may be presented. A "create" control and "template" control are displayed. When the user selects the "create" control a user interface is displayed via which the user can enter the user's own text.

If the user selects the "template" control a gallery of templates, as illustrated in FIG. 3I, previously entered by the item provider (e.g., an online shop owner) via which the user can select and add a template (e.g., text/phrases), created by item provider for users to add to the item provider's products. When the user selects a done control, the user settings are saved in memory. The user can select the cancel control to cancel the template add operation. The user can select the create control to enter the user's own text. Optionally, a given template may include a visual watermark (e.g., of the item provider, the owner/licensor of a template (or character or phrased in the template) to prevent or hinder an unauthorized use of the template. However, when the template is printed on a product, the watermark is not visibly present.

Figure 3J:
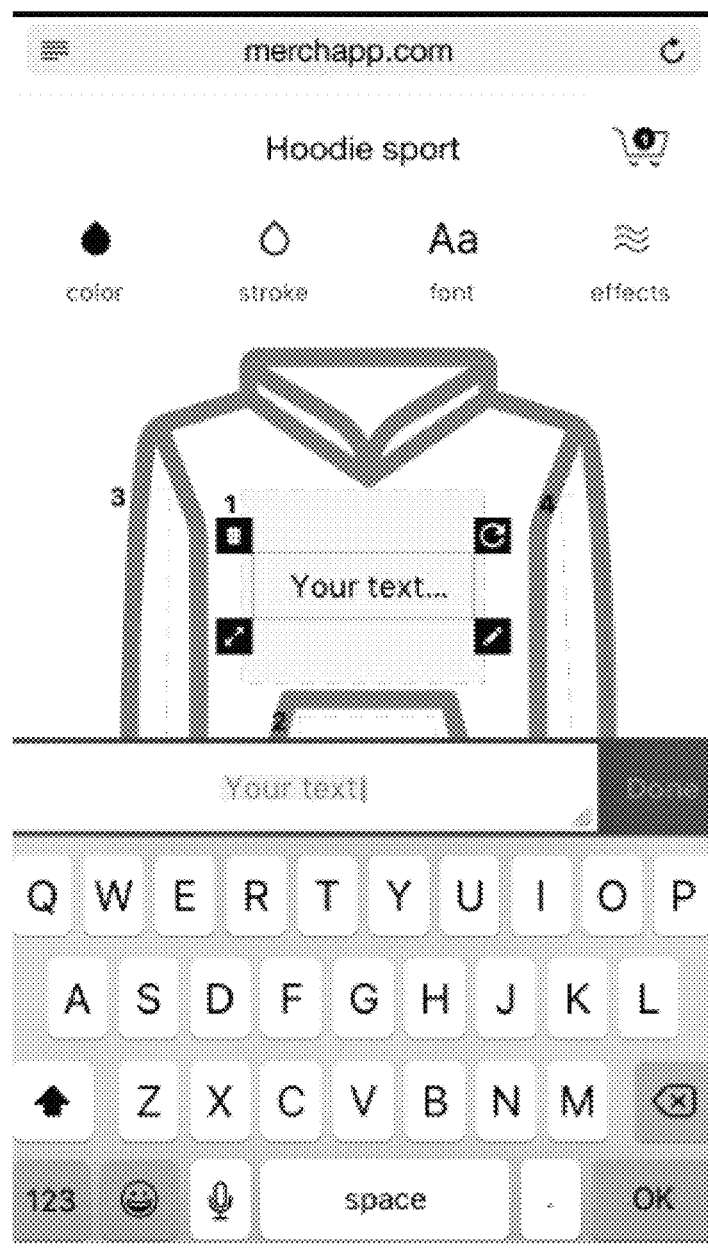
Figure 3K:
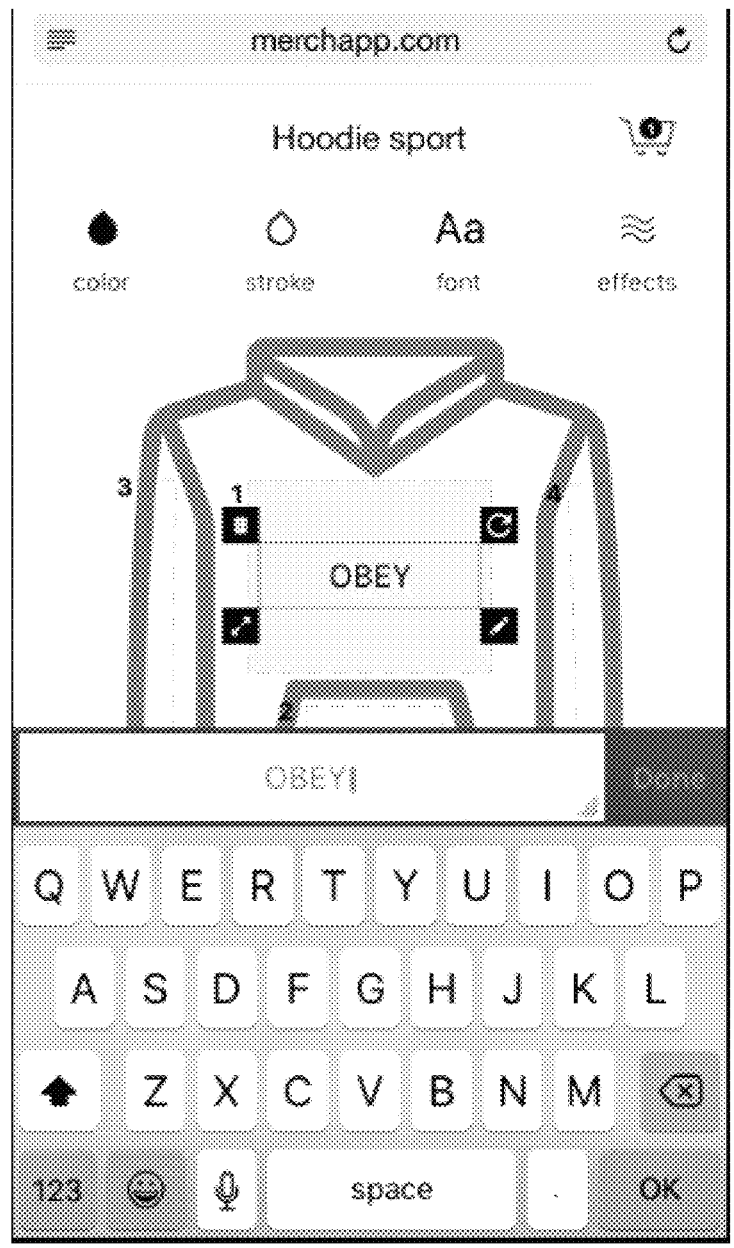

FIG. 3J illustrates an example text entry user interface including a keyboard and a text field. As the user types (via the keyboard) or otherwise enters text, the user interface displays the text in real time in the text entry field and in the selected design area, optionally with the color, hue, saturation, font, alignment, line spacing, character spacing rotation, and/or effects previously specified by the user. In response to the activating the "done" control, the user interface may be modified so that the keyboard slides away and enables the item to occupy a larger percentage of the user deice display. Controls are provided via which the user can instruct the user interface to rotate the text, change the size of the text (e.g., by dragging a corner or side of the design are or specifying a font size), edit the text (e.g., change the color of the text), or delete the text. A control is provided via which the user can change and select the color of a text border. FIG. 3K illustrates the user interface of FIG. 3J with user entered text displayed in the text entry field and the design area. When the user selects a done control, the user settings are saved in memory.

Figure 3L:
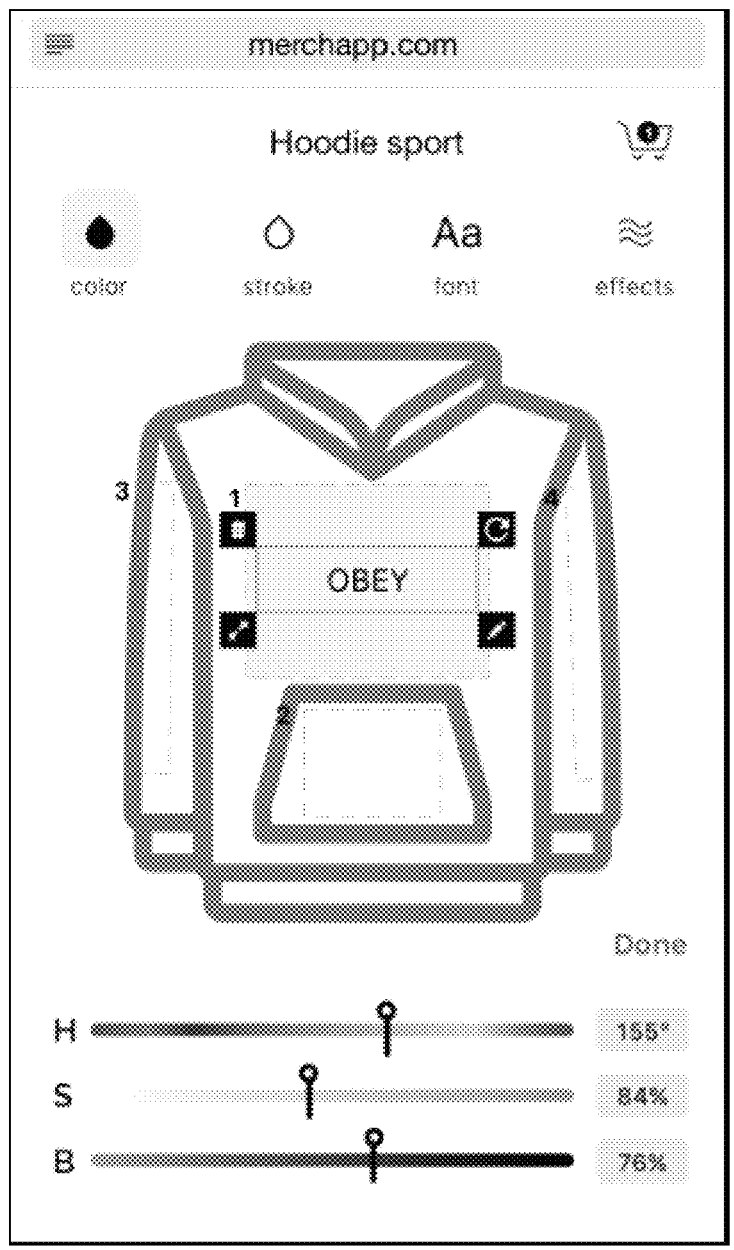

FIG. 3L illustrates the example user interface of FIG. 3K, where the user has selected the color control. The example user interface displays a palette of colors from which the user can select a color for the text in the selected design area. The text color is changed is real time to the color selected by user. Controls (e.g., slide controls) are provided via which the user can specify hue, saturation, and brightness for the selected color, as similarly discussed above. The hue slide control depicts a continuum of hues for the selected color. The hue number corresponding to the hue slider position is determined and displayed. The saturation slide control depicts a continuum of saturations for the selected color. The saturation percentage corresponding to the saturation slider position is determined and displayed. The brightness slide control depicts a continuum of brightness for the selected color. The brightness percentage corresponding to the brightness slider position is determined and displayed. Changes in hue, saturation, and brightness specified by the user via respective controls are displayed in real time with respect to the text displayed in the selected design area (e.g., the text on the hoodie jacket image). When the user selects a done control, the user settings are saved in memory.

Figure 3M:
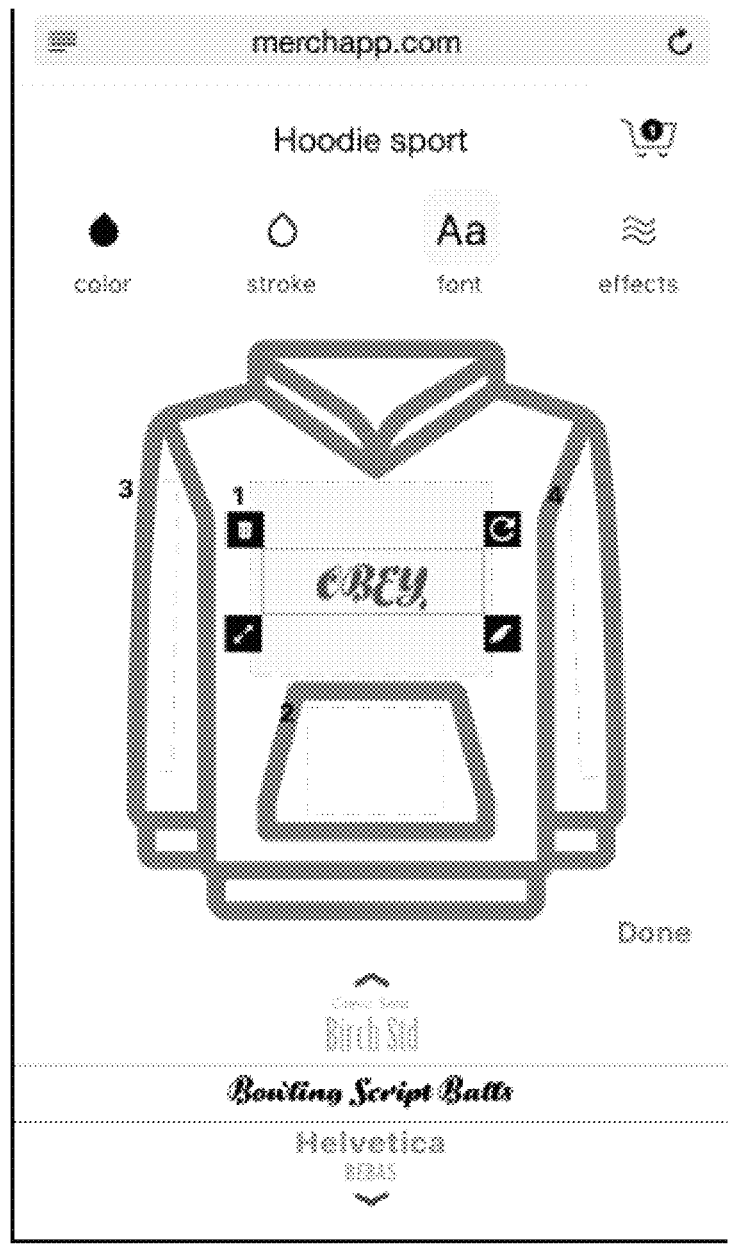

In response to the user selecting the font control illustrated in FIG. 3L, the example user interface of FIG. 3M may be displayed. A rotatable menu of fonts is provided via which the user can select a desired font (although other menu formats may be used) for template text and/or user created text. The font menu may be restricted to the fonts previously specified by the item provider. The font of the text in the design area will change in real time to the user selected font. When the user selects a done control, the user settings are saved in memory. Other font formatting controls may be provided (e.g., regular, bold, underline, strike through, subscript, superscript). Optionally, controls (e.g., via a menu) may be provided that enables a user to add a border, specify border thickness, specify text alignment (e.g., centered, left justified, right justified, etc.), specify character spacing, and/or specify line spacing.

Figure 3N:
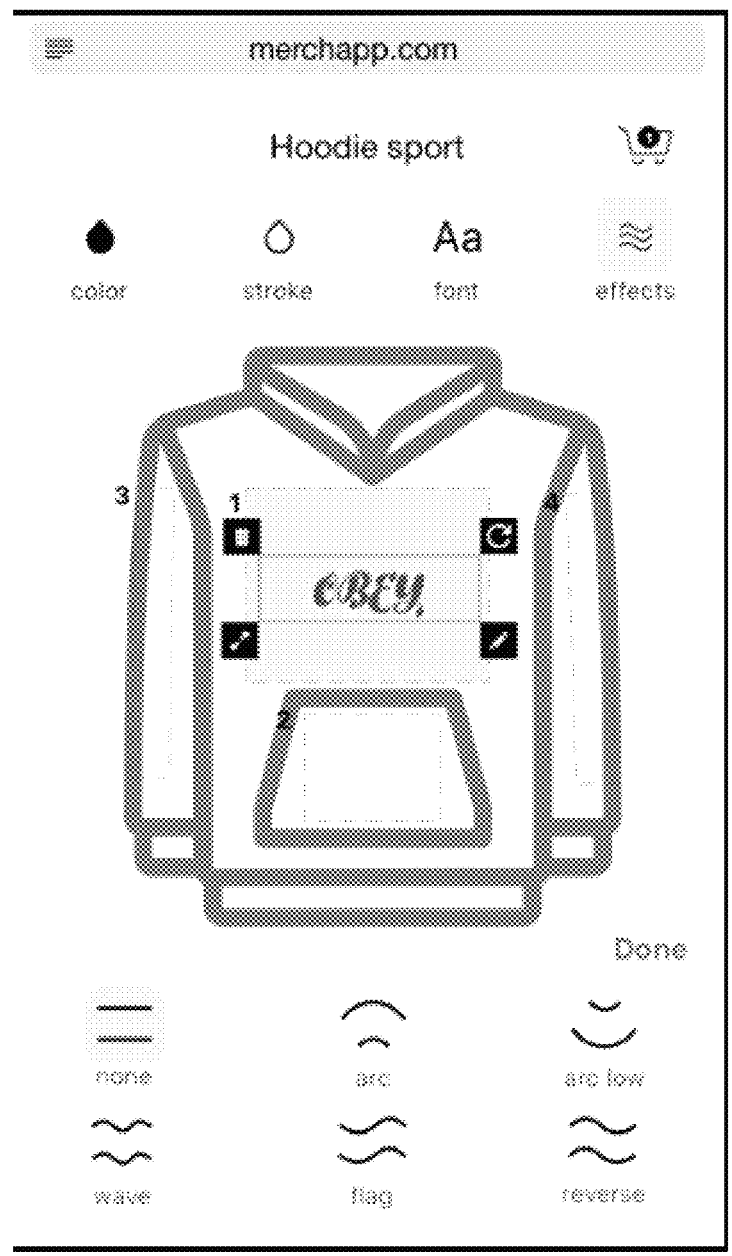

In response to the user selecting the effect control illustrated in FIG. 3M, the example user interface of FIG. 3N may be displayed. A menu of effects (e.g., text curvatures) is provided via which the user can select a desired effect. The effect menu may be restricted to effects previously specified by the item provider. The text in the design area will change in real time to the user selected effect (e.g., the user selected curvature). When the user selects a done control, the user settings are saved in memory.

Figure 3O:
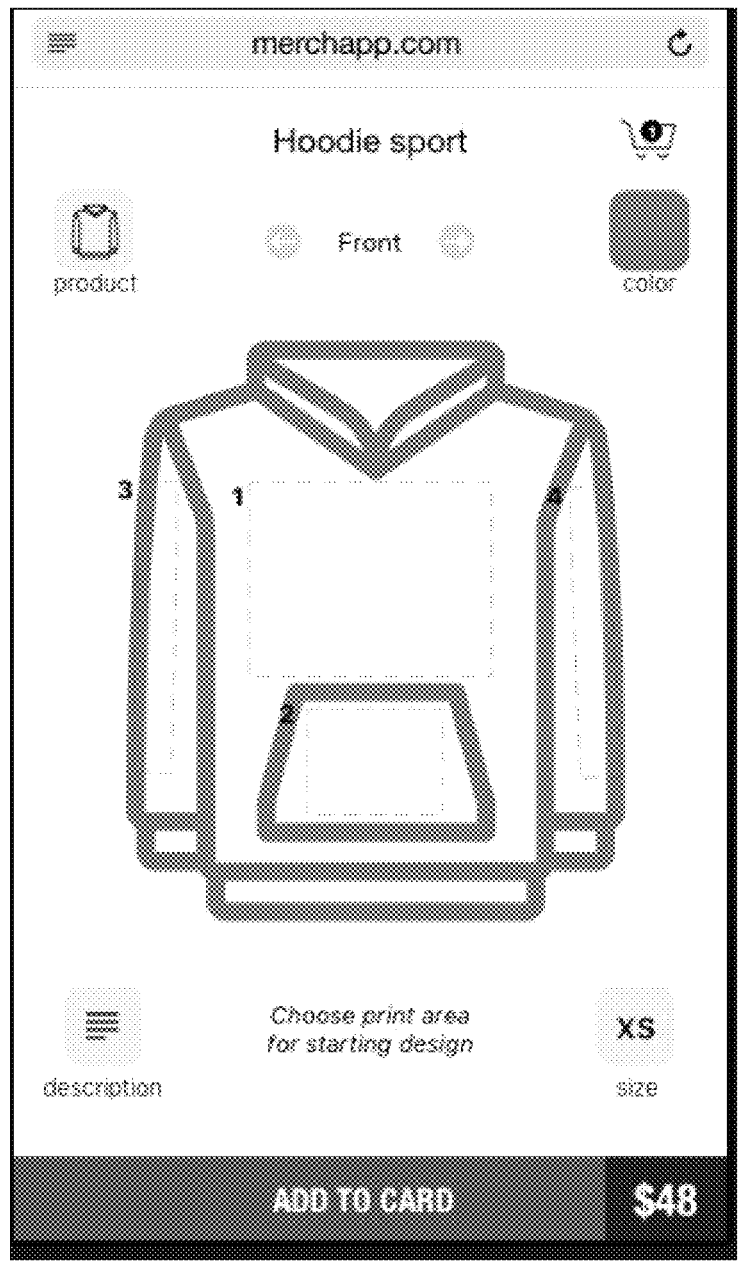
Figure 3P:

Referring to FIG. 3O, the example customization user interface of FIG. 3B is reproduced for convenience. In response to the user selecting the item color control, the example color selection user interface of FIG. 3P may be displayed. A palette of colors is displayed from which the user may select. In response to the user selecting a color from the color palette, the user interface changes the color of the item (e.g., all of the item or a representative portion of the item, such as the edges or outline of the item). When the user selects a done control, the user settings are saved in memory. Optionally, a user interface is provided via which the user can specify the color of individual elements of the item (for each sleeve, the product body, hood, muff, zipper, cord, etc.) as permitted by the item provider.

Figure 3Q:
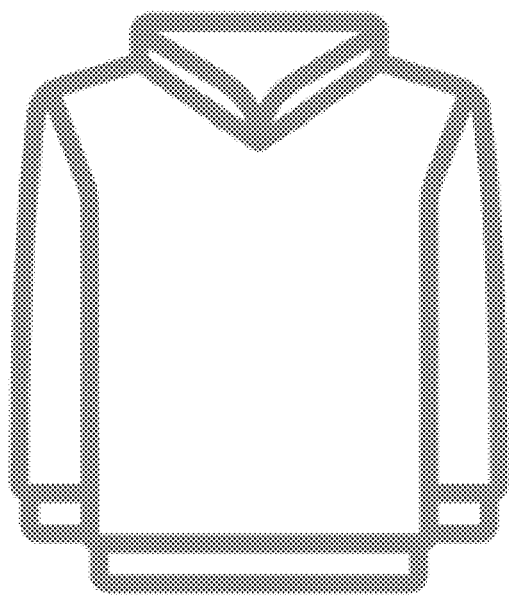

In response to the user selecting the product control illustrated in FIG. 3B, the example product menu illustrated in FIG. 3Q is displayed. A rotatable menu of products is provided via which the user can select a desired product (although other menu formats may be used). The product menu may be restricted to the products previously specified by the currently selected item provider. The user selected product will then be displayed via the example product customization user interface of FIG. 3B.

Figure 3R:
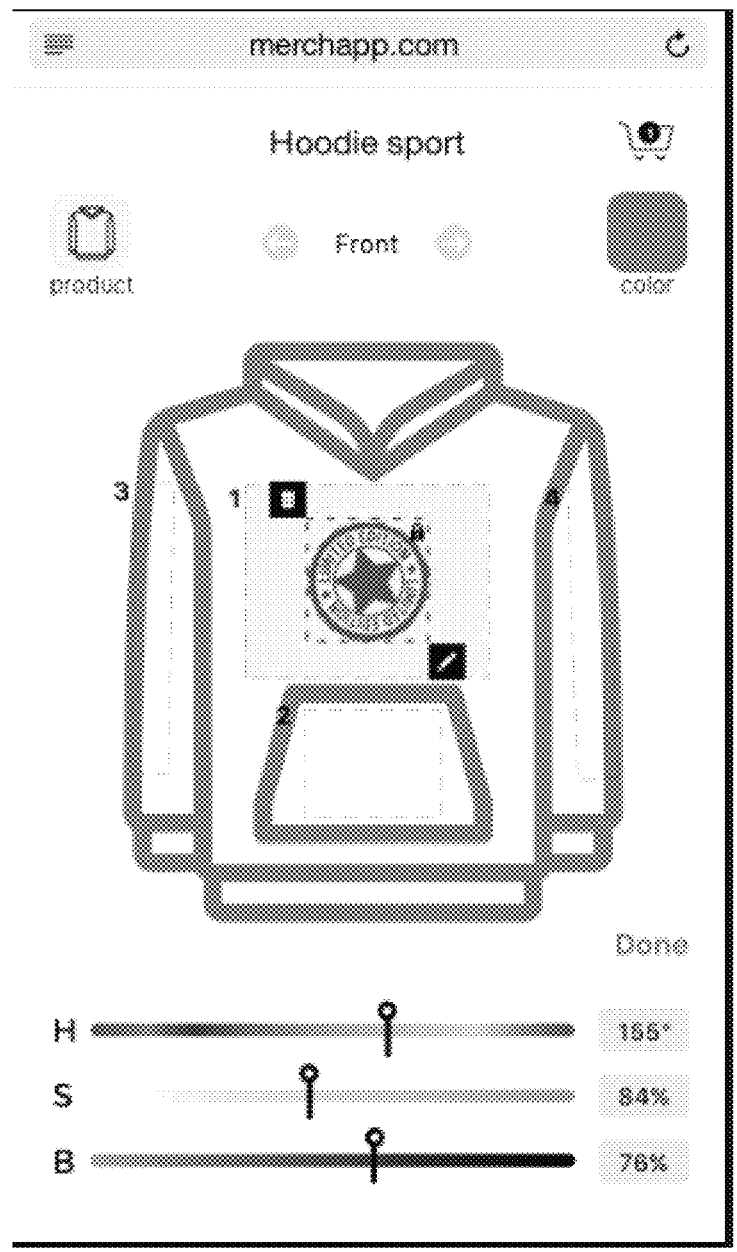

FIG. 3R illustrates an example user interface where the user has added an image to a design area. However, in this example, the item provider has specified that the position, size, and orientation are not to be altered. In response to the item provider specification, the image is accordingly locked, and the resize, drag, and rotate controls are disabled and optionally not displayed, or are displayed "greyed out" (or otherwise) to indicate that the controls are not accessible.

Optionally, a user interface may be provided via which the user can specify the print type or ink to be used to customize an item from a selection of permitted print types or ink. For example, the user interface may enable the user to specify whether standard ink, glow-in-the dark ink, and/or embroidery are to be used to customize a given item.

Optionally, controls are provided that enable a user to share an image of a user customized item (e.g., a 2D or interactive 3D image) via email, short messaging service (e.g., SMS/MMS) message, a social media posting, or otherwise. Optionally, the image may have a watermark added thereto (e.g., of the item provider, the owner/licensor of a template (or character or phrased in the template) used to customize the item, and/or of the operator of the item customization system) so that a person viewing the shared image will see the watermark. Optionally, a control may be provided via which the user may include an invitation (optionally in association with the image of the customized item) to collaborate on the customization. For example, the invitation may include a link to an interface for customizing the item or a code to access the item customization user interface.

The system may determine the size of a design element (e.g., an image and/or text) added or modified by the user. For example, the size may be determined based on a design element area (e.g., square inches, square centimeters, or other units of measure). The system may calculate a price for the item based at least in part on the current design element size and/or the design element ratio (e.g., width/height or height/width). Optionally, the price may be reflective of, or based at least in part on the expense of the ink or other materials needed to print the design element.

For example, an item price may comprise a base price for an item (e.g., a jacket), an additional minimum price for adding a design element to the item, and a variable additional price based on the size of the design element. Optionally, different design elements may be associated with different prices specified by an item provider. For example, a licensed design element of a cartoon character may be more expensive than a design element that uses a public domain graphic or photograph.

A user interface may be presented to an item provider via which the item provider can insert a pricing formula or arguments for such a formula. For example, a formula may take the form of:

$$P=(K_1(\text{height*width of design element}_1)+BDE_1)+ (K_2(\text{height*width of design element}_2)+ BDE_2)+ \ldots +(K_n(\text{height*width of design element}_n)+BDE_1)+BSP$$

Figures 1, 3S:
Figures 2, 3S:

Where:
P=the product price
K is a constant for a given design element (where certain design elements (e.g., of licensed celebrity images) or design element printing technologies (e.g., embroidery) may have a higher constant than others, reflecting a higher value design element);
BDE is a base price for the given design element; and
BSP is the base price for the product Optionally, with reference to FIGS. 3S-1, 3S-2, the price may be calculated in real time as the user changes the size of the design element and the price may be updated and displayed to the user in real time for the current design element size. Thus, for example, if the user is dragging a corner of a design element to increase or decrease the design element size, an item price may be continuously calculated and displayed to reflect the change in size. As illustrated in FIG. 3S-1, a first price is calculated and presented for a t-shirt having an applied photograph of a relatively small size. As illustrated in FIG. 3S-2, a second price (higher than the first price) is calculated and presented for the t-shirt having the same photograph, but of a larger size, applied. Other user modifications (e.g., change in product, change in size of product, number of customizations) that may affect the product price may also be calculated and presented in real-time to the user A shopping cart user interface may be displayed in response to a user selected a shopping cart link (e.g., which may be associated with a shopping cart icon), in response to the user activating a checkout control, or otherwise. The shopping cart user interface may include details on items that the user had added to the shopping cart. For example, the shopping cart user interface may provide an image of a given item (e.g., a predefined default image, such a front side of an item), the size(s) being ordered, the item color(s), the quantity, the item unit cost, the total cost for the number of items being ordered. Optionally, the item image may display user customization (e.g., design elements specified by the user). Optionally, an image of each side (or of a subset of sides) of the item may be displayed with respective user customizations. Optionally, user information is displayed. The user information may be accessed from a user database that stores information previously provided by the user. The user information may include a user name and/or other identifier, user contact information (e.g., email address, short message service address, phone number, etc.), and a shipping address.

If a given item customized with an image and/or text template associated with a template expiration date/time is in the shopping cart, optionally, a countdown timer may be provided for display that indicates how long the user has to order the customized item before it may no longer be ordered. Optionally, a communication (e.g., an email, text message, or other message type) may be transmitted by the system to a corresponding user destination informing the user of an upcoming expiration or non-usage date/time (e.g., a specified time period before the upcoming expiration date/time).

The shopping cart user interface may also include a menu of item providers (e.g., a menu of shops) the user can select from. In response to a user selection, a corresponding item provider electronic store front may be accessed and provided for display to the user.

Figures 1, 3T:
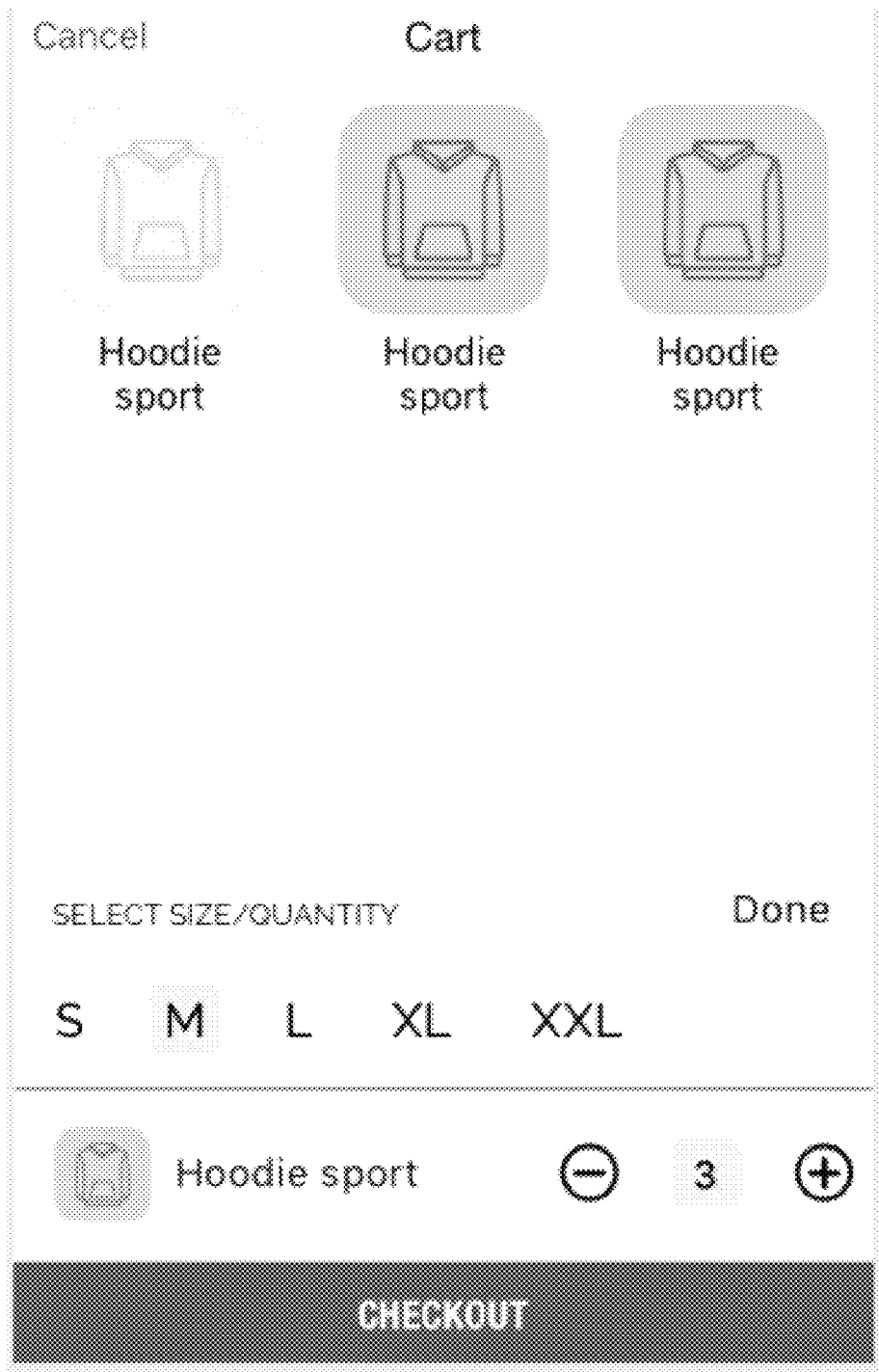
Figures 2, 3T:
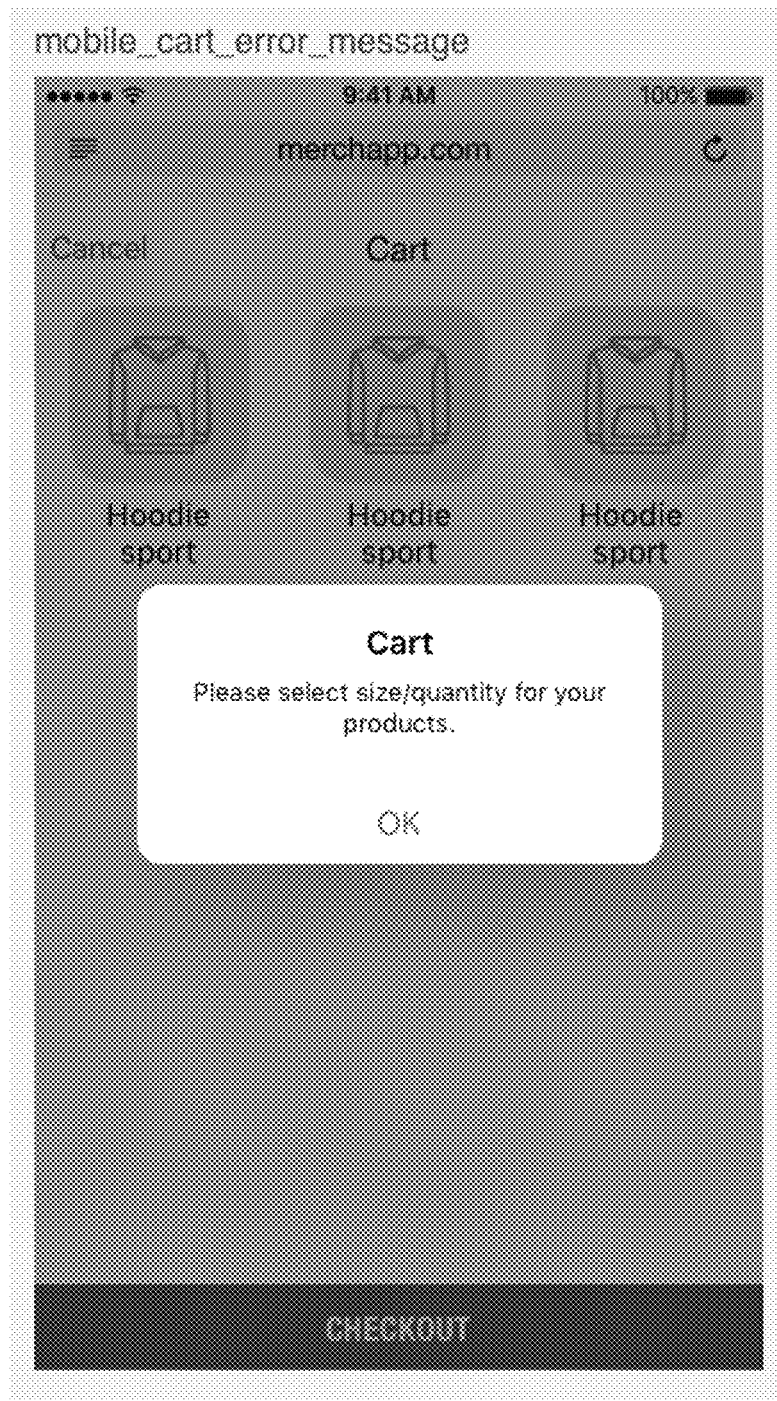
Figures 1, 3U:
Figures 2, 3U:

FIG. 3T-1 illustrates an example shopping cart user interface. In the illustrated example, the shopping cart user interface shows the contents of the shopping cart (including images of the items in the shopping cart), and optionally enables the user to select one or more items at a time in the shopping cart and change the size and/or quantity of the selected item(s). If it is detected that the user has not selected a quantity or a size of a given item in the user cart, the example error message illustrated in FIG. 3T-2 may optionally be presented.

Figure 3V:
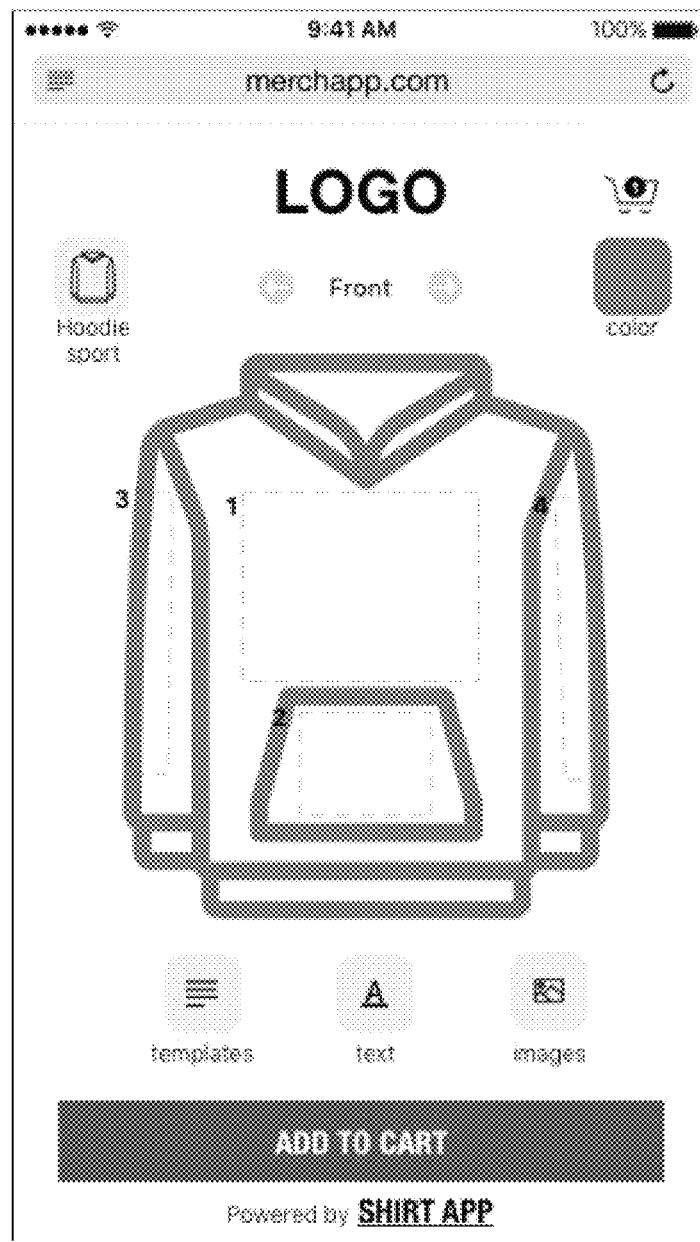
Figure 3W:
Figure 3X:

FIGS. 3V-3X illustrates additional example user interfaces that may be used to customize an item. Referring to FIG. 3V, in this example, the user has selected a hoodie sport jacket. In this example, an image corresponding to the front side of the jacket is accessed from memory and displayed as a default side, optionally in an item provider specified default color or a color specified by the user. The image may be a two dimensional or three-dimensional model (where the surface of a depicted item is rendered in three dimensions).

The front side may be the pre-specified default side that is displayed. In addition, a side selection control is provided in the form of back and forward arrows. The user may activate the side selection control to scroll through available side images in a backwards or forwards direction. The corresponding image of the selected side is displayed by the user interface, with any design areas indicated (e.g., with a border and/or a design area identifier). In the illustrated example, the user interface indicates, via respective borders and identifiers, that the jacket has four design areas that had been specified by the item provider (design area 1—chest, design area 2—muff, design area 3—right sleeve, design area 4—left sleeve). A control may be provided via which the user can add the item to the user's shopping cart.

Referring again to FIG. 3V, template, text, and image controls are provided via which the user can initiate the adding of a predefined template, text, or an image to a selected design area. If the user selects the template control, a gallery of templates may be displayed. The user may select a template from the template gallery, which will then be automatically displayed on the previously selected design area. If the user selects the image control, a gallery of images, such as that illustrated in FIG. 3W may be displayed. The user may select an image from the image gallery, which will then be automatically displayed on the previously selected design area.

Optionally, when the user selects the add template, text, or image controls, a corresponding gallery may slide up to cover only a portion of the user interface (e.g., 25% or 50% of the user interface) to enable the user to see both the image of the product being customized and the corresponding gallery. Optionally, a control may be provided that enables the user to cause the gallery to expand to a full screen mode. FIG. 3X illustrates an example user interface, were an image gallery covers about half of the user interface. When the user selects a gallery item, it may be automatically displayed on the selected design area on the image of the product, and the gallery may slide down or otherwise be removed so that the product with the gallery item added to the selected design area may be fully viewed.

Figure 3Y:
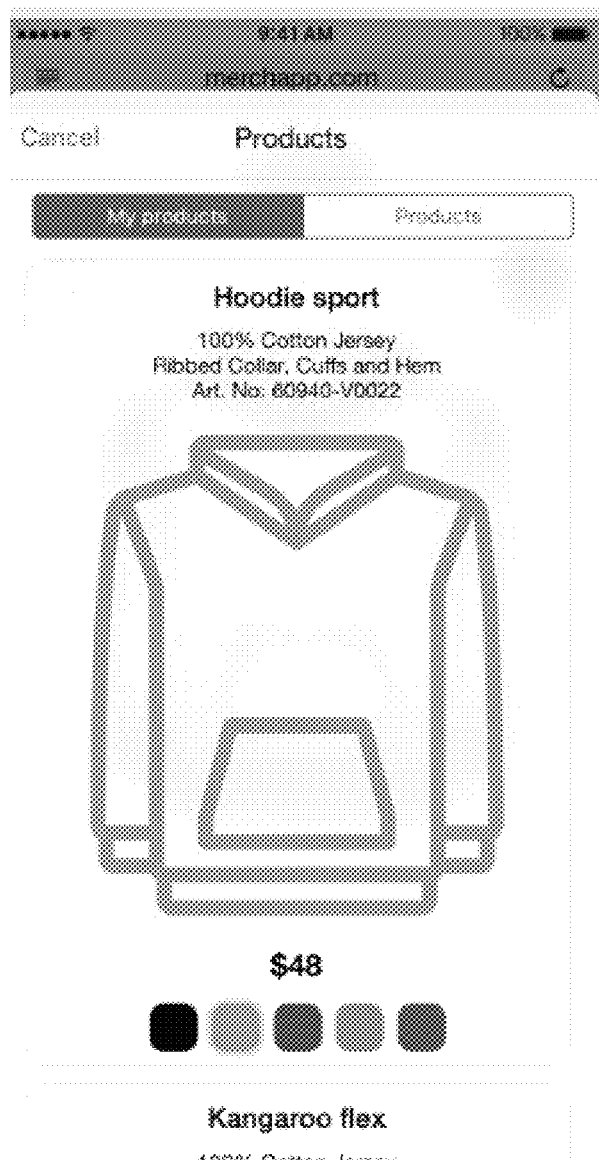

FIG. 3Y illustrates a "My products" user interface which displays one or more of the user customized designs. If the user selects the "Products" control than all available products (or a subset thereof) may be displayed via the user interface.

Figure 4A:
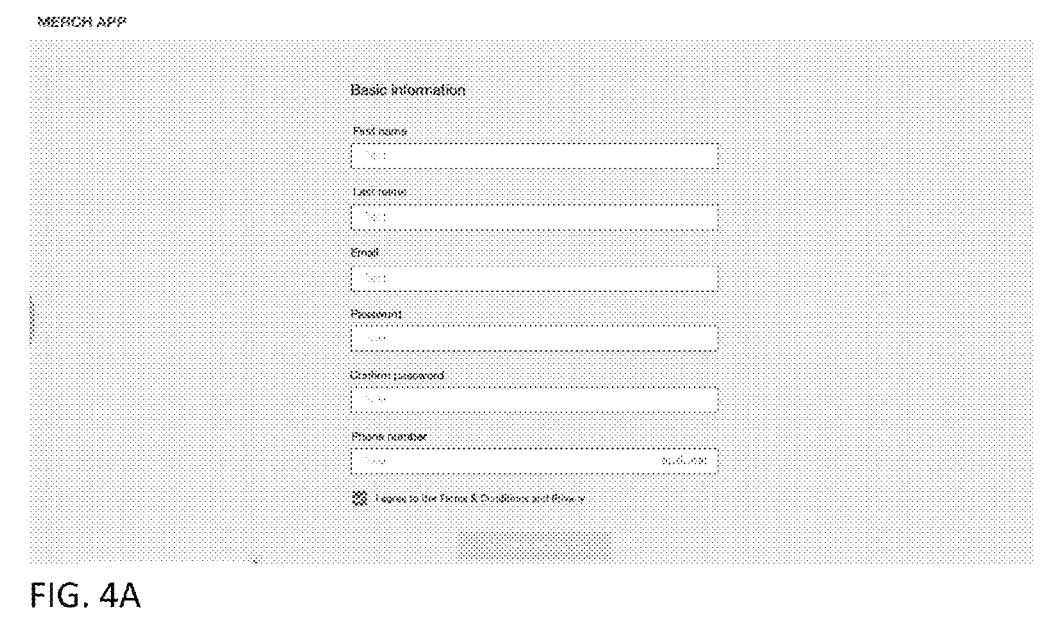

Certain example item provider online shop setup user interfaces will now be described. A user interface, such as that illustrated in FIG. 4A, may be provided via which a user (e.g., a shop owner) may enter information for setting up an account (e.g., first name, least name, email, address, password, phone number, other contact information, etc.).

Figure 4B:
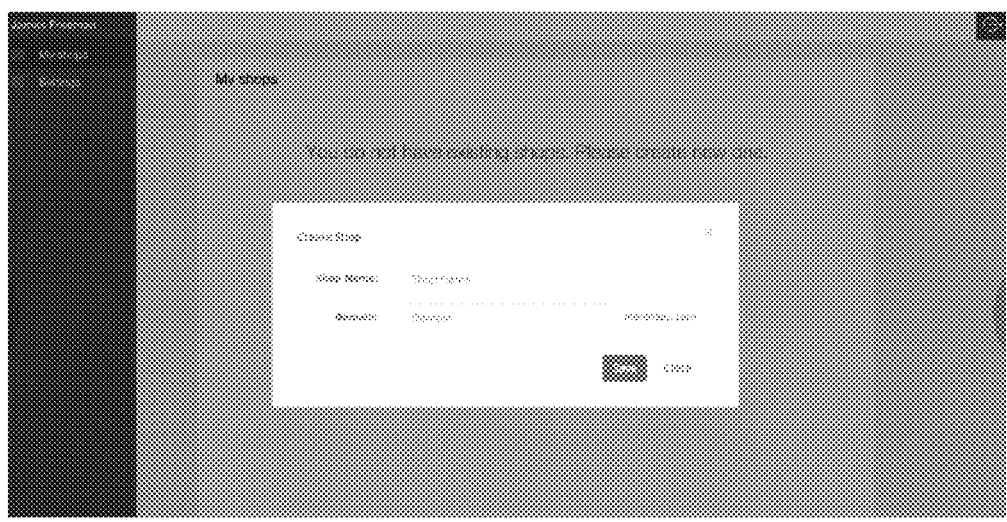

Referring to FIG. 4B, a create shop user interface is provided that includes a field configured to receive a shop name and a domain for the shop. Optionally, in response to the user activating a save control, the system will check to see if either the shop name or domain has already been assigned to another user, and it the shop name or domain has already been assign, a corresponding notification is generated and the user is notified to select an alternative name and/or domain.

Figure 4C:
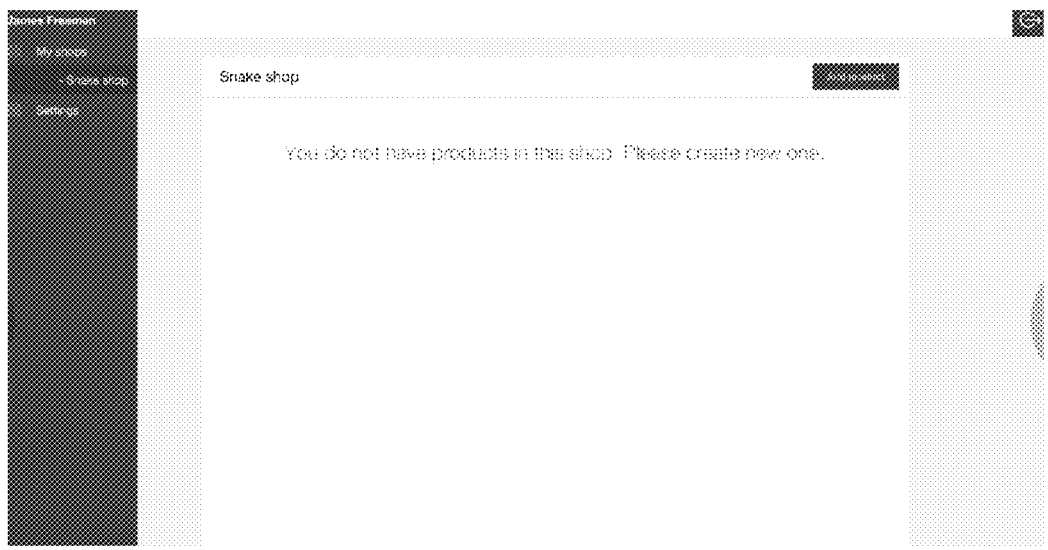

In response to the user successfully entering a shop name and domain, the example user interface illustrated in FIG. 4C is presented prompting the user to add items to the user's shop. An item/product may be specified using the other interfaces described herein.

Figure 4D:
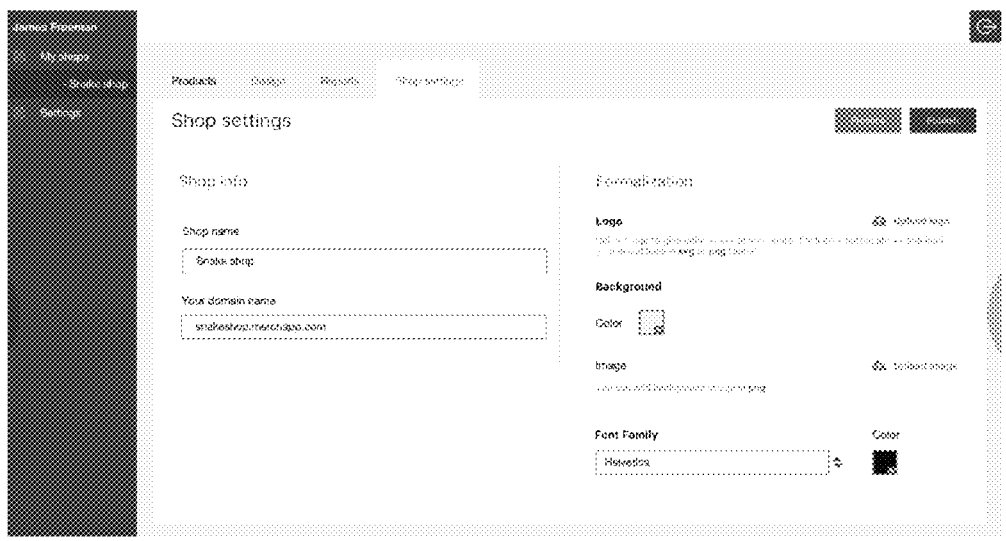
Figure 4E:
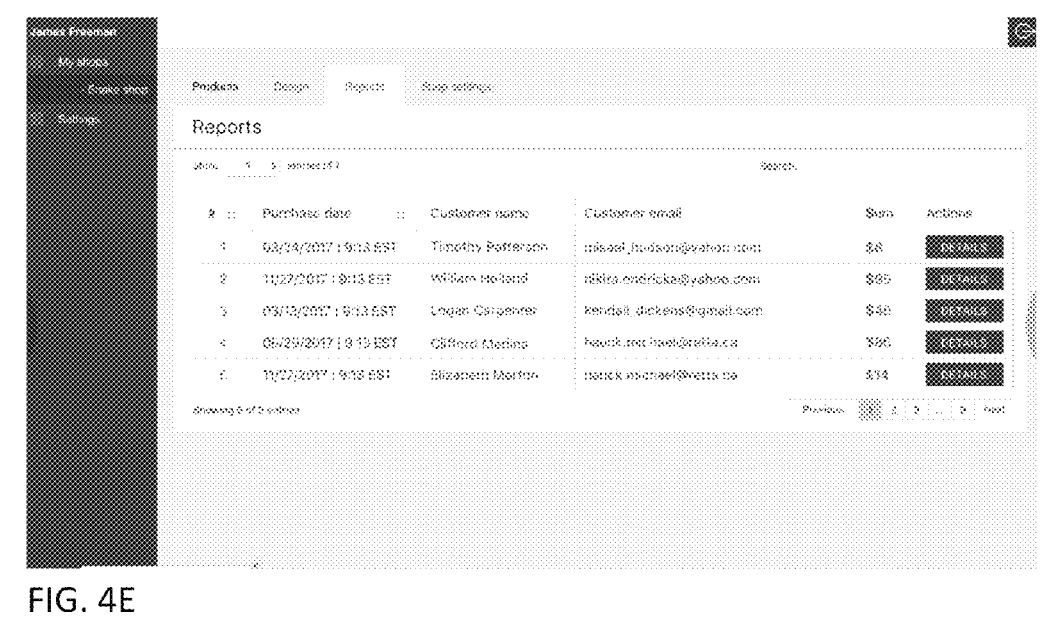

Referring to FIG. 4D, a shop settings user interface may be provided that may include some or all of the following fields: shop name, shop domain name (where the top level domain may be optionally associated with the system operator), shop logo (wherein a user may upload a logo or provide a link to the logo, and background image (in the form of a PNG, SVG, GIF, or other image file, which may be uploaded or linked to by the user). Different background colors or images may be assigned for different products or for different colored products. For example, a black background color may be assigned to white colored products to enhance contrast and to thereby enhance visibility of the product image. In addition, a control may optionally be provided via which a user can specify a background color to be used for the shop user interface(s). Controls may be provided via which the user can instruct the system to replace or remove a previously selected log, color, or background image. A font menu may be provided via which a user can specify which font is to be used for the shop, and a color control may be provided via which the user can specify a font color. A review control is provided which when activated, causes the system to generate a preview of the shop user interface in accordance with the user setup instructions. When a user is satisfied with the preview, the user may activate a publish control, which will cause the shop to be made accessible (e.g., over the Internet via a browser and/or via a dedicated item customization application) and will cause the setup instructions to be stored in association with a shop account.

One or more of the systems described herein may be configured to generate order reports for a plurality of item providers (e.g., online shops). For example, with reference to FIG. 4E, an ordering system may access order information from an order database and generate the illustrated report. The report may be limited, via one or more filters, to a specified time period, to one or more shops, to one or more users/customers, to one or more user/customer contacts or shipping addresses, to one or more products (e.g., the n most popular products), to one or more product-types (e.g., the n most popular product-types), to one or more templates (e.g., the n most popular templates), to one or more colors (e.g., the n most popular colors), to one or more fonts (e.g., the n most popular fonts), to one or more edit-types (e.g., the n most popular edit-types), and/or to sales above or below a specified threshold amount. In the illustrated electronic report, the system accesses shop owner data, purchase date/time data, customer name, customer email, and purchase amount and populates respective report columns in a report table, where each row may correspond to a different item provider (e.g., a different online shop). Sorting controls may be provided for one or more columns which enable a user to specify whether the report rows are to be sorted in an ascending or descending order based on the data in the column associated with the selected sort control. For example, a sorting menu may be provided via which the user can cause the report to be sorted according to relative popularity of templates (e.g., image and/or text templates), relative popularity of fonts, relative popularity of color, relative popularity of edits, relative popularity of product, relative popularity of product-type, etc.

Certain example operations will now be described with reference to the figures. Fewer or additional operations may be performed, and the operations may be performed in a different order. For example, if a user elects not to add text to a design area, then certain related operations related to rending text editing interfaces may not be performed. By way of further example, if a design does not violate a design rule, than corresponding error handling operations may not be performed. In addition, certain operations that are depicted as being serially performed may be performed in parallel (e.g., at the same time). Certain operations may be performed by a user device and/or a CAD system.

Figure 5A:
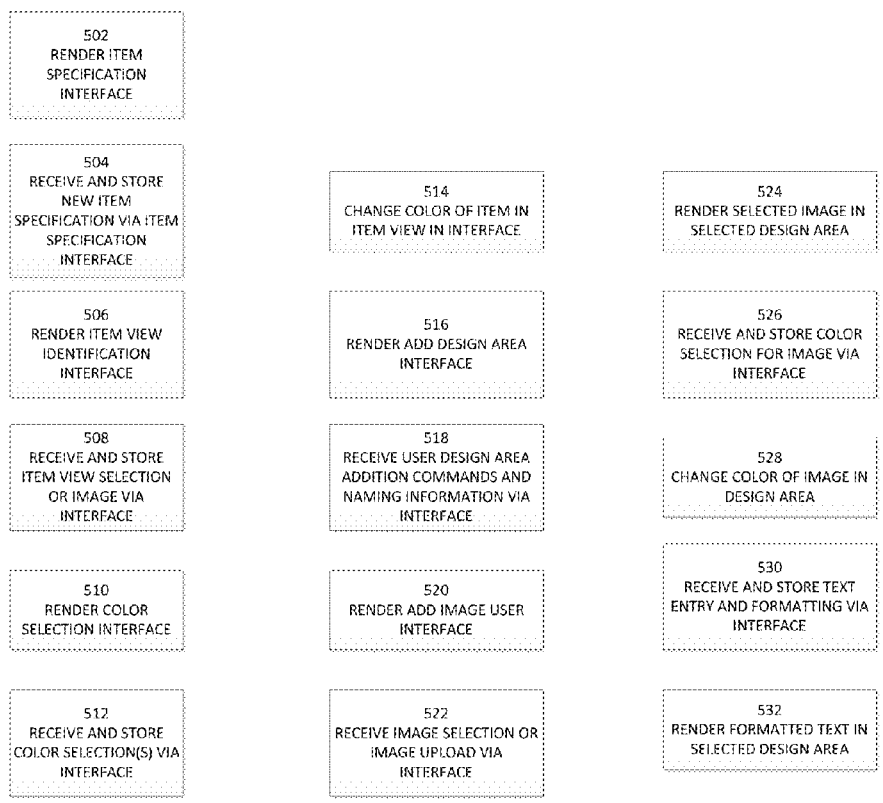
FIGS. 5A-11 illustrate example operations.
Figure 5B:
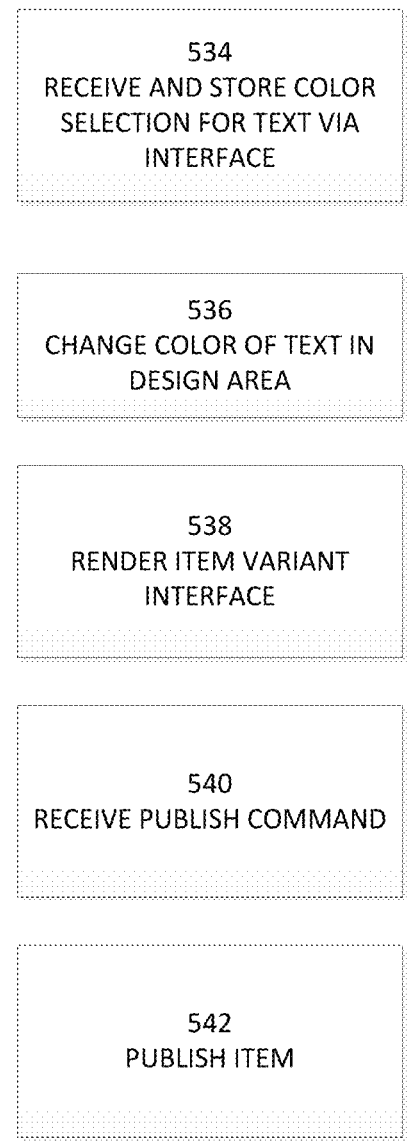

FIGS. 5A-5B illustrate example operations that may be performed with respect to an item provider that is specifying an item and that is specifying end user customization permissions/restrictions. At block 502, an item specification interface is rendered on a user device (e.g., an item provider device), optionally in response to a user input. At block 504, a new item specification is received and stored. For example, the item specification may include item name, item category, description, sizes, item color, and the like. At block 506, an item view identification user interface is rendered. At block 508, an item view is selected by the user from a gallery of generic items view or the user may upload an image of a side of the actual item. The item view selection or upload is received. At block 510, a color selection user interface is rendered, optionally in response to a user input. At block 512, a color selection is received and stored. For example, a palette of colors may be provided, and in response to the user selecting a color from the palette, a corresponding color map may be provided with a range/shades of the selected color. The user may select a particular color shade from the map (e.g., using a pointing device, such as a mouse, stylus, or finger). Optionally, the user can enter the desired color via a color value field. At block 514, the item in the interface is colored using the selected color in real time.

At block 516, an add design area interface is rendered which may provide a design area specification tool that enables a user to draw or otherwise specify a design area perimeter and to assign a name to the specified design area. At block 518, the design area specification and design area name are received (e.g., where the design area is drawn by the user on a given portion of the item, or the user provides numerical coordinates for the design area).

At block 520, an add image interface is rendered, optionally in response to a user input. The add image interface may include a gallery of previously stored images and/or may provide a control via which a user can upload or link to an image. At block 522, an image selection from the gallery is received and/or an image upload or link is received. At block 524, the selected/uploaded image is rendered in the design area. At block 526, an image color selection is received. For example, the user may select a color from a displayed palette of colors and in response, the interface may access and present a color map corresponding to the color selected by the user. The user may select a desired shade from the color map. At block 528, the image color may be changed in real time to the selected shade. A lock control may also be provided. If the lock control is activated by the user, the image color may be locked to prevent the color from being changed (e.g., by an end user) unless the lock is unlocked.

At blocks 530 and 532, in response to the user selecting an add text control, an add text interface may be presented. The interface may indicate one or more previously specified design areas, and may highlight a user-selected design area. A text field may be provided. As the user enters text (e.g., using a provided keyboard, via voice input, or otherwise) the text is displayed in real time in the selected design area. Formatting controls may be provided via which the user can select/specify a font, text alignment (e.g., left, right, center), text effects, character spacing, and/or line spacing. In addition, controls may be provided via which the user can rotate the text, change the size of the text, and/or lock the text (so that the text cannot be changed by an end user). A design area deletion control may also be provided. Text entry and text formatting specified by the user may be reflected in the selected design area on the item image in real-time.

At block 534, a text color selection is received and stored. For example, the user may select a color from a displayed palette of colors and in response, the interface may access and present a color map corresponding to the color selected by the user. The user may select a desired shade from the color map. At block 536, the text color in the design area may be changed in real time to the selected shade.

At block 538, an item variant interface may be rendered via which a user can assign a base price and prices for each specified item variant (e.g., for each combination of available color, available size, and number of design areas customizable by an end user). The item variant interface may also enable the user to specify what type of print options may be used or made available for a given item or item-type. For example, the interface may enable an item provider to specify whether standard ink, glow-in-the dark ink, and/or embroidery are to be made available to end users to customize a given item. The user inputs may be received and stored.

At block 540, a publish command may be received (e.g., in response to the user activating a publish control). At block 550, the specified item may then be saved and published (e.g., to a store associated with the user).

Figure 6A:
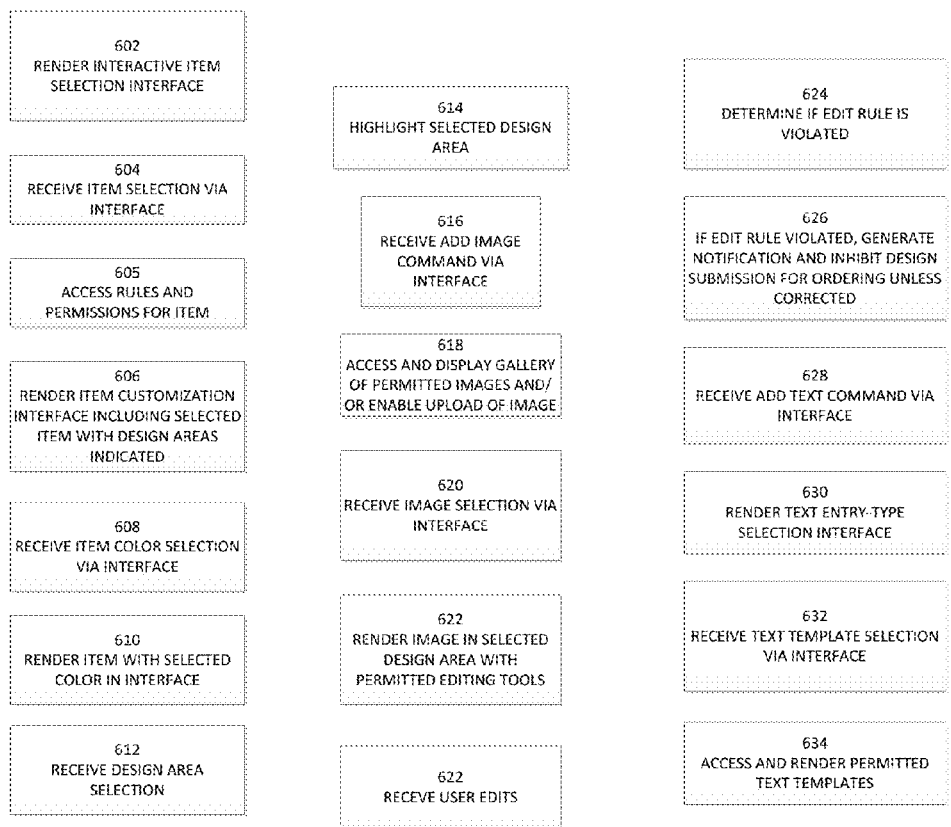
Figure 6B:
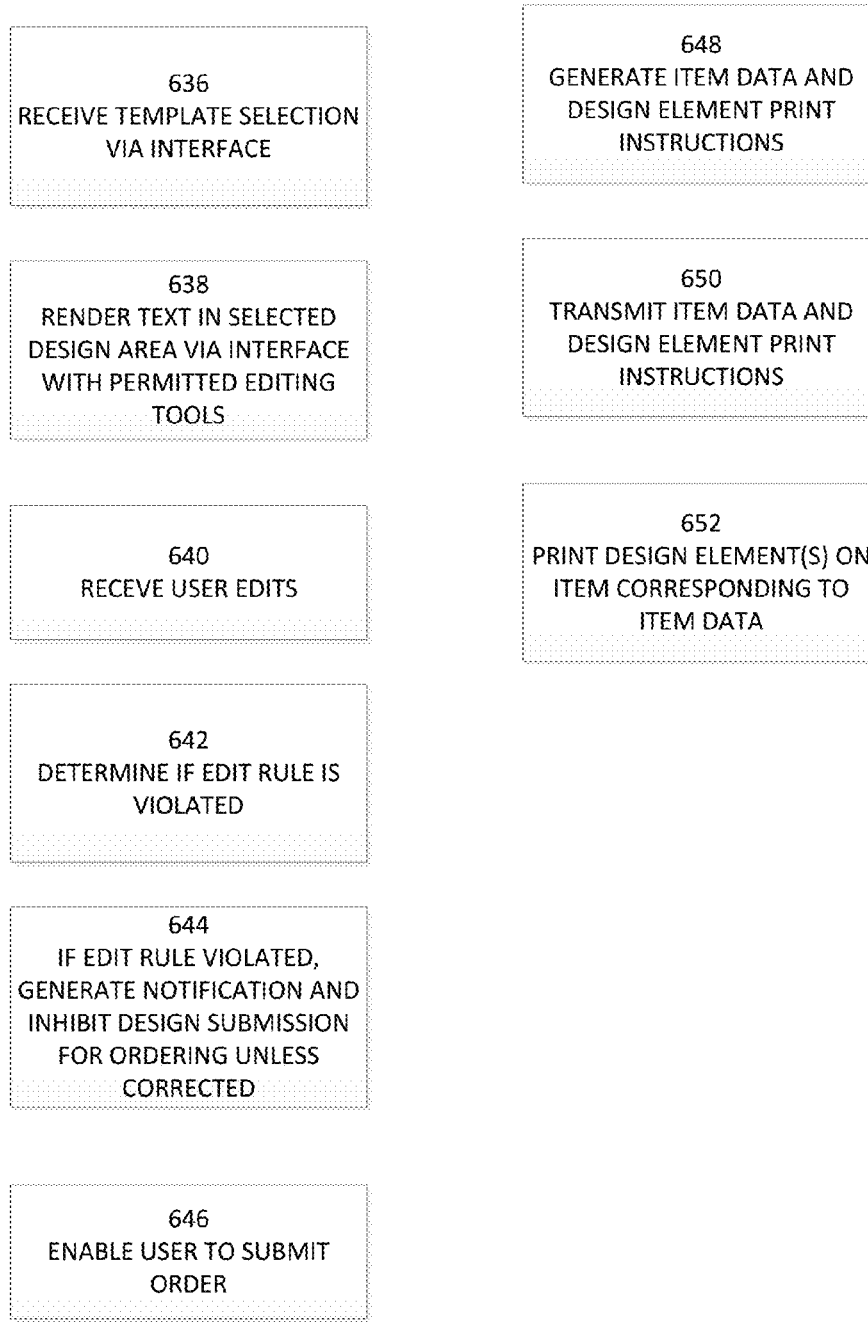

FIGS. 6A-6B illustrate example operations that may be performed with respect to an end user in customizing an item. At block 602, an interactive item selection interface may be rendered on a user device (e.g., via a browser or dedicated application). The interactive item selection interface may display or provide access to a catalog of items of one or more stores. At block 604, a user item selection is received. At block 605, customization rules and permissions are accessed from memory. For example, the customization rules and permissions may indicate what colors may be used for the item, for each design area, for each image in a design area, and/or for each item of text in a design area. By way of further example, the customization rules and permissions may indicate what text formatting (e.g., which fonts, alignment, spacing, size, and/or effects) may be used for an item or for a given design area on the item. By way of yet example, the customization rules and permissions may indicate whether a design element (e.g., text or an image) may be rotated, may specify rotation increments, and/or may specify a maximum rotation amount. By way of yet example, the customization rules and permissions may indicate which design elements (e.g., text or image) that had been applied by the item provider to an item may be deleted or edited.

At block 606, customization interface may be rendered. The customization interface may display an image corresponding to a default side of the user selected item, optionally in an item provider specified default color. A side selection control may be provided via which the user can view and select an image of a different side. The design areas specified by the item provider may be highlighted on the item image. The user may select (e.g., by clicking on) a design area to add to or modify the design area. An item color selection interface may be provided (e.g., including a palette of colors) via which the user can select an item color. At block 608, a user color selection for the item is received. At block 610, the item is rendered with the selected color in real time. At block 612, a design area selection is received. At block 614, the selected design area is highlighted.

At block 616, a user selection of an add image control is received. At block 618, an interface is presented that includes a gallery of images that item the provider indicated may be used to customize the item and/or selected design area. The interface may include controls via which the user can select and upload/link to an image to be added to the selected design area. At block 620, a user image selection or upload is received. At block 622, the image is rendered in real time in the selected design area. In addition, the permitted editing tools are determined and displayed. For example, depending on the restrictions/permissions specified by the item provider for the item or the design area, one or more of the following tools may be presented and enabled: resize, drag, rotate, change font, change color, delete, or the like. Controls that are not permitted may be disabled and optionally not displayed, or may be displayed "greyed out" (or otherwise) to indicate that the controls are not accessible.

At block 623, user edits are received.

At block 624, a determination is made as to whether the user edits have violated any edit rules. For example, a determination may be made that the user has expanded the size of the image past the border of the design area as specified by the item provider. At block 626, if a determination is made that an edit rule is violated, an error notification may be generated and provided to the user. For example, the notification may include one or more of a text notification, an icon notification, a sound notification, an operational notification (e.g., snapping the size of the image back to the previous size in response to detecting that the user is attempting to increase the size of the image in at least one direction or dimension past a threshold size or dimension), or the like. Detection and handling of other rule violations, such as violations of rules discussed elsewhere herein, may be similarly handled. In addition, the user edit that violated the edit rule may be inhibited from being included in a design or manufacturing file for the item, and the user may be prevented from ordering the item until the violation is corrected.

At block 628, a user selection of an add text control is received. In response to receiving the user selection of the text control, at block 630 a text entry-type selection interface is rendered. The text entry-type selection interface may include a "create" control and "template" control. At block 632, a template control selection may be received via the text entry-type selection interface.

If the user selects the "template" control, at block 634, a gallery of user-selectable text templates (e.g., previously entered by the item provider) that are permitted for the item/design area is generated and rendered. For example, a given template may include alphanumeric text (e.g., one or more phrases) with an item provider-specified font. At block 636, a user selection of a template is received.

If the user selects the "create" control, a user interface is rendered via which the user can enter the user's own text. For example, the create user interface may include a keyboard and a text field.

At block 638, the text (either corresponding to the template text or the user created text) is rendered in the selected design area with permitted editing tools. For example, depending on the restrictions/permissions specified by the item provider for the item or the design area, one or more of the following tools may be presented and enabled: resize, drag, rotate, font, color, or the like. Controls that are not permitted may be disabled and optionally not displayed, or may be displayed "greyed out" (or otherwise) to indicate that the controls are not accessible. The an editing toolbox may be dynamically determined based on the item the user is customizing, the design area of the item the user is customizing, and/or the type of customization the user is performing (e.g., adding text or adding an image).

At block 640, user edits are received via the permitted editing tools. For example, the edits may include text rotation, size change, font change, color change, or the like.

At block 642, a determination is made as to whether the user edits to the text have violated any edit rules. For example, a determination may be made that the user has reduced the size of the below a certain size specified by the item provider. At block 644, if a determination is made that an edit rule is violated, an error indication/notification may be generated and provided to the user. For example, the notification may include one or more of a text notification, an icon notification, a sound notification, an operational notification (e.g., snapping the size of the text back to the previous size in response to detecting that the user is attempting to increase the size of the text in at least one direction or dimension past a threshold size or dimension), or the like. Detection and handling of other rule violations, such as violations of rules discussed elsewhere herein, may be similarly handled. In addition, the user edit that violated the edit rule may be inhibited from being included in a design or manufacturing file for the item, and the user may be prevented from ordering the item until the violation is corrected.

At block 646, at least partly in response to determining that edit rules have not been violated, the user is enabled to submit an order for the user-customized item (e.g., via an order control).

At block 648, item and customization data may be generated corresponding to the customized item. For example, the item data may include an identification of the item, the item size (where the size may include an indication as to gender and age (e.g., unisex, men, women, juniors, youth, toddler, infant)), and the item color. The customization data may include print data. For example, data may include data in ppi (pixels per inch) or vector format. Images may be in the form of JPEG, PNG, SVG, or other format. Text may optionally be converted to an outline format. Colors may be provided using pantone color codes. An image (or images) of templates and/or user provided images and/or text used in the customization may be generated as part of the customization data (see, e.g., FIG. 3U-1). An image (or images) of side(s) of the item that have been customized may be generated as part of the customization data (see, e.g., FIG. 3U-2). The item data and customization data may be provided in separate files or a single file. At block 650, the item and customization data for each design element may be transmitted to a printing and/or embroidering system. For example, one or more files including the item data and/or the customization data may be transmitted over a network to printing machine for printing. At block 652, the customized design elements may be printed or embroidered on the item. For example, the printer may use heat transfer vinyl, screen printing, direct to garment printing, sublimation printing, and/or transfer printing.

Figure 7:
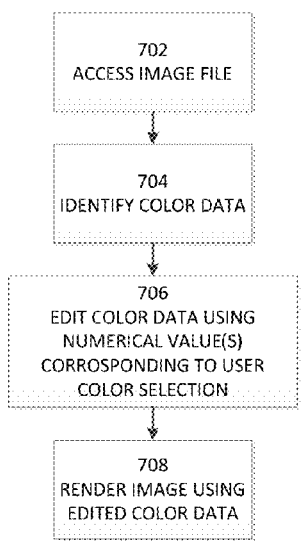

FIG. 7 illustrates an example process for changing the color of an image, which may be used by one or more of the color change operations discussed herein. At block 702, an image whose color is to be changed (e.g., in response to a user color-change instruction) is accessed. For example, the image may be in scalable vector graphics (SVG) format which is defined in an XML text file. At block 704, the color data is identified. For example, a color entry in the text file may be identified. At block 706, the color data is edited to correspond to the color specified by the user. The color may be in the form of a standard color name (e.g., "green," "red," "blue"), or via a numerical code (e.g., as a hexadecimal value, as rgb decimal values (e.g., rgb (126, 255, 216), as rgb percentages (e.g., rgb (75%, 50%, 25%), or otherwise). At block 708, the image is rendered using the edited color data.

Figure 8:
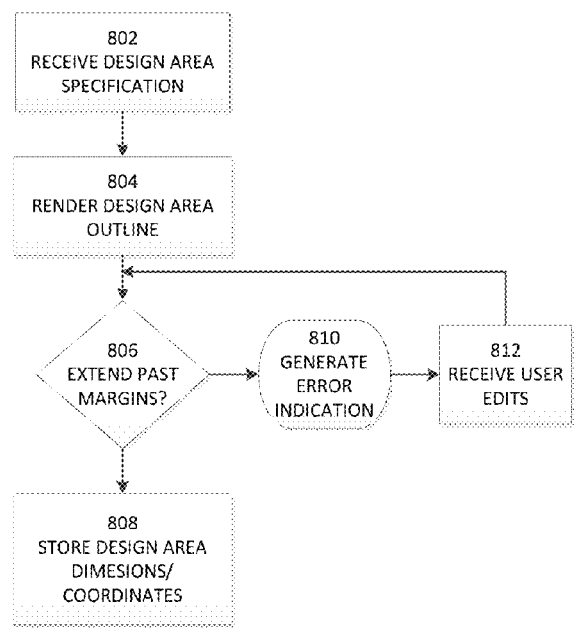

FIG. 8 illustrates example operations that may be performed in detecting design rule violations with respect to specifying design areas (e.g., printable areas). The operations may be used in conjunction with one or more of the design area specification operations discussed herein. At block 802, a design area specification for an item (e.g., a clothing product) is received. By way of example, a design area specification tool may be provided that enables a user to draw or otherwise specify a design area perimeter. By way of illustration, a user may select the tool, specify a first corner via a pointer (e.g., mouse, stylus, finger), drag the pointer to indicate a diagonally opposite corner, and a corresponding perimeter will be drawn (e.g., using dashed lines or other indicator), which may be in the form of a rectangle or square (although other shapes may be used). At block 804, the design area outline (e.g., a border) is drawn on the item. At block 806, a determination is made as to whether the design area outline violates any design rules (e.g., specified by a printing entity or system operator). For example, depending on the printing technology to be used, it may not be possible to print within a certain distance of an edge of an item, such as within a certain distance of a hem of a jacket. Thus, margins may be specified with respect to certain edits/portions of the item.

If a user (e.g., an item provider) attempts to specify a design area that will violate such margins, at block 810 an error indication/notification may be generated. For example, the notification may include one or more of a text notification, an icon notification, a sound notification, an operational notification (e.g., snapping the size of the design area border back to the previous size in response to detecting that the user is attempting to increase the size of the design area past a margin), or the like. In addition, the user may be prevented from publishing the item on the user's store until the violation is corrected. If there is no violation or the violation has been corrected, then at block 808, the design area dimensions and/or coordinates may be stored for later publication. Optionally, instead of generating an error notification, the process may crop the design area so that the design area will automatically be sized to fit within the specified margins.

Figure 9:
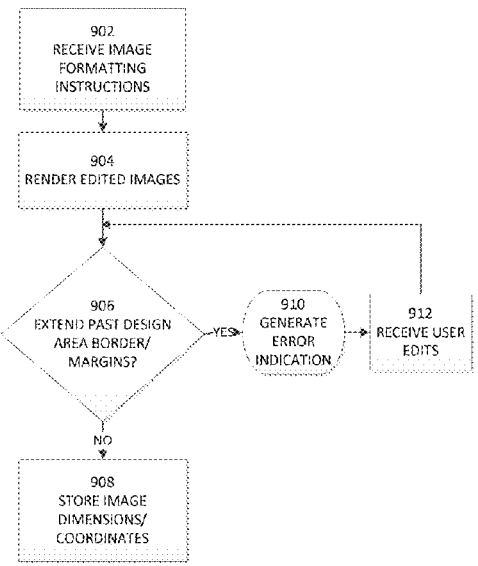

FIG. 9 illustrates example operations that may be performed in detecting design rule violations with respect to editing an image by a user (e.g., an end user) which may be used by one or more of the image editing operations discussed herein. At block 902, an image edit instruction is received. For example, the editing instructions may relate to change the size, rotation, and/or position of an image depicted in a design area of an item (e.g., on a chest design area of a jacket). At block 904, the edited image is rendered in real time on the item. At block 906, a determination is made as to whether the edited image extends past the design area boarder or a margin thereof, as defined by an item provider. At block 910, an error indication/notification is generated. For example, the notification may include one or more of a text notification, an icon notification, a sound notification, an operational notification (e.g., snapping the size or rotation of the image back to the previous size or rotation in response to detecting that the user is attempting to increase the size of the image or change the rotation of the image so that it will be past a design area border or margin), or the like. In addition, the user may be prevented from ordering the item until the violation is corrected. If there is no violation or the violation has been corrected at block 912, then at block 908, the image dimensions and/or coordinates may be stored for later ordering or printing. Optionally instead, the portion of the image or other template that violates design area boarder or a margin thereof is cropped, and the cropped image is displayed in real time in the design area. The user may be permitted to order the order the item with the cropped image or other template.

Figure 10:
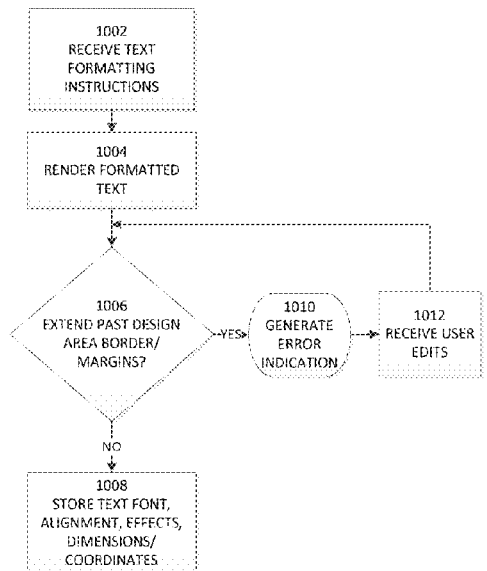

FIG. 10 illustrates example operations that may be performed in detecting design rule violations with respect to editing text by a user (e.g., an end user). The example operations may be used in conjunction with one or more of the text editing operations discussed herein. At block 1002, an text edit instruction is received. For example, the editing instructions may relate to change the size, rotation, and/or position of text depicted in a design area of an item (e.g., on a chest design area of a jacket). At block 1004, the edited text is rendered in real time on the item. At block 1006, a determination is made as to whether the edited text extends past the design area boarder or a margin thereof, as defined by an item provider. At block 1010, an error indication/notification is generated. For example, the notification may include one or more of a text notification, an icon notification, a sound notification, an operational notification (e.g., snapping the size or rotation of the text back to the previous size or rotation in response to detecting that the user is attempting to increase the size of the text or rotate the text past a design area border or margin), or the like. In addition, the user may be prevented from ordering the item until the violation is corrected. If there is no violation or the violation has been corrected at block 1012, then at block 1008, the text dimensions and/or coordinates may be stored for later ordering or printing.

Optionally instead, the portion of the text or other template that violates design area boarder or a margin thereof is cropped, and the cropped text or other template is displayed in real time in the design area. The user may be permitted to order the order the item with the cropped text or other template.

Figure 11:
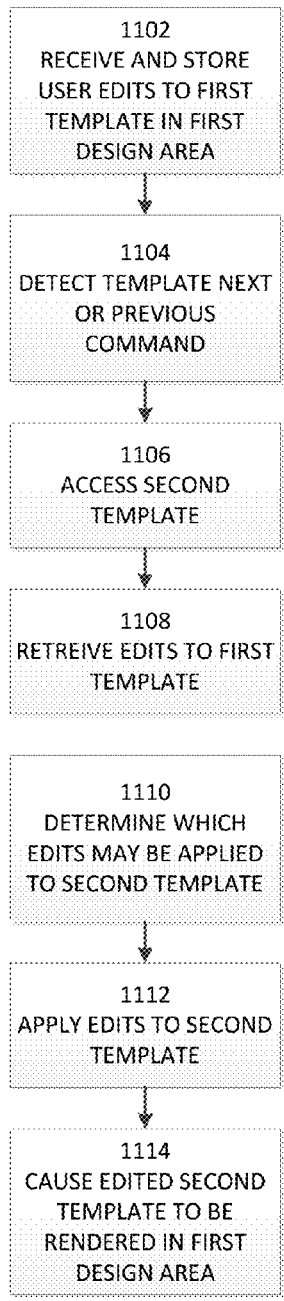

FIG. 11 illustrates an example process that enables a user to quickly view different templates as applied to an item design area. At block 1102, user edits to a first design element (e.g., a first template) in a first design area of an item are received. For example, the edits (e.g., a change in orientation, color, size, height/width ratio, text content, deletion of a portion of a design element, etc.) may been received using interfaces described above. The first design element may be one of a plurality of design elements that may be used in the design area. The user interface may display the edited first design element on a model of an item.

At block 1104, a next or previous design element command may be received and detected. For example, if the user interface is displayed via a touch screen, the next or previous design element command may be received via a left or a right swipe gesture using one or more fingers or a stylus. Optionally, visible next and previous controls may be provided that may be clicked on or otherwise selected. Optionally, a suggestion control may be provided which may be used to instruct the process to suggest a template (rather than provide the last or next template).

At block 1106, a second design element is accessed in response to the next or previous command. For example, if a previous command is received, the process may select the immediately preceding design element in a gallery of design elements. If an next command is received, the process may select the immediately next design element in a gallery of design elements. If a suggestion control is selected, the process may select a second template based on a user's template purchase history, user preferences (e.g., the user may have indicated a preference for certain sports teams or players, performers, celebrities, politicians, cartoon characters), and/or template popularity.

At block 1108, the edits to the first design element are retrieved from memory.

At block 1110, a determination is made as to which edits to the first design element may be applied the second design element. For example, the process may determine whether an item provider has set different edit restrictions for the first design element than the second design element, and whether edits permitted for the first design element are permitted for the second design element. The process may not apply (or apply with a rule violation notice) the edits from the first design element to the second design element where such edits would violate edit restrictions for the second design element.

By way of illustration, the first design element may be of a basketball, and a first edit may have changed the basketball color to green. The second design element may be a logo of a basketball team and may be associated with a restriction preventing a color change to the logo. In such case, the process would not apply the color change to the logo. By way of further example, the edit permissions for both the first and second design elements may indicate that both design elements may be rotated to any desired angle. In such case, the process may apply a rotation edit for the first design element to the second design element. By way of further example, an edit to the first design element may have been deletion of a word. If the second design element does not include the deleted word, than the deletion edit will not be performed.

At block 1112, the edits that are determined to be applyable to the second design element are applied. At block 1114, the second template is rendered on the first design area of the model of the item. Optionally, an undo control may be provided which when activated will cause the edits to the second template to be removed. The foregoing process may be performed in real time, enabling a user to swiftly view different customizations, optionally without having to reapply edits for each design element.

Optionally, in addition to enabling gestures to be used to cycle through templates, the process may enable gestures to be used to swipe through different items to which a template will be applied. For example, in response to detecting a gesture (e.g., an up/down or left/right swipe) on a user device display, the process may replace the item on which the template is displayed with a different item. For example, if a template is displayed on an image of a t-shirt with a pocket, in response to a gesture process may cause the same template (optionally with any user edits) to be displayed in real time on another item (e.g., a t-shirt without a pocket) in place of the image of the t-shirt with a pocket.

Thus, aspects of the disclosure relate to enhancement in the computer aided design and customization of items.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A computer-implemented method of customizing a modeled article of manufacture in a computer-aided design system, the method comprising:
   receiving, at a computer aided design system, a selection of a model of an article of manufacture from a user device;
   accessing design area specifications corresponding to the selected model from a data store;
   causing an image corresponding to the selected model of the article of manufacture to be rendered in a customization interface on the user device;
   based at least in part on the accessed design area specifications;
      causing a first border corresponding to a first design area to be rendered by the user device on a first area of the image of the selected model of the article of manufacture;

causing a second area corresponding to a second design area to rendered by the user device on a second area the image of the selected model of the article of manufacture;

receiving a user selection of the first design area;

causing the first design area to be emphasized in response to the user selection of the first design area;

receiving a user add image input while the first design area is selected;

accessing, in response to the add image input, a plurality of images, where a given image in the plurality of images is associated with a permission indicating that the corresponding image may be added to the first design area;

causing the accessed plurality of images to be rendered by the user device;

receiving a selection of an image from the rendered plurality of images;

causing the selected image to be rendered by the user device in the selected first design area;

accessing first edit permissions for the first design area;

causing a first set of edit tools to be rendered by the user device, at the same time the selected image is rendered in the first design area, according to the accessed first edit permissions;

receiving an image edit command via an edit tool in the first set of edit tools;

causing the image in the first design area to be rendered in real time in accordance with the image edit command;

receiving a user selection of the second design area;

causing the second design area to be emphasized in response to the user selection of the second design area;

receiving a user add text input while the second design area is selected;

accessing, in response to the add text input, a plurality of text templates, wherein a given text template is associated with a permission indicating that the corresponding text template may be added to the second design area;

causing the accessed plurality of text templates to be rendered by the user device;

receiving a selection of a text template from the rendered plurality of text templates, the selected text template comprising predefined text;

causing the selected text template to be rendered in the selected second design area by the user device;

accessing second edit permissions for the second design area;

causing a second set of edit tools to be rendered by the user device, at the same time the selected text template is rendered in the second design area, according to the accessed second edit permissions;

receiving a text edit command via a rendered edit tool in the second set of edit tools;

causing the text template to be rendered in the second design area by the user device in real time in accordance with the text edit command;

generating production data;

using the production data, causing the selected item of manufacture to have the edited image printed thereon in an area corresponding to the first design area; and causing the selected item of manufacture to have the edited text template printed or embroidered thereon in an area corresponding to the second design area.

2. The method as defined in claim 1, wherein the image edit command comprises a change color command, the method further comprising:
  receiving a color selection at the user device;
  causing a color map to be rendered by the user device;
  receiving a selection of a location in the color map, the location associated with a color code;
  accessing a text file associated with the image rendered in the first design area, the text file comprising color data;
  editing the color data in the text file to correspond to the color code;
  causing the image to be rendered in the first design area using the edited color data in the text file by the user device.

3. The method as defined in claim 1, wherein the text edit command comprises a rotation command, the method further comprising:
  monitoring an amount of rotation associated with the text edit command;
  determining if the amount of rotation associated with the text edit command causes a border rule to be violated; and
  in response to determining that the amount of rotation associated with the text edit command causes a border rule to be violated, generating a visual error notification and/or truncating text that violates the border rule.

4. The method as defined in claim 1, wherein causing the first set of edit tools to be rendered by the user device according to the accessed first edit permissions, further comprises providing visual indications indicating which edit tools in the first set of edit tools are functional with respect to the first design area and which edits tools in the first set of edit tools are not functional with respect to the first design area.

5. The method as defined in claim 1, wherein causing the first set of edit tools to be rendered by the user device according to the first accessed edit permissions, further comprises determining which of the following edit commands are permitted to be used:
  resize,
  move,
  rotate,
  change font,
  change color, and
  providing visual indications indicating which edit tools in the first set of edit tools are functional with respect to the first design area and which edits tools are not functional with respect to the first design area.

6. The method as defined in claim 1, wherein causing the second set of edit tools to be rendered by the user device according to the first accessed edit permissions, further comprises determining which of the following edit commands are permitted to be used:
  edit text content,
  change font,
  change color, and
  providing visual indications indicating which edit tools in the second set of edit tools are functional with respect to the second design area and which edits tools are not functional with respect to the second design area.

7. The method as defined in claim 1, the method further comprising:
  providing a permissions interface to a second user device enabling a second user to specify edit permissions for at least one end-user customizable design area for at least one article of manufacture;

receiving and storing edit permissions for at least one end-user customizable design area; and enabling an end-user to edit that at least one end-user customizable design area in accordance with the edit permissions.

8. The method as defined in claim 1, the method further comprising:

providing an interface to a second user device enabling a second user to specify one or more end-user customizable design areas for at least one item of manufacture;

in response to detecting that at least one end-user customizable design area added by the second user violates a first manufacturing rule, generating a corresponding error notification and/or truncating at least one end-user customizable design area added by the second user violates the first manufacturing rule.

9. The method as defined in claim 1, the method further comprising:

generating an interactive catalog of articles of manufacture, the articles of manufacture comprising clothing articles; and providing at least a portion of the interactive catalog of articles of manufacture for display on the user device, wherein the selection of the model of the article of manufacture from the user device is received via the interactive catalog of articles of manufacture.

10. The method as defined in claim 1, wherein the production data comprises an image file comprising the image rendered in the first design area in accordance with the image edit command.

11. A system comprising:

a non-transitory data media configured to store models of item of manufacture, design area specifications for one or more items of manufacture, customization permissions, and design rules;

a computer-aided design (CAD) computing device in communication with the data media, the CAD computing device configured to:

receive a user selection of a model of an item of manufacture;

access from the data media an image corresponding to the selected model of the item of manufacture;

cause the image corresponding to the selected model of the item of manufacture to be rendered in a customization user interface;

access from the data media one or more design area specifications associated with the selected model of the item of manufacture;

cause the one or more design areas to be graphically indicated on the image corresponding to the selected model of the item of manufacture;

receive a selection of a design area from the one or more design areas graphically indicated on the image corresponding to the selected model of the item of manufacture;

receive via a control an indication that a design element of a first type is to be added to the selected design area, wherein the design element of the first type comprises an image design element and/or a text design element;

provide a design element specification user interface corresponding to the first type of design element;

receive a design element specification via the design element specification user interface corresponding to the first type of design element;

cause the specified design element to be rendered in the selected design area on the image corresponding to the selected model of the item of manufacture;

access from the data media customization permissions associated with the selected design area;

based at least in part on the accessed customization permissions, select a first set of design element edit tools;

provide at least a portion of the first set of design element edit tools for use by the user;

receive a design element edit instruction via an edit tool in the first set of edit tools;

cause the design element of the first type to be rendered in accordance with the edit instruction in real time in the selected design area;

determine if the edit instruction violates a design rule;

in response to a determination that the edit instruction violates a design rule:

cause a visual error indication to be rendered and/or truncate a portion of the design element that cause the design rule to be violated;

enable the user to instruct, via a corresponding control, that the article of manufacture is to be customized with the design element edited in accordance with the edit instruction;

at least partly in response to receiving an instruction from the user to have the article of manufacture customized with the design element edited in accordance with the edit instruction, transmit instructions to a printing system that causes the design element edited in accordance with the edit instruction to be printed or embroidered on the article of manufacture on an area corresponding to the selected design area.

12. The system as defined in claim 11, wherein the design element of the first type is an image and the edit instruction comprises a change color instruction, the CAD computing device further configured to:

receive a color selection;

cause a color map corresponding to the color selection to be rendered;

receive a selection of a location in the color map, the location associated with a color code;

access a text file associated with the image rendered in the selected design area, the text file comprising color data;

edit the color data in the text file to correspond to the color code;

cause the image to be rendered in the selected design area using the edited color data in the text file.

13. The system as defined in claim 11, wherein the edit instruction comprises a rotation instruction, the CAD computing device further configured to:

monitor an amount of rotation associated with the edit instruction;

determine if the amount of rotation associated with edit instruction causes a design rule to be violated; and in response to determining that the amount of rotation associated with the edit instruction causes a design rule to be violated, generate a visual error notification and/or a portion of the design element that causes the design rule to be violated.

14. The system as defined in claim 11, the CAD computing device further configured to provide visual indications indicating which edit tools in the first set of edit tools are functional with respect to the selected design area and which edits tools in the first set of edit tools are not functional with respect to the selected design area.

15. The system as defined in claim 11, wherein the selection of the first set of design element edit tools further comprises making a determination as to which of the following edit commands are permitted to be used:

resize,
move,
rotate,
change font,
change color.

16. The system as defined in claim 11, wherein the selection of the first set of design element edit tools further comprises making a determination as to which of the following edit commands are permitted to be used:
   edit text content,
   change font,
   change color.

17. The system as defined in claim 11, the CAD computing device further configured to provide a permissions interface to a second user device that enables a second user to specify edit permissions for at least one end-user customizable design area for at least one article of manufacture.

18. The system as defined in claim 11, the CAD computing device further configured to:
   provide an interface to a second user device enabling a second user to specify one or more design areas for at least one item of manufacture;
   in response to detecting that at least one end-user customizable design area added by the second user violates a first manufacturing rule, generate a corresponding error notification and/or truncate at least one end-user customizable design area added by the second user that violates the first manufacturing rule.

19. The system as defined in claim 11, the CAD computing device further configured to:
   generate an interactive catalog of articles of manufacture, the articles of manufacture comprising clothing articles; and
   provide at least a portion of the interactive catalog of articles of manufacture for display on the user device via which a user can select models of articles of manufacture to customize.

20. The system as defined in claim 11, wherein the design element specification user interface comprises a gallery of user-selectable design elements.

21. The system as defined in claim 11, wherein the design element specification user interface comprises a gallery of pre-defined text templates.

* * * * *